(12) United States Patent
Su

(10) Patent No.: US 12,405,760 B2
(45) Date of Patent: Sep. 2, 2025

(54) ENHANCED SCREEN SHARING METHOD AND SYSTEM, AND ELECTRONIC DEVICE

(71) Applicant: Huawei Technologies Co., Ltd., Shenzhen (CN)

(72) Inventor: Hang Su, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/336,885

(22) Filed: Jun. 16, 2023

(65) Prior Publication Data
US 2023/0333803 A1 Oct. 19, 2023

Related U.S. Application Data

(63) Continuation of application No. PCT/CN2021/137463, filed on Dec. 13, 2021.

(30) Foreign Application Priority Data

Dec. 21, 2020 (CN) .......................... 202011518228.1

(51) Int. Cl.
G06F 3/14 (2006.01)
G06F 3/0488 (2022.01)

(52) U.S. Cl.
CPC .......... G06F 3/1454 (2013.01); G06F 3/0488 (2013.01)

(58) Field of Classification Search
CPC .... G06F 3/1454; G06F 3/0488; G06F 3/0482; G06F 9/451; H04M 1/72439; H04M 2250/22; H04M 1/72406; H04M 1/72469; H04N 7/147; H04N 7/141
See application file for complete search history.

(56) References Cited

U.S. PATENT DOCUMENTS

2008/0125104 A1 5/2008 You et al.
2011/0165841 A1* 7/2011 Baek ....................... H04L 67/10
455/41.2

(Continued)

FOREIGN PATENT DOCUMENTS

CN 101582020 A 11/2009
CN 101582021 A 11/2009

(Continued)

Primary Examiner — Md Saiful A Siddiqui
(74) Attorney, Agent, or Firm — Conley Rose, P.C.

(57) ABSTRACT

An enhanced screen sharing method includes: a first electronic device that displays a first shared interface, and sends interface data of the first shared interface to a second electronic device. The second electronic device receives the interface data, and displays a second shared interface corresponding to the first shared interface. The second electronic device enables an interconnection mode for the first electronic device, and when detecting a trigger operation performed by a user on the second shared interface, determines event information corresponding to the trigger operation. The event information includes an event type and operation area information that correspond to the trigger operation. The second electronic device sends the event information to the first electronic device. The first electronic device receives the event information, and performs a corresponding operation based on the event information.

20 Claims, 49 Drawing Sheets

(56) References Cited

U.S. PATENT DOCUMENTS

| | | | |
|---|---|---|---|
| 2012/0092277 A1* | 4/2012 | Momchilov | G06F 3/038 345/173 |
| 2012/0178536 A1* | 7/2012 | Oh | H04L 12/1822 463/42 |
| 2013/0167040 A1* | 6/2013 | Lee | H04N 1/00129 715/748 |
| 2013/0234984 A1* | 9/2013 | Yoo | H04N 21/4222 345/174 |
| 2014/0240440 A1* | 8/2014 | Seo | H04L 51/04 715/753 |
| 2015/0169129 A1* | 6/2015 | Park | G06F 3/0488 345/174 |
| 2016/0062572 A1* | 3/2016 | Yang | H04W 4/80 715/835 |
| 2017/0083148 A1* | 3/2017 | Ahn | G06F 3/1446 |
| 2018/0367483 A1* | 12/2018 | Rodriguez | H04L 51/046 |

FOREIGN PATENT DOCUMENTS

| | | |
|---|---|---|
| CN | 101789955 A | 7/2010 |
| CN | 103685389 A | 3/2014 |

\* cited by examiner

ENHANCED SCREEN SHARING METHOD AND SYSTEM, AND ELECTRONIC DEVICE

CROSS-REFERENCE TO RELATED APPLICATIONS

This is a continuation of International Patent Application No. PCT/CN2021/137463 filed on Dec. 13, 2021, which claims priority to Chinese Patent Application No. 202011518228.1 filed on Dec. 21, 2020. The disclosures of the aforementioned applications are hereby incorporated by reference in their entireties.

TECHNICAL FIELD

This disclosure relates to the field of communications, and in particular, to an enhanced screen sharing method and system, and an electronic device.

BACKGROUND

Continuous development of information technology and popularization and diversification of electronic devices, such as a mobile phone and a tablet, lead to increasingly rich functions of the electronic devices. For example, a technology for screen sharing and interaction between electronic devices has become increasingly mature. Screen sharing and interaction refer to a technology in which electronic devices with a screen display function respectively serve as a screen sharing initiator device (an initiator device) and a screen sharing recipient device (a recipient device), to implement sharing and exchange of information such as screen content and media content between the electronic devices.

When the initiator device and the recipient device perform screen sharing and interaction, the recipient device may receive a relatively single operation performed by a user on a shared screen. For example, the recipient device may receive an operation such as graffiti performed by the user on the shared screen. There is a problem that good interaction cannot be implemented between the recipient device and the initiator device, and user experience is affected.

SUMMARY

Embodiments of this disclosure provide an enhanced screen sharing method and system, and an electronic device. In a process of screen sharing between electronic devices, a recipient device of the screen sharing may receive more types of operations performed by a user on a shared interface of the screen sharing. In this way, better interaction between the recipient device and an initiator device of screen sharing is implemented, thereby improving user experience.

To resolve the foregoing technical problem, according to a first aspect, an implementation of embodiments of this disclosure provides an enhanced screen sharing method. The method includes a first electronic device that displays a first shared interface, and sends interface data of the first shared interface to a second electronic device. The second electronic device receives the interface data, and displays, based on the interface data, a second shared interface corresponding to the first shared interface. The second electronic device enables an interconnection mode for the first electronic device. In the interconnection mode, the second electronic device detects a trigger operation performed by a user on the second shared interface, and determines event information corresponding to the trigger operation. The event information includes an event type and operation area information that correspond to the trigger operation. The second electronic device sends the event information to the first electronic device. The first electronic device receives the event information, and performs a corresponding operation on the first electronic device based on the event information.

The second electronic device may enable, by the detected trigger operation performed by the user on the second shared interface, the first electronic device to perform the corresponding operation on the first electronic device, so as to implement interconnection between the second electronic device and the first electronic device. In this way, interaction between the second electronic device and the first electronic device can be better implemented, thereby improving availability and user friendliness of the shared interface to improve user experience.

In a possible implementation of the foregoing first aspect, the event type may be, for example, an input event such as a single-tap input event, a double-tap input event, a touch-and-hold input event, or a flicking input event. The operation area information may be position coordinate information of a user trigger position (for example, a coordinate of a position at which the user performs a single-tap operation).

In a possible implementation of the foregoing first aspect, the first shared interface and the second shared interface may be completely the same, and may be collectively referred to as a shared interface.

In another possible implementation of the foregoing first aspect, the first shared interface and the second shared interface may also be partially the same.

In a possible implementation of the foregoing first aspect, that the first electronic device performs a corresponding operation on the first electronic device based on the event information includes the following. The first electronic device determines a first operation type based on the event type. The first electronic device performs the corresponding operation on the first electronic device based on the first operation type and the operation area information.

In a possible implementation of the foregoing first aspect, if the event type is a first input event, the first operation type is an application determining operation. The first electronic device determines, based on the operation area information, application identification information of an application corresponding to the operation area information on the first shared interface. The first electronic device generates event response information. The event response information includes the application identification information. The first electronic device sends the event response information to the second electronic device. The second electronic device receives the event response information, and if determining, based on the event response information, that the application corresponding to the application identification information is not currently installed in the second electronic device, downloads or downloads and installs the application corresponding to the application identification information.

In a possible implementation of the foregoing first aspect, the first input event is a double-tap input event or a touch-and-hold input event.

The second electronic device interconnects with the first electronic device, and the second electronic device may implement an operation of downloading and installing, by the second electronic device, an application corresponding to an application in the first electronic device. In this way, interaction between the two can be better implemented, thereby improving availability and user friendliness of the shared interface to improve user experience.

In a possible implementation of the foregoing first aspect, the method further includes the following. The first electronic device determines a second operation type based on the first operation type. The second operation type is an application download or download and installation operation. The first electronic device generates event response information. The event response information includes the application identification information and the second operation type. If the second electronic device determines, based on the event response information, that the application corresponding to the application identification information is not currently installed in the second electronic device, the second electronic device downloads or downloads and installs the application corresponding to the application identification information.

The second electronic device interconnects with the first electronic device, and an operation of downloading and installing, by the second electronic device, an application corresponding to an application in the first electronic device can be implemented. In this way, interaction between the two can be better implemented, thereby improving availability and user friendliness of the shared interface to improve user experience.

In a possible implementation of the foregoing first aspect, if the event type is the second input event, the first operation type is an operation object trigger operation. The first electronic device determines, based on the operation area information, an operation object corresponding to the operation area information on the first shared interface. The first electronic device performs an operation of triggering the operation object.

In a possible implementation of the foregoing first aspect, the second input event is a single-tap input event or a flicking input event.

The interconnection between the second electronic device and the first electronic device can implement that the second electronic device interconnects with the first electronic device to perform an operation such as operation object trigger. In this way, interaction between the second electronic device and the first electronic device can be better implemented, thereby improving availability and user friendliness of the shared interface to improve user experience.

In a possible implementation of the foregoing first aspect, if a first screen resolution of the first electronic device is different from a second screen resolution of the second electronic device, the method further includes the following. The second electronic device obtains initial operation area information based on the trigger operation. The second electronic device adjusts the initial operation area information based on the first screen resolution and the second screen resolution to obtain the operation area information. Alternatively, the first electronic device adjusts the received operation area information based on the first screen resolution and the second screen resolution, and performs a corresponding operation based on adjusted operation area information and the first operation type.

Through resolution adjustment, the operation area information of the area in which the user performs the trigger operation can be accurately determined.

In a possible implementation of the foregoing first aspect, the operation area information is position coordinate information.

In a possible implementation of the foregoing first aspect, that the second electronic device enables an interconnection mode for the first electronic device includes the following. The first electronic device displays a first interconnection control. If detecting an enabling trigger operation performed by the user on the first interconnection control, the first electronic device enables the interconnection mode with the second electronic device. Alternatively, the second electronic device displays a second interconnection control. If detecting an enabling trigger operation performed by the user on the second interconnection control, the second electronic device enables the interconnection mode for the first electronic device.

The interconnection mode may be enabled by the first electronic device, or may be enabled by the second electronic device. This may be set as required.

In a possible implementation of the foregoing first aspect, that the second electronic device enables the interconnection mode for the first electronic device if detecting an enabling trigger operation performed by the user on the second interconnection control includes the following. If detecting the enabling trigger operation performed by the user on the second interconnection control, the second electronic device sends an interconnection request to the first electronic device. The first electronic device receives the interconnection request, and displays an interconnection determining control. If the first electronic device detects a trigger operation performed by the user on the interconnection determining control, the second electronic device generates and sends, to the second electronic device, an interconnection response indicating that interconnection is agreed. The second electronic device receives the interconnection response, and enables the interconnection mode for the first electronic device.

In a possible implementation of the foregoing first aspect, the method further includes the following. The second electronic device enables the interconnection mode for the first electronic device, and generates interconnection operation prompt information. The second electronic device displays the interconnection operation prompt information. In this way, a user can conveniently perform an interconnection operation, and user experience can be improved.

According to a second aspect, an implementation of embodiments of this disclosure provides an enhanced screen sharing method, applied to a first electronic device. The method includes the first electronic device that displays a first shared interface, and sends interface data of the first shared interface to a second electronic device, to enable the second electronic device to display, based on the interface data, a second shared interface corresponding to the first shared interface. The first electronic device receives event information sent by the second electronic device, and performs a corresponding operation on the first electronic device based on the event information. The event information is information determined based on a trigger operation of a user for the shared interface in an interconnection mode for the first electronic device after the second electronic device enables the interconnection mode. The event information includes an event type and operation area information that correspond to the trigger operation.

The second electronic device may enable, by a detected trigger operation performed by the user on the second shared interface, the first electronic device to perform the corresponding operation on the first electronic device, so as to implement interconnection between the second electronic device and the first electronic device. In this way, interaction between the second electronic device and the first electronic device can be better implemented, thereby improving availability and user friendliness of the shared interface to improve user experience.

In a possible implementation of the foregoing second aspect, that the first electronic device performs a corresponding operation on the first electronic device based on the event information includes the following. The first electronic device determines a first operation type based on the event type. The first electronic device performs the corresponding operation on the first electronic device based on the first operation type and the operation area information.

According to a third aspect, an implementation of embodiments of this disclosure provides an enhanced screen sharing method, applied to a second electronic device. The method includes the second electronic device that receives interface data of a first shared interface sent by a first electronic device, and displays, based on the interface data, a second shared interface corresponding to the first shared interface. The shared interface is an interface displayed by the first electronic device. The second electronic device enables an interconnection mode for the first electronic device. In the interconnection mode, the second electronic device detects a trigger operation performed by a user on the second shared interface, and determines event information corresponding to the trigger operation. The event information includes an event type and operation area information that correspond to the trigger operation. The second electronic device sends the event information to the first electronic device, to enable the first electronic device to perform a corresponding operation on the first electronic device based on the event information.

The second electronic device may enable, by the detected trigger operation performed by the user on the second shared interface, the first electronic device to perform the corresponding operation on the first electronic device, so as to implement interconnection with the first electronic device. In this way, interaction with the first electronic device can be better implemented, thereby improving availability and user friendliness of the shared interface to improve user experience.

According to a fourth aspect, an implementation of embodiments of this disclosure provides an enhanced screen sharing system, including a first electronic device and a second electronic device. The first electronic device is configured to display a first shared interface, and send interface data of the first shared interface to the second electronic device. The second electronic device is configured to receive the interface data, and display, based on the interface data, a second shared interface corresponding to the first shared interface. The second electronic device is further configured to enable an interconnection mode for the first electronic device. In the interconnection mode, the second electronic device is configured to, when detecting a trigger operation performed by a user on the second shared interface, determine event information corresponding to the trigger operation. The event information includes an event type and operation area information that correspond to the trigger operation. The second electronic device is further configured to send the event information to the first electronic device. The first electronic device is configured to receive the event information, and perform a corresponding operation on the first electronic device based on the event information.

The enhanced screen sharing system provided in this implementation includes the first electronic device and the second electronic device that perform the foregoing enhanced screen sharing method. Therefore, an effect of the enhanced screen sharing method provided in the first aspect or the possible implementation of the first aspect can also be implemented.

According to a fifth aspect, an implementation of embodiments of this disclosure provides an electronic device, including a memory configured to store a computer program, where the computer program includes program instructions, and a processor configured to execute the program instructions, to enable the electronic device to perform the foregoing enhanced screen sharing method.

According to a sixth aspect, an implementation of embodiments of this disclosure provides a computer readable storage medium. The computer readable storage medium stores a computer program. The computer program includes program instructions. The program instructions are run by an electronic device, so that the electronic device performs the foregoing enhanced screen sharing method.

According to a seventh aspect, embodiments of this disclosure provide a computer program product. When the computer program product runs on an electronic product, the electronic product is enabled to perform the foregoing collaboration method between electronic devices.

It may be understood that, for beneficial effects of the second aspect to the seventh aspect, refer to related descriptions in the first aspect. Details are not described herein again.

BRIEF DESCRIPTION OF DRAWINGS

To describe some of the technical solutions in embodiments of this disclosure more clearly, the following briefly describes accompanying drawings used for describing embodiments.

DESCRIPTION OF EMBODIMENTS

The following further describes implementations of embodiments of this disclosure in detail with reference to accompanying drawings.

Figure 1:
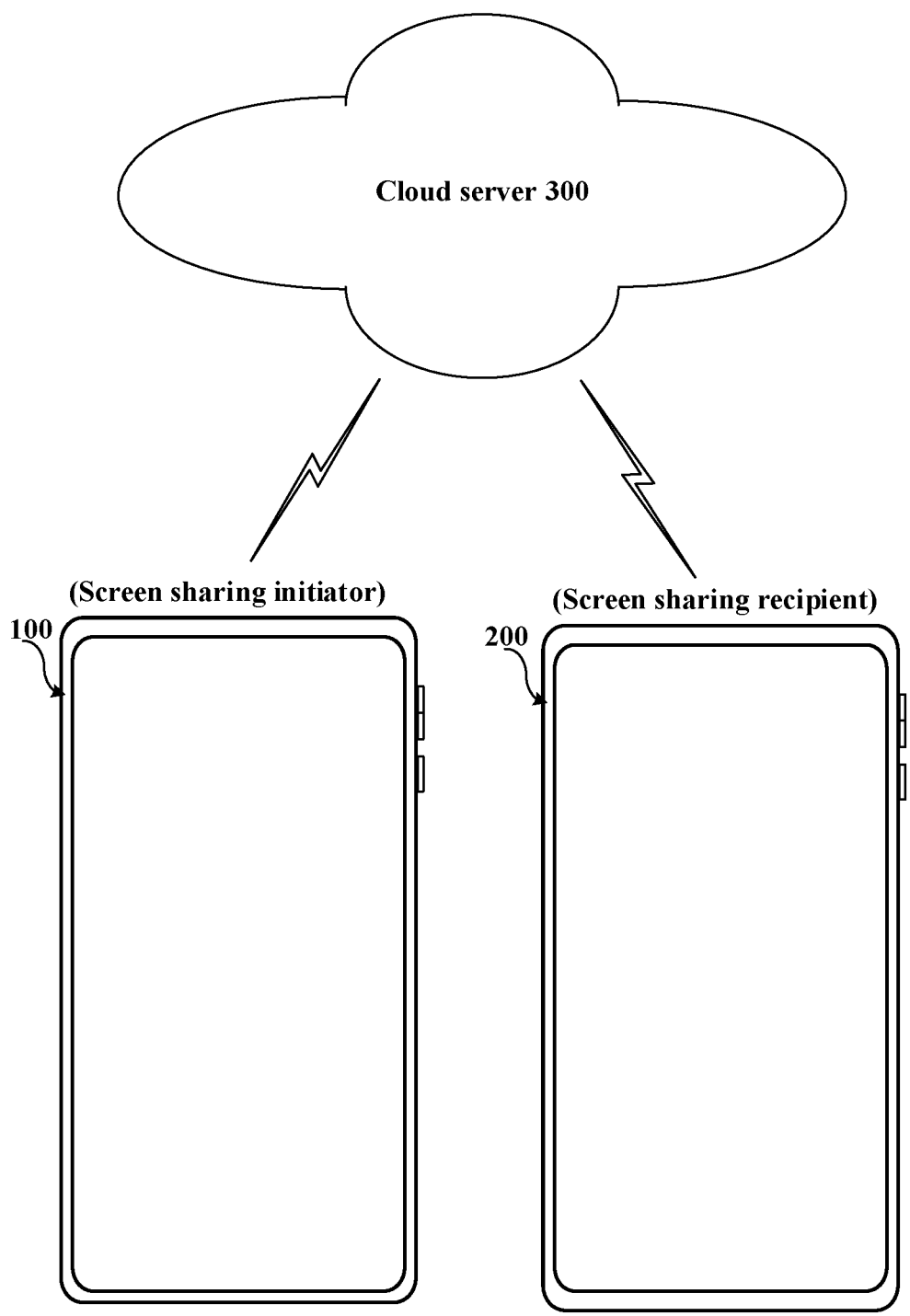
FIG. 1 is a schematic diagram of a communication system according to an embodiment of this disclosure.

Refer to FIG. 1. FIG. 1 is a schematic diagram of a communication system according to an embodiment of this disclosure.

The communication system includes a mobile phone 100 and a mobile phone 200. In an implementation of embodiments of this disclosure, a video call application having a video calling function and a screen sharing function is installed in both the mobile phone 100 and the mobile phone 200. The video call application may log in by using account information and a password of a user, so as to implement interconnection between the mobile phone 100 and the mobile phone 200, and implement interaction by using the video calling function and the screen sharing function. For a specific login manner, refer to other approaches. This is not limited in embodiments of this disclosure.

The communication system further includes a cloud server 300. The cloud server 300 is a server corresponding to a video call application. Communication such as video calling and screen sharing may be performed between the mobile phone 100 and the mobile phone 200 through the cloud server 300.

A user of the mobile phone 100 is a user U1, and a user of the mobile phone 200 is a user U2.

The user U1 opens the video call application in the mobile phone 100, and initiates a video call request to the user U2. If the user U2 accepts the video call request by operating the mobile phone 200, a video call may be made between the mobile phone 100 and the mobile phone 200.

In a process of the video calling between the mobile phone 100 and the mobile phone 200, interfaces of the video call displayed by the mobile phone 100 and the mobile phone 200 may each provide more function controls, for example, a screen sharing control. If user U1 enables a screen sharing mode (which may alternatively be referred to as a screen sharing function, or an interface sharing mode) by the screen sharing control, and the user U2 operates the mobile phone 200 to accept a request for enabling the screen sharing mode, the mobile phone 100 may use a real-time interface of the mobile phone 100 as a first shared interface. In addition, the mobile phone 100 uses displayed content of the first shared interface as interface data, and sends the interface data to the mobile phone 200 in a form of a data stream (which may alternatively be referred to as a video data stream). The mobile phone 200 receives the interface data of the first shared interface, and displays, on a screen of the mobile phone based on the interface data, a second shared interface corresponding to the first shared interface, so that the mobile phone 100 shares screen content of the mobile phone 100 with the mobile phone 200. The mobile phone 100 serves as a screen sharing initiator device for screen sharing. The mobile phone 200 serves as a screen sharing recipient device for screen sharing.

In the enhanced screen sharing method provided in embodiments of this disclosure, in a process of screen sharing between the mobile phone 100 and the mobile phone 200, interfaces of the mobile phone 100 and the mobile phone 200 may each provide more function controls, for example, an interconnection control (which may alternatively be referred to as an interconnection switch). If the user U2 enables an interconnection mode (which may alternatively be referred to as an interconnection function) between the mobile phone 100 and the mobile phone 200 by the interconnection control displayed by the mobile phone 200, in the interconnection mode, after the mobile phone 200 receives a trigger operation performed by the user U2 on the second shared interface displayed by the mobile phone 2000. The mobile phone 200 sends event information corresponding to the trigger operation of the user U2 to the mobile phone 100. The event information includes an event type and operation area information that correspond to the trigger operation of the user U2. The event type may be, for example, an input event such as a single-tap input event, a double-tap input event, a touch-and-hold input event, or a flicking input event. The operation area information may be position coordinate information of a user trigger position (for example, a coordinate of a position at which the user performs a single-tap operation).

After receiving the event information sent by the mobile phone 200, the mobile phone 100 may determine, based on the event information, an operation type of an operation that needs to be performed by the mobile phone 100, and perform a corresponding operation. In this case, the mobile phone 100 performs the operation corresponding to the trigger operation of the user U2, so as to achieve an objective that the mobile phone 200 performs interconnection on the mobile phone 100. That the mobile phone 200 performs interconnection on the mobile phone 100 means that the mobile phone 100 may perform, in the mobile phone 100 based on the event information sent by the mobile phone 200, an operation corresponding to the event information. For example, if the mobile phone 200 detects an operation that the user U2 taps an application icon of an application in the second shared interface displayed by the mobile phone 200, the mobile phone 100 performs, based on the received event information, a corresponding action and feedback such as opening the application. If the mobile phone 200 detects an operation that the user U2 double taps an application icon of an application in the second shared interface displayed by the mobile phone 200, the mobile phone 100 performs, based on the received event information, a corresponding action and feedback such as application download and installation. If the mobile phone 200 detects an operation that the user U2 taps a control in the second shared interface displayed by the mobile phone 200, the mobile phone 100 performs, based on the received event information, a corresponding action and feedback such as triggering the control.

For example, the mobile phone 100 displays a first shared interface, and the mobile phone 200 displays a second shared interface corresponding to the first shared interface sent by the mobile phone 100. If detecting a single-tap operation performed by the user U2 on the second shared interface displayed by the mobile phone 200, the mobile phone 200 determines that an event type corresponding to the single-tap operation of the user U2 is a single-tap input event. The mobile phone 200 sends, as event information to the mobile phone 100, the event type and a position coordinate information of a position at which the user U2 performs the single-tap operation. After receiving the event information, the mobile phone 100 determines, based on the event type, that an operation type corresponding to the single-tap input event is an operation object trigger operation. In this case, the mobile phone 100 determines, based on the position coordinate information, an operation object, corresponding to the position at which the user U2 performs the single-tap operation, on the first shared interface displayed by the mobile phone 100, and performs an operation of triggering the operation object. For example, if the operation object is an application, an operation of opening the application is performed. If the operation object is a control in an application, an operation of triggering the control or the like is performed.

If detecting a double-tap operation performed by the user U2 on the second shared interface displayed by the mobile phone 200, the mobile phone 200 determines that an event type corresponding to the double-tap operation of the user U2 is a double-tap input event. The mobile phone 200 sends, as event information to the mobile phone 100, the event type and a position coordinate information of a position at which the user U2 performs the double-tap operation. After receiving the event information, the mobile phone 100 determines, based on the event type, that an operation type corresponding to the double-tap input event is an application determining operation. In this case, the mobile phone 100 determines, based on the position coordinate information, an application name of an application, corresponding to the position at which the user U2 performs the double-tap operation, on the first shared interface displayed by the mobile phone 100. The mobile phone 100 sends the application name as event response information to the mobile phone 200. After receiving the event response information, the mobile phone 200 determines, based on the application name, whether the corresponding application is installed in the mobile phone 200. If the corresponding application is not installed, the mobile phone 200 directly downloads a corresponding application from an AppGallery application in the mobile phone 200 based on the application name, and completes application installation. If the corresponding application is already installed in the mobile phone 200, the mobile phone 200 does not perform an application download and installation operation. Alternatively, the mobile phone 200 may display prompt information used to notify the user U2 that the corresponding application is currently installed in the mobile phone 200.

In addition, after determining the application name, the mobile phone 100 may further determine, based on the operation type "application determining operation", that a corresponding operation that needs to be performed by the mobile phone 200 is application download and installation. In this case, the mobile phone 100 determines that after receiving the event response information, an operation type of the operation that needs to be performed by the mobile phone 200 is "application download and installation". In addition, the mobile phone 100 generates event response information based on the application name and the operation type of the operation that needs to be performed by the mobile phone 200. In other words, the event response information includes the application name and the operation type of the operation that needs to be performed by the mobile phone 200. After receiving the event response information, the mobile phone 200 may conveniently determine, based on the operation type, that the application download and installation operation needs to be performed. In this case, the mobile phone 200 determines, based on the application name, whether the corresponding application is installed in the mobile phone 200, and when the corresponding application is not installed, to download a corresponding application from the AppGallery application in the mobile phone 200, and complete application installation.

Certainly, the mobile phone 200 may alternatively interconnect with the mobile phone 100 based on another received trigger operation performed by the user U2 on the shared screen displayed by the mobile phone 200, to enable the mobile phone 100 to perform another operation. In the enhanced screen sharing method provided in embodiments of this disclosure, a combination manner of an input event type (for example, a single-tap input event, a double-tap input event, or a touch-and-hold input event) and an operation object (for example, an interface control or an application) of the user may be set as required, to enable the mobile phone 100 performs a corresponding operation.

For example, the foregoing single-tap operation may alternatively be a flicking operation. In other words, the input event is a flicking input event. If the mobile phone 200 detects an operation that the user U2 flicks an application icon of an application in the second shared interface displayed by the mobile phone 200, the mobile phone 100 performs a corresponding action and feedback such as opening the application. The double-tap operation may alternatively be a touch-and-hold operation. In other words, the input event is a touch-and-hold input event. If the mobile phone 200 detects an operation that the user U2 touches and holds an application icon of an application in the second shared interface displayed by the mobile phone 200, the mobile phone 100 performs a corresponding action and feedback such as application download and installation. Alternatively, the input event may alternatively be a three-tap input event. If the mobile phone 200 detects a three-tap operation performed by the user U2 on an application icon of an application in the second shared interface displayed by the mobile phone 200, the mobile phone 100 performs a corresponding action and feedback such as application uninstallation.

In the enhanced screen sharing method provided in embodiments of this disclosure, the mobile phone 200 may implement interconnection with the mobile phone 100 by the trigger operation performed by the user U2 on the second shared interface, to implement an operation of downloading and installing, by the mobile phone 200, an application corresponding to the application in the mobile phone 100. Alternatively, the mobile phone 100 is interconnected to perform an operation such as operation object trigger. In this way, interaction with the mobile phone 100 can be better implemented, thereby improving availability and user friendliness of the shared interface are improved, to improve user experience.

Figure 2:
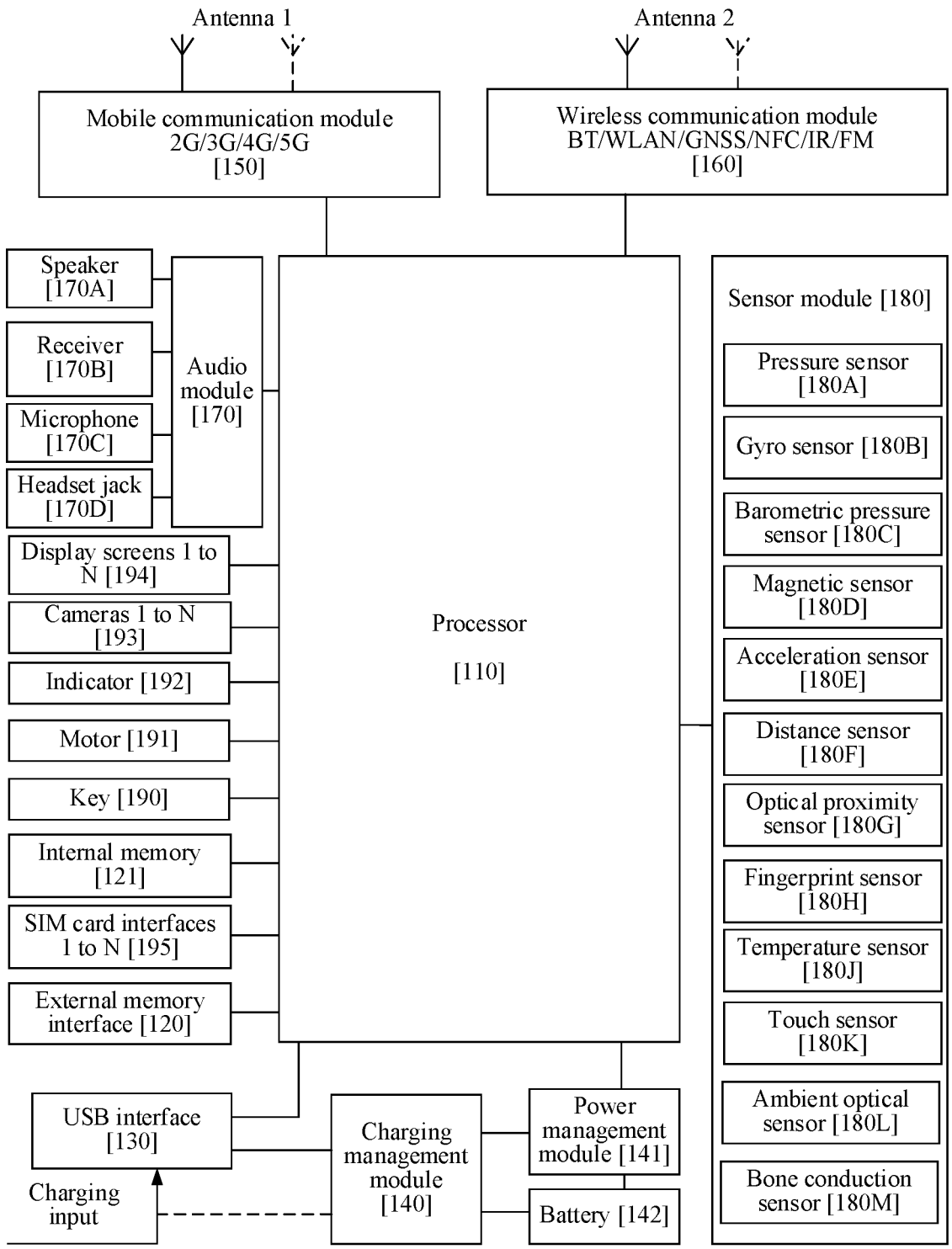
FIG. 2 is a schematic diagram of a structure of a mobile phone according to an embodiment of this disclosure.

Refer to FIG. 2. FIG. 2 is a schematic diagram of a structure of a mobile phone according to an embodiment of this disclosure. The mobile phone may be the foregoing mobile phone 100, and may alternatively be the mobile phone 200.

The mobile phone may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that the structure shown in embodiments of this disclosure does not constitute a limitation on the mobile phone. In some other implementations of embodiments of this disclosure, the mobile phone may include more or fewer components than those shown in the figure, or combine some components, or split some components, or have different component arrangements.

The processor 110 may include one or more processing units, for example the processor 110 may include an application processor (AP), a modem processor, a graphics processing unit (GPU), an image signal processor (ISP), a controller, a video codec, a digital signal processor (DSP), a baseband processor, and the like. Different processing units may be independent components, or may be integrated into one or more processors.

The processor may generate an operation control signal based on an instruction operation code and a time sequence signal to complete control of instruction fetching and instruction execution.

A memory may be further disposed in the processor 110, and is configured to store instructions and data. For example, the processor 110 is configured to enable the mobile phone to perform the enhanced screen sharing method provided in embodiments of this disclosure.

A wireless communication function of the mobile phone may be implemented by the antenna 1, the antenna 2, the mobile communication module 150, the wireless communication module 160, the modem processor, the baseband processor, and the like.

The mobile communication module 150 may provide a wireless communication function that is applied to the mobile phone, including second generation (2G)/third generation (3G)/fourth generation (4G)/fifth generation (5G).

The wireless communication module 160 may provide a wireless communication solution that is applied to the mobile phone, including wireless local area network (WLAN) (for example, WI-FI network), BLUETOOTH (BT), and the like.

In some embodiments, the antenna 1 of the mobile phone is coupled to the mobile communication module 150, and the antenna 2 is coupled to the wireless communication module 160, so that the mobile phone can communicate with a network and another device by a wireless communication technology.

The application processor outputs a sound signal through an audio device (which is not limited to the speaker 170A, the receiver 170B, and the like), or displays an image or a video through the display screen 194.

The mobile phone implements a display function by the GPU, the display screen 194, the application processor, and the like. The GPU is a microprocessor for image processing, and is connected to the display screen 194 and the application processor. The GPU is configured to perform mathematical and geometric calculations for graphics rendering. The processor 110 may include one or more GPUs. The processor executes program instructions to generate or change display information.

The display screen 194 is configured to display an image, a video, and the like. In some embodiments, the mobile phone may include one or N display screens 194. N is a positive integer greater than 1.

The mobile phone may implement a photographing function and a video calling function by the ISP, the camera 193, the video codec, the GPU, the display screen 194, the application processor, and the like. In some embodiments, the mobile phone may include one or N cameras 193. N is a positive integer greater than 1. Further, the mobile phone includes at least one camera 193 that is located on a same side as the display screen 194.

The video codec is configured to compress or decompress a digital video. The mobile phone may support one or more video codecs. In this way, the mobile phone may play or record videos in multiple encoding formats, for example, Moving Picture Experts Group (MPEG) 1, MPEG2, MPEG3, and MPEG4. In addition, the mobile phone may implement encapsulation, playing, and the like of audio and video data and screen recording data.

The mobile phone may implement an audio function by the audio module 170, the speaker 170A, the receiver 170B, the microphone 170C, the headset jack 170D, the application processor, and the like, such as video calling and music playing.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110. Alternatively, some function modules of the audio module 170 may be disposed in the processor 110.

The speaker 170A, also referred to as a "loudspeaker", is configured to convert an audio electrical signal into a sound signal. The mobile phone can make video calls, listen to music, or listen to hands-free calls through speaker 170A.

The receiver 170B, also referred to as an "earpiece", is configured to convert an audio electrical signal into a sound signal. When the mobile phone answers a call or a voice information, the receiver 170B may be placed close to a human ear to answer the voice.

The microphone 170C, also referred to as a "mike", a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display screen 194. When a touch operation (which may also be referred to as a trigger operation) is performed on the display screen 194, the mobile phone detects intensity of the touch operation based on the pressure sensor 180A. Alternatively, the mobile phone may calculate a touch position based on a detection signal of the pressure sensor 180A.

The touch sensor 180K is also referred to as a "touch component". The touch sensor 180K may be disposed on the display screen 194. The touch sensor 180K and the display screen 194 form a touch panel (TP), also referred to as a "touchscreen". The touch sensor 180K is configured to detect a touch operation performed on or near the touch sensor. The touch sensor 180K may transfer the detected touch operation to the application processor to determine a touch event type. A visual output related to the touch operation may be provided by the display screen 194. In some other embodiments, the touch sensor 180K may alternatively be disposed on a surface of the mobile phone, and a position of the touch sensor is different from that of the display screen 194.

In embodiments of this disclosure, the mobile phone may detect a trigger operation of a user on the display screen 194 based on the pressure sensor 180A and the touch sensor 180K, may also detect a voice input of the user based on the receiver 170B, and may detect a gesture input of the user based on the camera 193. Alternatively, an input of the user is detected based on an input module such as another input keyboard. This is not limited in this embodiment.

Figure 3:
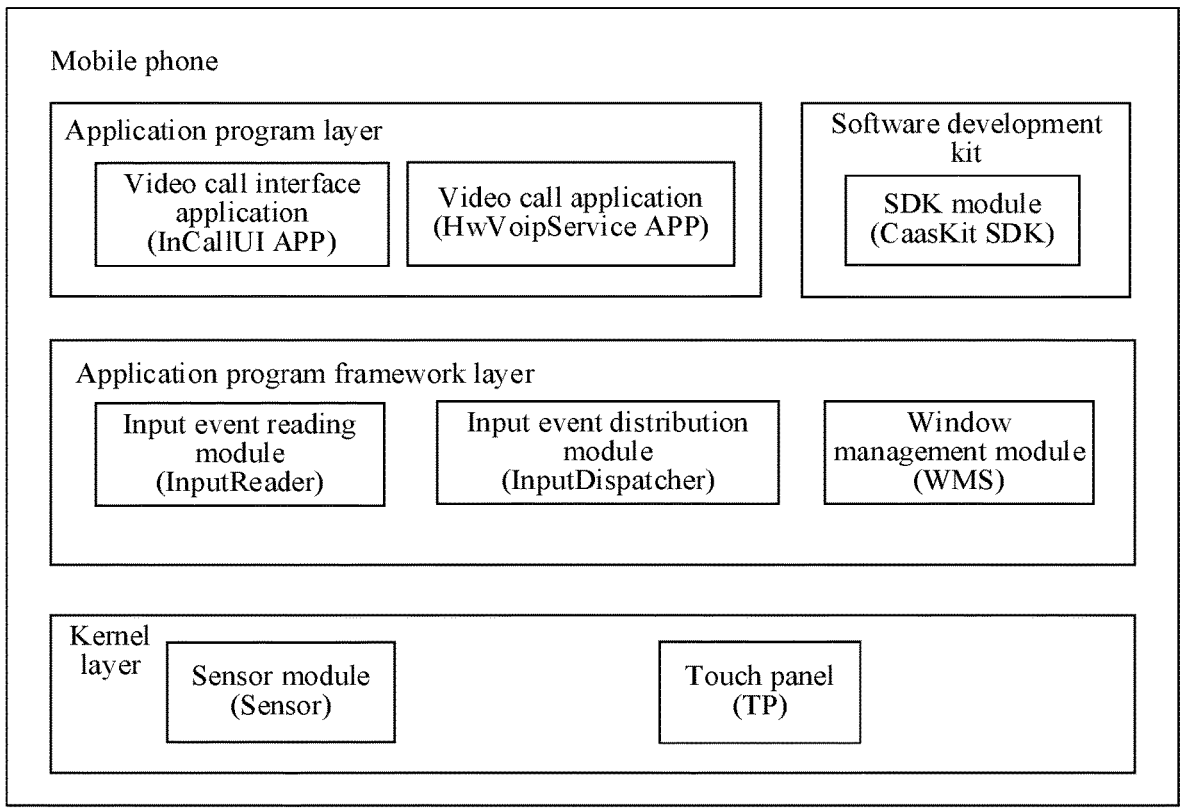
FIG. 3 is a block diagram of a software structure of a mobile phone according to an embodiment of this disclosure.

Refer to FIG. 3. FIG. 3 is a block diagram of a software structure of a mobile phone according to an embodiment of this disclosure.

In a layered architecture, software may be divided into several layers, and each of the layers has a clear function and task. Layers communicate with each other through software interfaces. In some embodiments, a system of the mobile phone is divided into three layers, an application program layer, an application program framework layer, and a kernel layer from top to bottom. In addition, the system further includes a software development kit (SDK).

The kernel layer includes a sensor module and a touch panel. The sensor module may be, for example, the foregoing pressure sensor 180A, and is configured to generate a trigger operation electronic signal based on a physical trigger operation (for example, a single-tap operation of a user) of the user on the touch panel. The trigger operation electronic signal may include single-tap input event information corresponding to the single-tap operation of the user. The trigger operation electronic signal may further include operation area information of a position at which the user performs the single-tap operation, for example, position coordinate information.

The application program framework layer provides an application programming interface (API) and a programming framework for an application program at the application program layer. The application program framework layer includes some predefined functions.

The application program framework layer includes an input event reading module, an input event distribution module, and a window management module. The input event reading module may be, for example, an InputReader. The input event distribution module may be, for example, an InputDispatcher. The window management module may be, for example, a window manager service (WMS).

The InputReader is configured to receive an electronic signal of the trigger operation sent by the pressure sensor 180A, continuously extract an event from an EventHub (not shown in the figure) through a thread cycle, and perform event translation to determine an input event, and encapsulate the input event and send the encapsulated input event to the InputDispatcher.

The InputDispatcher stores information from all windows of the WMS. After receiving the input event from the InputReader, the InputDispatcher searches for a proper window in the stored windows to distribute the event. In embodiments of this disclosure, the InputDispatcher mainly distributes the input event to an InCallUI application (APP) at the application program layer when the mobile phone serves as a recipient, to trigger a further operation of the InCallUI APP.

The WMS is configured to manage a window program. The WMS can obtain a size of a display screen of the mobile phone, and provide a window position. The inputdispachter is enabled to correctly distribute the input event to a specified window.

The application program layer may include a series of application programs, for example, include a video call interface application and a video call application. The video call interface application may be, for example, the InCallUI APP. The video call application may be, for example, a VoipService APP or an HwVoipService APP.

The InCallUI APP is responsible for receiving the input event sent from the inputdispachter, and identifying and determining the input event. In addition, when the mobile phone serves as an initiator device, the InCallUI APP is further responsible for validity of the input event and parsing the application information of an application corresponding to the input event.

An application interface provided by the InCallUI APP includes some function controls. The function controls are displayed in a form of a touch control on a screen, and may be displayed according to different scenarios in which the application is located. In embodiments of this disclosure, the function controls may include one or more of controls such as "video call", "screen sharing", "interconnecting", and "graffiti". Content of the function control displayed on the screen includes an icon and/or a text.

For example, after a video call application is opened on the mobile phone and a video call application interface is displayed, a "video call" control is displayed on the mobile phone. If detecting a trigger operation performed by the user on the "video call" control, the mobile phone sets up a video call with a peer mobile phone.

After setting up a video call, the mobile phone displays a "screen sharing" control. If detecting a trigger operation performed by the user on the "screen sharing" control, the mobile phone sends a current screen as a shared screen to the peer mobile phone, with which performs a video call, for display.

After setting up screen sharing, the mobile phone displays an interconnection control. If the mobile phone detects a trigger operation performed by the user on the interconnection control, an interconnection mode is enabled between the mobile phone and the peer mobile phone that is in a video call and that performs screen sharing.

The InCallUI APP is further responsible for displaying and adapting a communication interface. For example, the InCallUI APP includes an interface switching entry of the foregoing service functions such as video calling, screen sharing, and interconnecting, so as to display a corresponding interface.

The HwVoipService APP is an application that supports a video call and screen sharing and that is provided in embodiments of this disclosure, and has a visualized user interface.

An HwVoipService is responsible for service logic control, including providing implementations of functions such as providing an audio call, a video call, a device discovery, a message service, and a service function switchover. Its capabilities are encapsulated into a service API for use by the InCallUI APP.

The HwVoipService APP is further responsible for interacting with the SDK.

The SDK includes an SDK module, and the SDK module may be, for example, a CaasKit SDK. The CaasKit SDK is responsible for sending a signaling, parsing the signaling, and interacting with the application program layer.

It should be noted that, the application program layer may further include application programs such as a Camera, a Gallery, a Phone, a Music, and a Video.

The application program framework layer may further include an activity manager service (AMS), a VIEW system, a content provider, a telephony manager, a resource manager, and the like. In addition, a Multicast Source Discovery Protocol (MSDP), an awareness service, a multipath access service, and the like may also be included. This is not limited in embodiments of this disclosure.

The AMS, the WMS, and the VIEW provide capability support for interconnection in embodiments of this disclosure. The AMS provides basic user interface (UX) interaction capability. The WMS is responsible for capability such as window area calculation and provides operation area information. The VIEW provides capability such as operation object monitoring. Based on a response or callback of a last application, the VIEW can capture operational behavior of a user, record an operation object, and provide information such as the operation object.

The MSDP awareness service and the multipath access service are basic components of the existing audio call and video call. The kernel layer is based on the existing audio call and video call, and is the same as that in the other approaches. Details are not described herein again.

The kernel layer is an underlying system. The underlying system further includes an underlying display system configured to provide a display service. For example, the underlying system may further include a surface manager, a media library, and the like. The surface manager is configured to manage the display system and provides a blend of two-dimensional (2D) and three-dimensional (3D) layers for a plurality of application programs. The media library supports playing and recording of multiple commonly used audio and video formats, static image files, and the like. The media library supports multiple audio and video encoding formats, such as MPEG4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The kernel layer is a layer between hardware and software. The kernel layer includes at least a display driver, a camera driver, an audio driver, and the like. This is not limited in embodiments of this disclosure. To be specific, the kernel layer mainly includes hard code and an MSDP virtualization device corresponding to the MSDP awareness service.

An internal working process of the system, based on the software structure shown in FIG. 3, of the mobile phone 100 and the mobile phone 200 will be described in detail below.

The following first describes an application scenario of the enhanced screen sharing method and an interaction process between devices.

A process of setting up a video call between the mobile phone 100 and the mobile phone 200 is as follows.

Figure 4A:
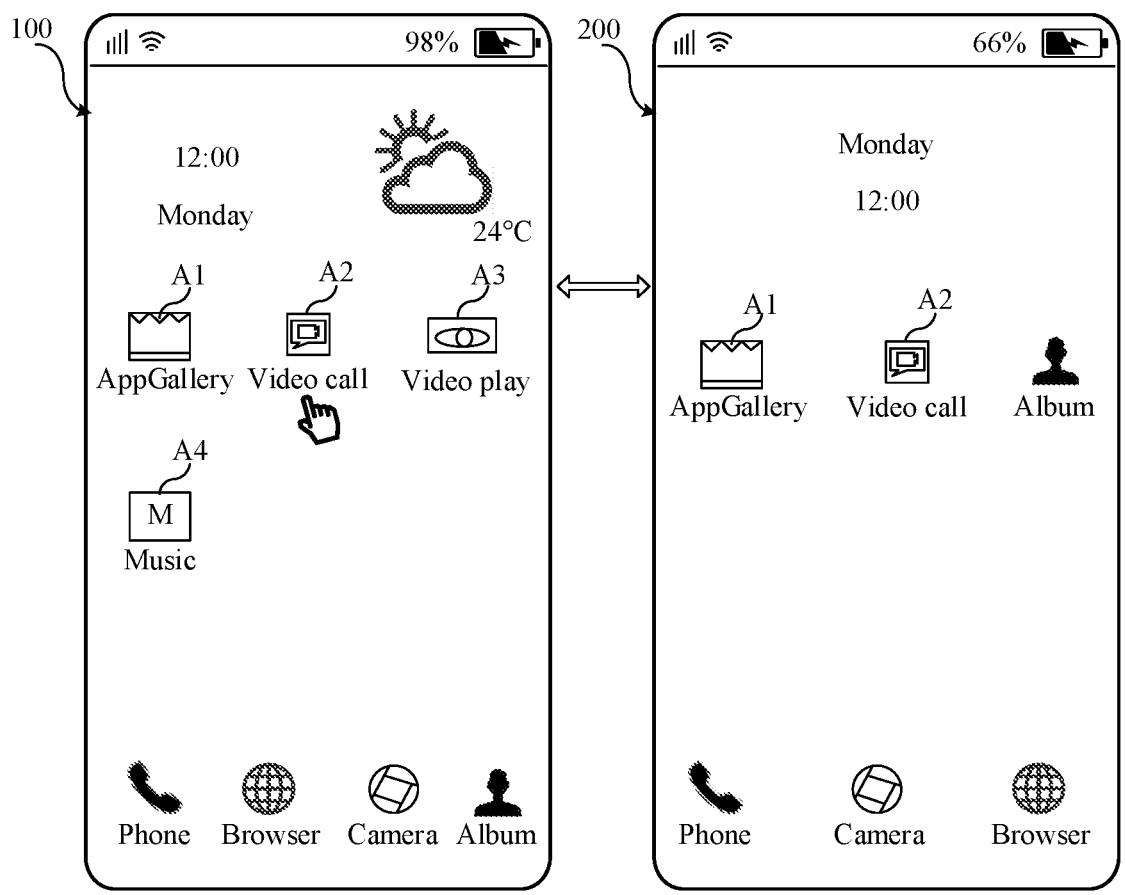
FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, FIG. 4N, FIG. 4O, FIG. 4P, FIG. 4Q, FIG. 4R, FIG. 4S, and FIG. 4T are schematic diagrams of some interfaces of interaction between a mobile phone and another mobile phone according to an embodiment of this disclosure.

Refer to FIG. 4A. In an implementation of embodiments of this disclosure, each of the mobile phone 100 and the mobile phone 200 has only one physical screen, and respective home screens are displayed on the screens (as shown in FIG. 4A). Application names and application icons of applications such as an AppGallery application A1, a video call application A2, a video play application A3, and a music application A4 are displayed on a home screen of the mobile phone 100. Application names and application icons of applications such as an AppGallery application A1 and a video call application A2 are displayed on a home screen of the mobile phone 200.

Still refer to FIG. 4A. If the mobile phone 100 detects a single-tap operation performed by a user U1 on the video call application A2 on the mobile phone 100, the video call application A2 is opened on the mobile phone 100, and the mobile phone 200 displays a contact selection interface shown in FIG. 4B.

Figure 4B:
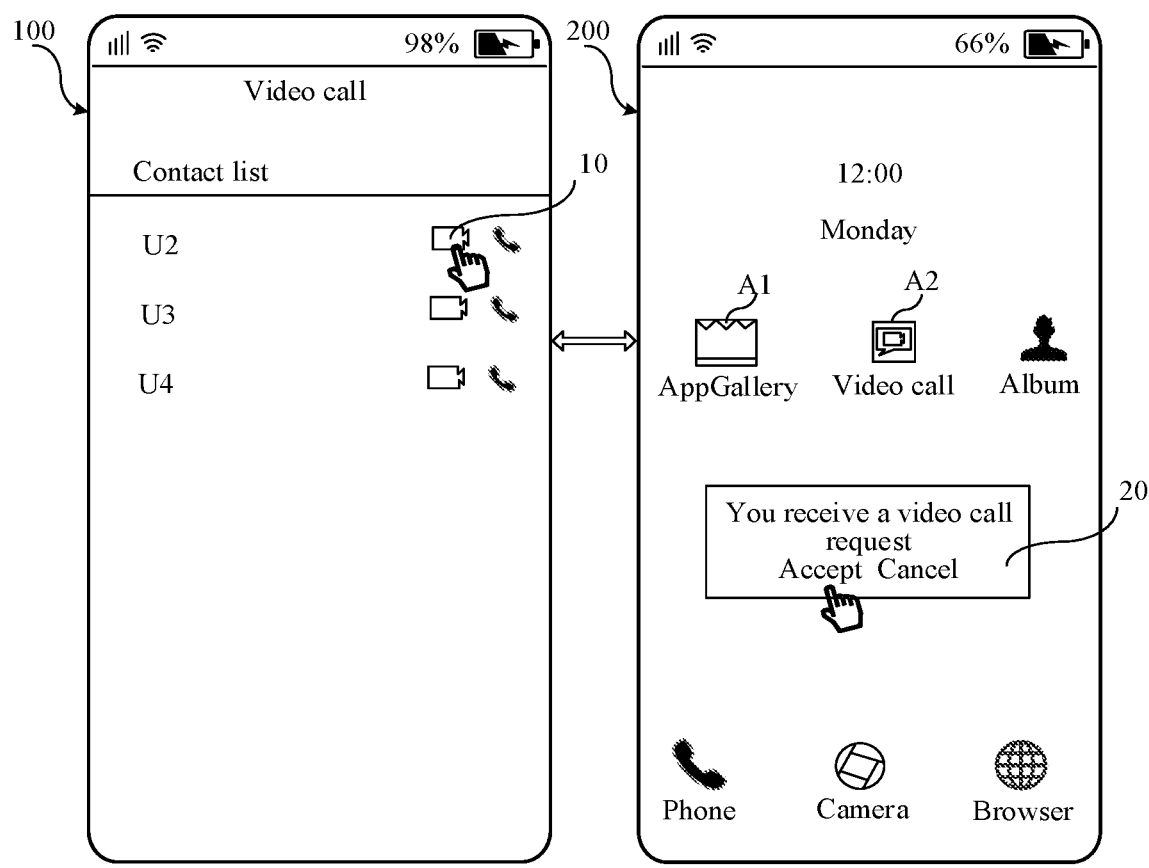

Still refer to FIG. 4B. If detecting a single-tap operation performed by the user U1 on a video call control 10 corresponding to a "user U2" in the contact list, the mobile phone 100 does make a video call. The mobile phone 100 sends a video call request to the mobile phone 200, a device corresponding to the user U2, to request to set up a video call.

Still refer to FIG. 4B. After receiving the video call request sent by the mobile phone 100, the mobile phone 200 displays prompt information 20 "you receive a video call request". If detecting a single-tap operation performed by the user U2 on an "accept" control, the mobile phone 200 sends a video call setup response to the mobile phone 100.

Figure 4C:
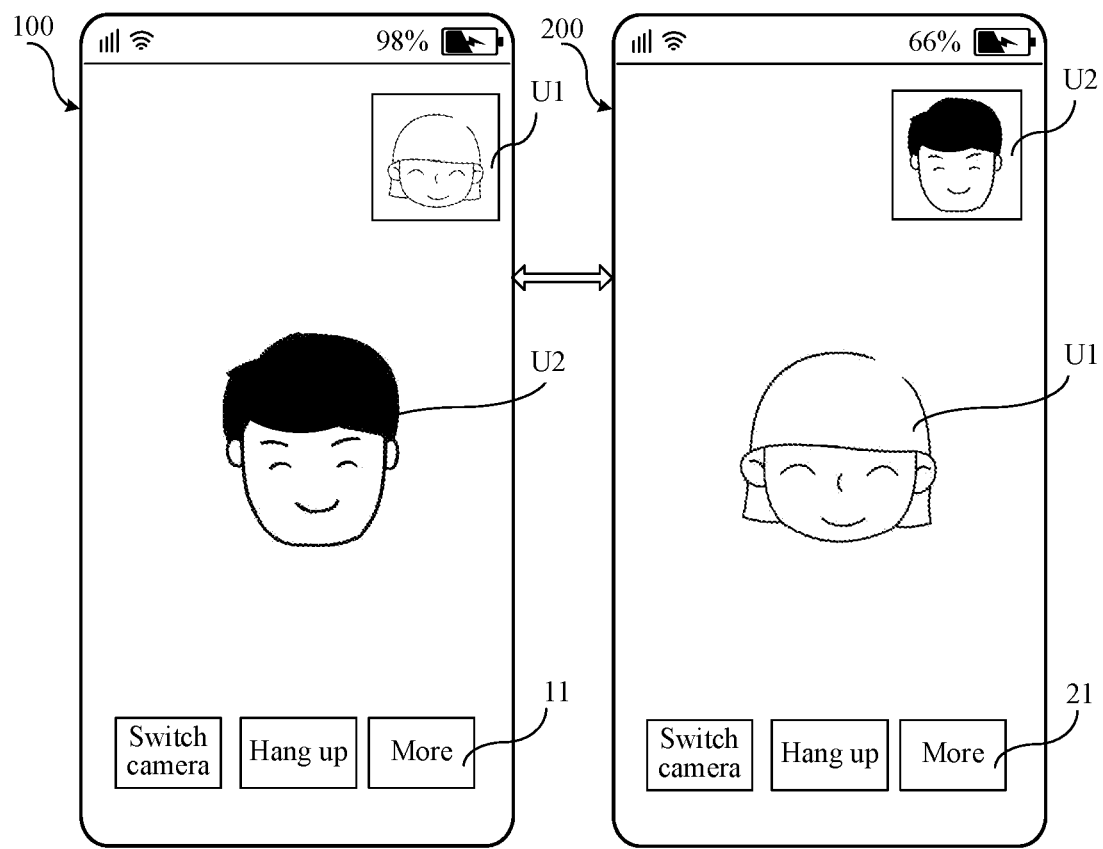

Refer to FIG. 4C. After the mobile phone 100 receives the video call setup response sent by the mobile phone 200, a video call is set up between the mobile phone 100 and the mobile phone 200. In addition, the mobile phone 100 and the mobile phone 200 each display a video call interface.

The mobile phone 100 usually displays, by default, a video call image of the user U1 (for example, a video call image shown in a female avatar) in an upper right corner of the screen, and displays a video call image of the user U2 (for example, a video call image shown in a male avatar) in a main area of the screen. In addition, a "more" control 11, a "switch camera" control, and a "hang up" control are displayed at a lower part of the screen of the mobile phone 100. Certainly, the mobile phone 100 may alternatively display other controls.

Correspondingly, the mobile phone 200 displays the video call image of the user U2 in an upper right corner of the screen, and displays the video call image of the user U1 in a main area of the screen. In addition, a "more" control 21, a "switch camera" control, and a "hang up" control are displayed at a lower part of the screen of the mobile phone 200.

A process of screen sharing between the mobile phone 100 and the mobile phone 200 is as follows.

Figure 4D:
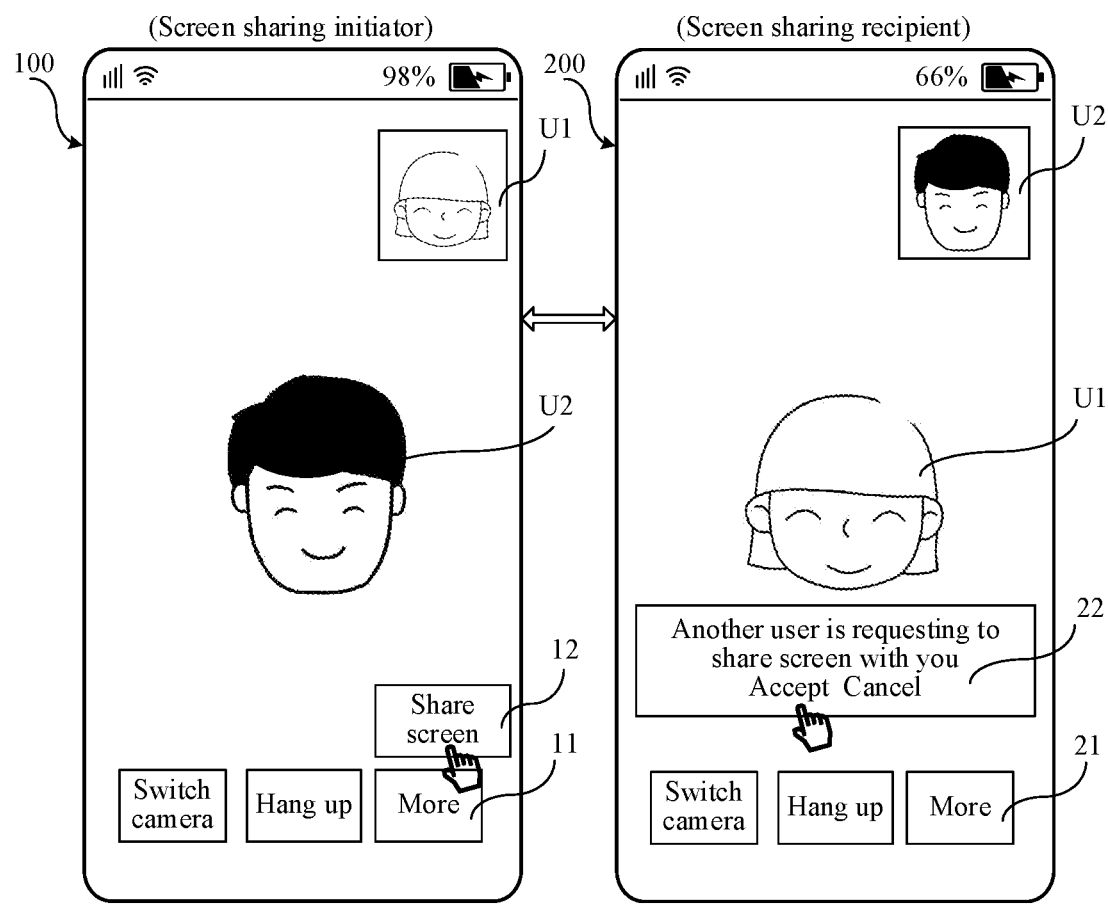

Refer to FIG. 4D. If detecting a single-tap operation performed by the user U1 on the "more" control 11, the mobile phone 100 displays a "share screen" control 12. If detecting a single-tap operation performed by the user U1 on the "share screen" control 12, the mobile phone 100 sends a screen sharing request to the mobile phone 200.

Still refer to FIG. 4D. After receiving the screen sharing request sent by the mobile phone 100, the mobile phone 200 displays prompt information 22 "another user is requesting to share screen with you". If detecting a single-tap operation performed by the user U2 on an "accept" control, the mobile phone 200 sends a response, to the mobile phone 100, indicating that the screen sharing is agreed.

In an implementation of this disclosure, a first shared interface and a second shared interface may be the same, and are collectively referred to as a shared interface.

Figure 4E:
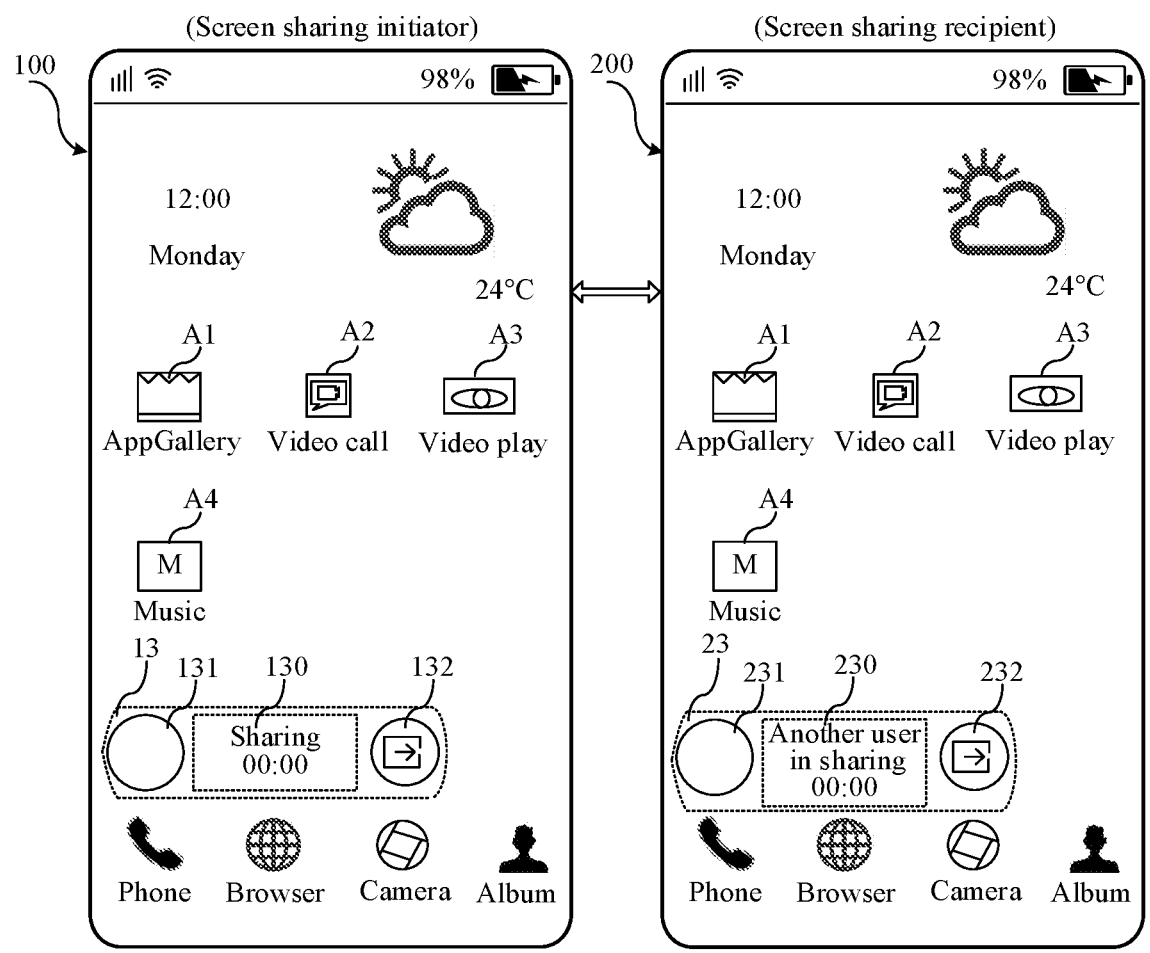

Refer to FIG. 4E. After receiving the response that is sent by the mobile phone 200 and that indicates that the screen sharing is agreed, the mobile phone 100 enables a screen sharing mode for the mobile phone 200 to share the screen. The video call application A2 in the mobile phone 100 is automatically switched to running in a background, and the mobile phone 100 displays the home screen of the mobile phone 100. The mobile phone 100 sends the home screen interface of the mobile phone 100 as a shared interface to the mobile phone 200. Correspondingly, the video call application A2 in the mobile phone 200 is also automatically switched to running in the background, and the mobile phone 200 displays the shared interface sent by the mobile phone 100.

The mobile phone 100 serves as a screen sharing initiator, and the mobile phone 200 serves as a screen sharing recipient.

In addition, the mobile phone 100 further displays an initiator side sharing controlling control 13. In an implementation of embodiments of this disclosure, the initiator side sharing controlling control 13 includes sharing prompt information 130, an interconnection control 131, and a sharing exit control 132.

The sharing prompt information 130 includes screen sharing state prompt information "sharing" and duration information "00:00" for which the screen has been shared. The sharing duration information displays a corresponding value in real time based on a duration for which the screen has been shared between the mobile phone 100 and the mobile phone 200. The mobile phone 100 may enable or disable an interconnection mode between the mobile phone 100 and the mobile phone 200 based on a detected single-tap operation performed by the user U1 on the interconnection control 131. The mobile phone 100 may exit the screen sharing mode and the interconnection mode between the mobile phone 100 and the mobile phone 200 based on a detected single-tap operation performed by the user U1 on the sharing exit control 132. After the mobile phone 100 and the mobile phone 200 exit the screen sharing mode, the mobile phone 100 and the mobile phone 200 may display the video call interface shown in FIG. 4C.

In addition, the interface of the mobile phone 200 displays a recipient side sharing controlling control 23. The recipient side sharing controlling control 23 includes sharing prompt information 230, an interconnection control 231, and a sharing exit control 232.

The sharing prompt information 230 includes sharing state prompt information "another user in sharing" and duration information "00:00" for which the screen has been shared. The sharing duration information displays a corresponding value in real time based on a duration of screen sharing between the mobile phone 100 and the mobile phone 200. The mobile phone 200 may enable or disable the interconnection mode between the mobile phone 100 and the mobile phone 200 based on a detected single-tap operation performed by the user U2 on the interconnection control 231. The mobile phone 200 may exit the screen sharing mode and the interconnection mode between the mobile phone 100 and the mobile phone 200 based on a detected single-tap operation performed by the user U2 on the sharing exit control 232.

It should be noted that, trigger states of the initiator side sharing controlling control 13 of the mobile phone 100 and the recipient side sharing controlling control 23 of the mobile phone 200 are synchronized with each other. To be specific, either of the mobile phone 100 and the mobile phone 200 may start and end the interconnection mode based on a tap operation performed by a corresponding user on the control. For example, if the mobile phone 100 detects the single-tap operation performed by the user U1 on the interconnection control 131, the interconnection mode is enabled between the mobile phone 100 and the mobile phone 200. Then, if the mobile phone 200 detects the single-tap operation performed by the user U2 on the interconnection control 231, the interconnection mode is disabled between the mobile phone 100 and the mobile phone 200, and the mobile phone 200 ends interconnection for the mobile phone 100.

Figure 4F:
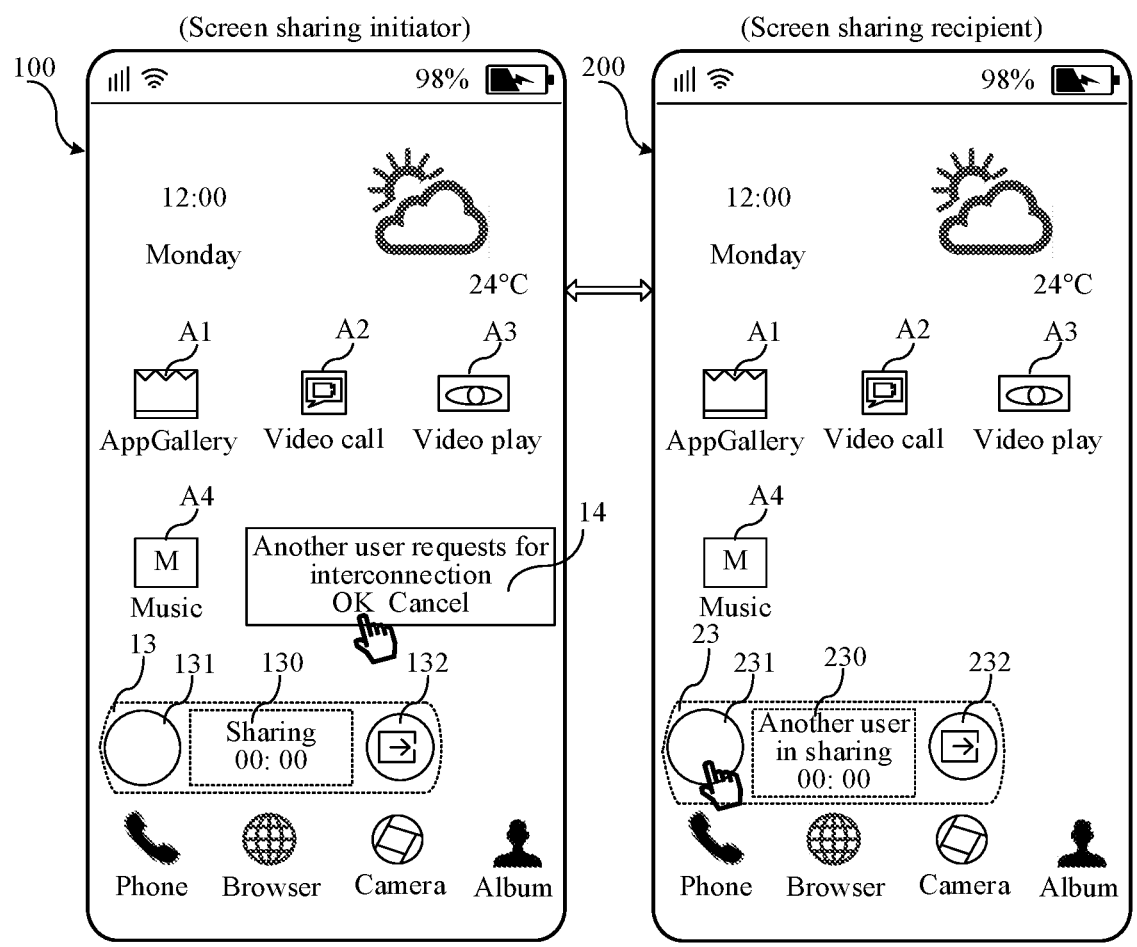

Refer to FIG. 4F. In an implementation of embodiments of this disclosure, if detecting the single-tap operation performed by the user U2 on the interconnection control 231, the mobile phone 200 sends an interconnection request to the mobile phone 100. After receiving the interconnection request, the mobile phone 100 displays prompt information 14 "another user requests for interconnection". If detecting a single-tap operation performed by the user U1 on the "OK" control that serves as the interconnection determining control, the mobile phone 100 sends a response, to the mobile phone 200, indicating that the interconnection is agreed.

After the mobile phone 200 receives the response, sent by the mobile phone 100, indicating that the interconnection is agreed, the interconnection mode is enabled between the mobile phone 100 and the mobile phone 200.

Figure 4G:
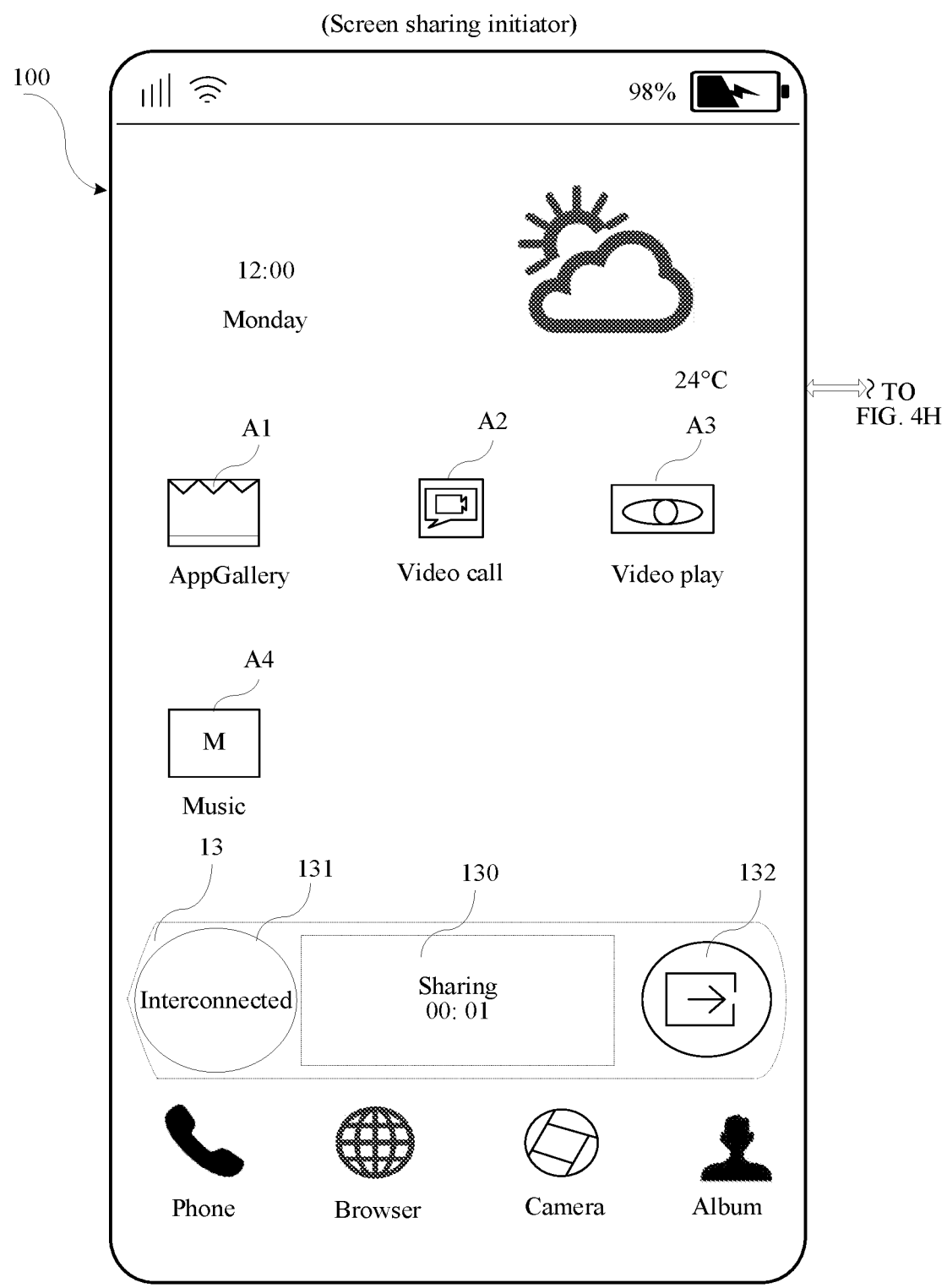
Figure 4H:
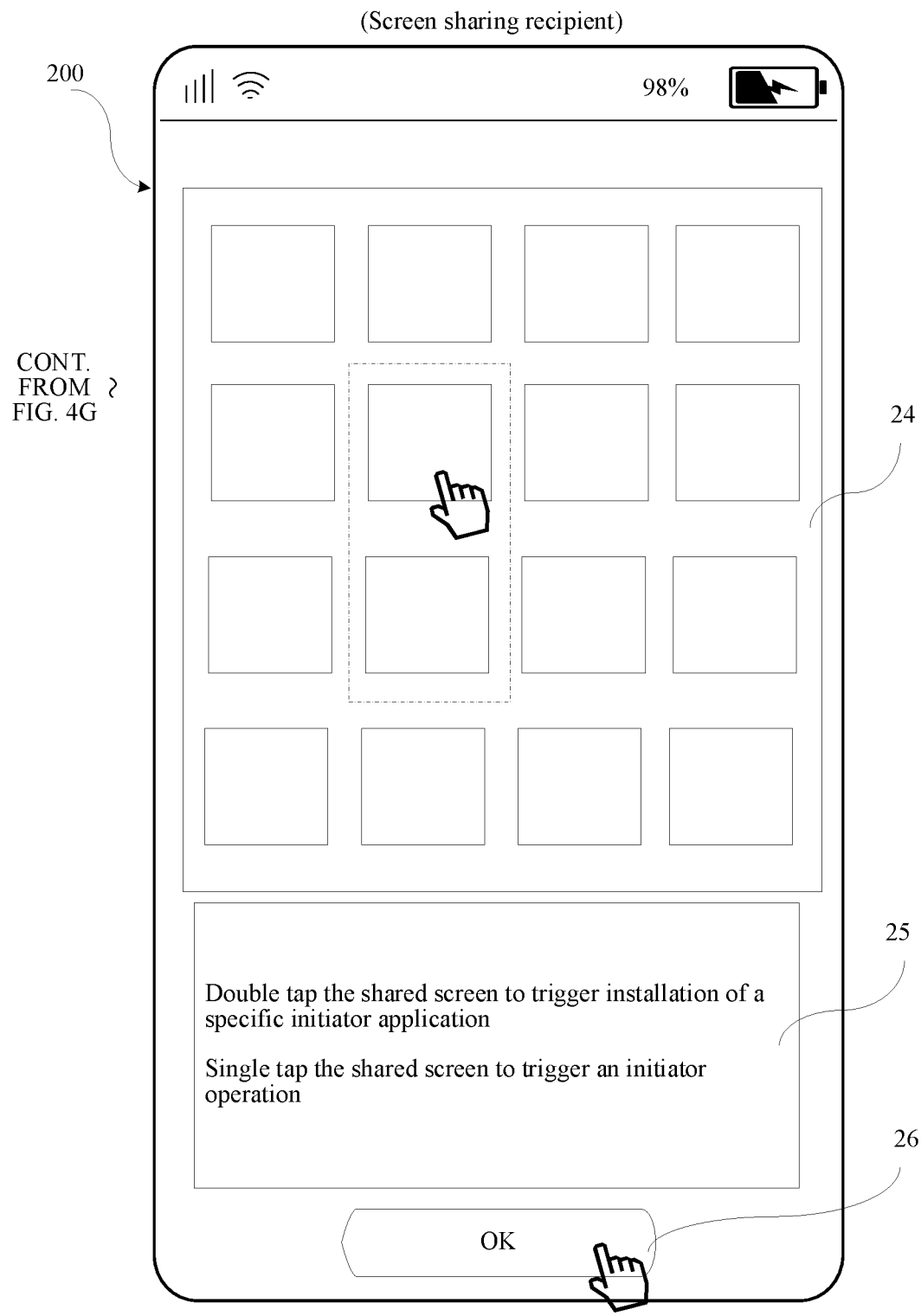

Refer to FIG. 4G and FIG. 4H. After the interconnection mode is enabled between the mobile phone 100 and the mobile phone 200, the interconnection control 131 of the mobile phone 100 may display a text "interconnected", to remind the user U1 that the interconnection mode has been enabled between the mobile phone 100 and the mobile phone 200 currently.

If detecting the single-tap operation performed by the user U2 on the interconnection control 231 for the first time, the mobile phone 200 displays interconnection operation prompt information.

Still refer to FIG. 4G and FIG. 4H. The interconnection operation prompt information displayed by the mobile phone 200 includes operation introduction graphic information 24, description information 25, and a confirmation control 26. The operation introduction graphic information 24 includes a plurality of schematic areas, and indicates that the user may complete corresponding interconnection on the mobile phone 100 by single tapping a corresponding area. The description information 25 is "double tap the shared screen to trigger installation of a specific initiator application, single tap the shared screen to trigger an initiator operation". The confirmation control 26 may display "OK".

The interconnection operation prompt information may also include only the operation introduction graphic information 24 and the confirmation control 26, or include only the description information 25 and the confirmation control 26. Certainly, the interconnection operation prompt information may alternatively be other information used to explain a function of the interconnection mode to the user.

Figure 4I:
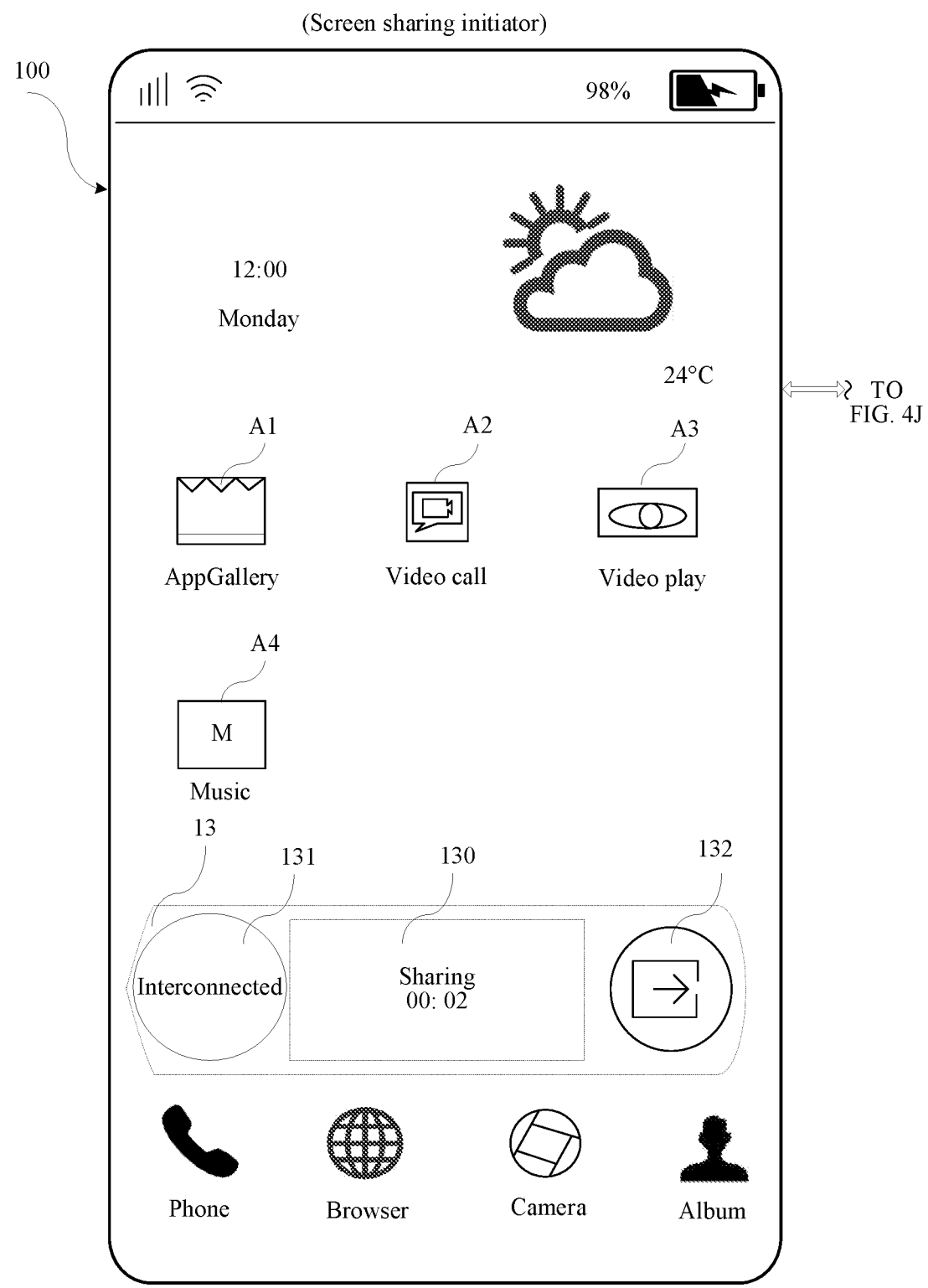
Figure 4J:
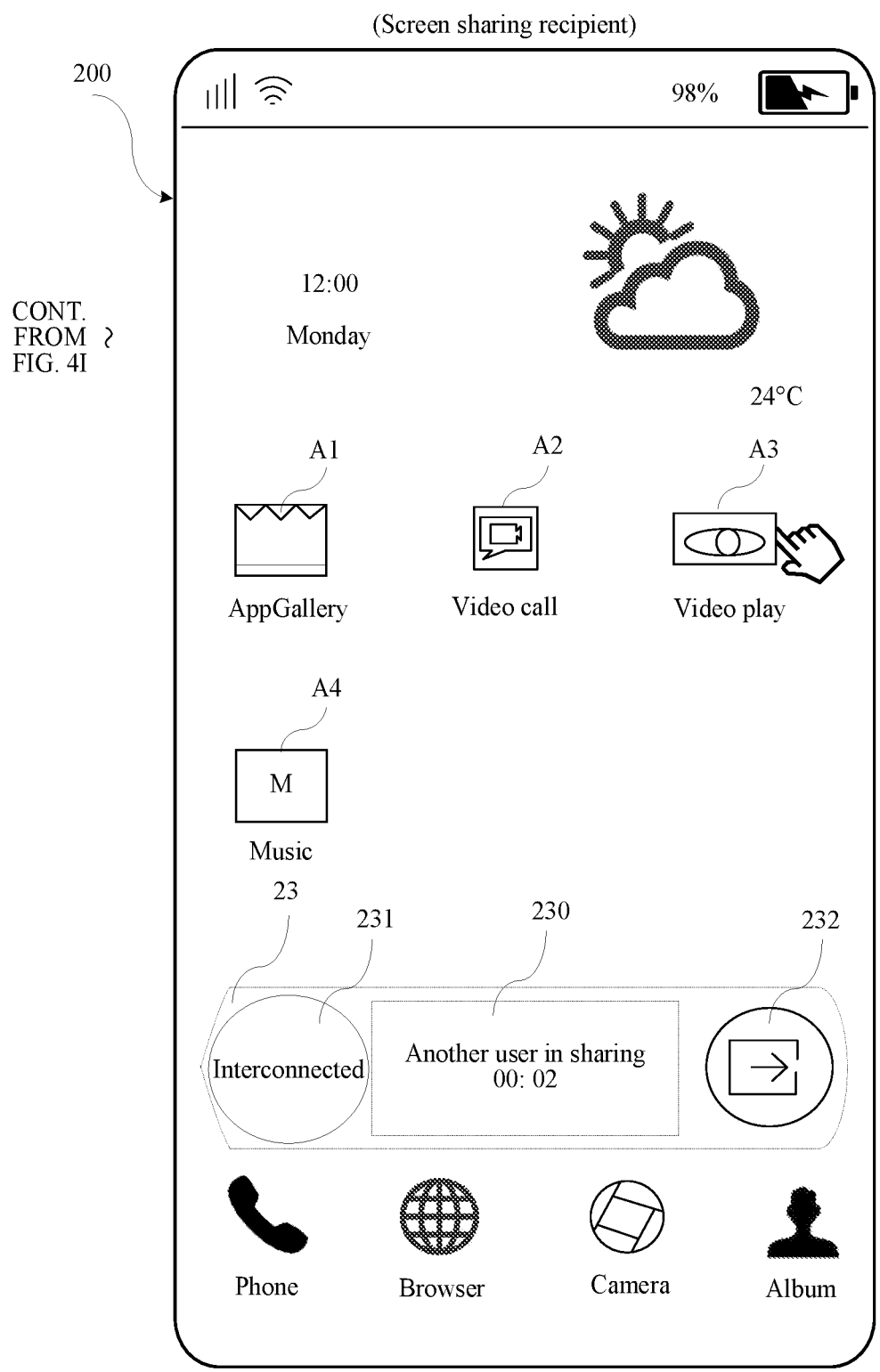

If detecting a single-tap operation performed by the user on the confirmation control 26, the mobile phone 200 displays an interface shown in FIG. 4J. The interconnection control 231 also displays a text "interconnected", to remind the user U2 that the mobile phone 200 and the mobile phone 100 are currently in the interconnection mode.

If detecting the single-tap operation performed by the user U2 on the interconnection control 231 not for the first time (for example, for the second time or the third time), the mobile phone 200 may display the interface shown in FIG. 4J. To be specific, the interconnection control 231 directly displays the text "interconnected" without displaying an operation description interface shown in FIG. 4H.

In embodiments of this disclosure, the mobile phone 200 may display the interconnection operation prompt information when detecting, for the first time, the single-tap operation performed by the user U2 on the interconnection control 231, to remind the user how to perform an interconnection operation between the mobile phone 200 and the mobile phone 100. This can effectively improve user experience. Certainly, the mobile phone 200 may also periodically display interconnection operation prompt information, or display the interconnection operation prompt information based on another requirement or a trigger operation of the user.

Still refer to FIG. 4I and FIG. 4J. If detecting a double-tap operation performed by the user U2 on the application icon or the application name of the video play application A3 on the shared interface, the mobile phone 200 determines that an event type input by the user is a double-tap input event. The mobile phone 200 generates the event information based on a position coordinate information and the event type of the position at which the user U2 performs the double-tap operation. In other words, the event information includes the event type (a double-tap input) and the position coordinate information at which the user performs the double-tap operation. The mobile phone 200 sends the event information to the mobile phone 100.

After receiving the event information, the mobile phone 100 determines, based on the event type, that an operation type of an operation that needs to be performed by the mobile phone 100 is an application determining operation. Then, the mobile phone 100 determines, based on the position coordinate information, an application name "video play application A3" of an application corresponding to the position at which the user U2 performs the double-tap operation on the shared interface. In addition, the mobile phone 100 determines, based on the operation type, that after the mobile phone 200 receives event response information, a type of an operation that needs to be performed is an application download and installation operation. In this case, the mobile phone 100 sends the application name "video play application A3" and the operation type "application download and installation" as event response information to the mobile phone 200.

After receiving the event response information sent by the mobile phone 100, the mobile phone 200 determines, based on the operation type and the application name, that the video play application A3 needs to be downloaded and installed. The mobile phone 200 further determines whether the video play application A3 is currently installed in the mobile phone 200.

If the video play application A3 is already installed in the mobile phone 200, the mobile phone 200 does not perform an operation of downloading and installing the video play application A3. Alternatively, the mobile phone 200 may display prompt information "video play application A3 is currently installed, please confirm" (not shown in the figure), to notify the user U2 that the video play application A3 is currently installed in the mobile phone 200.

If the video play application A3 is not installed in the mobile phone 200, the mobile phone 200 searches for and downloads a corresponding video play application A3 from the AppGallery application A1 in the mobile phone 200, and completes installation of the video play application A3.

Figure 4K:
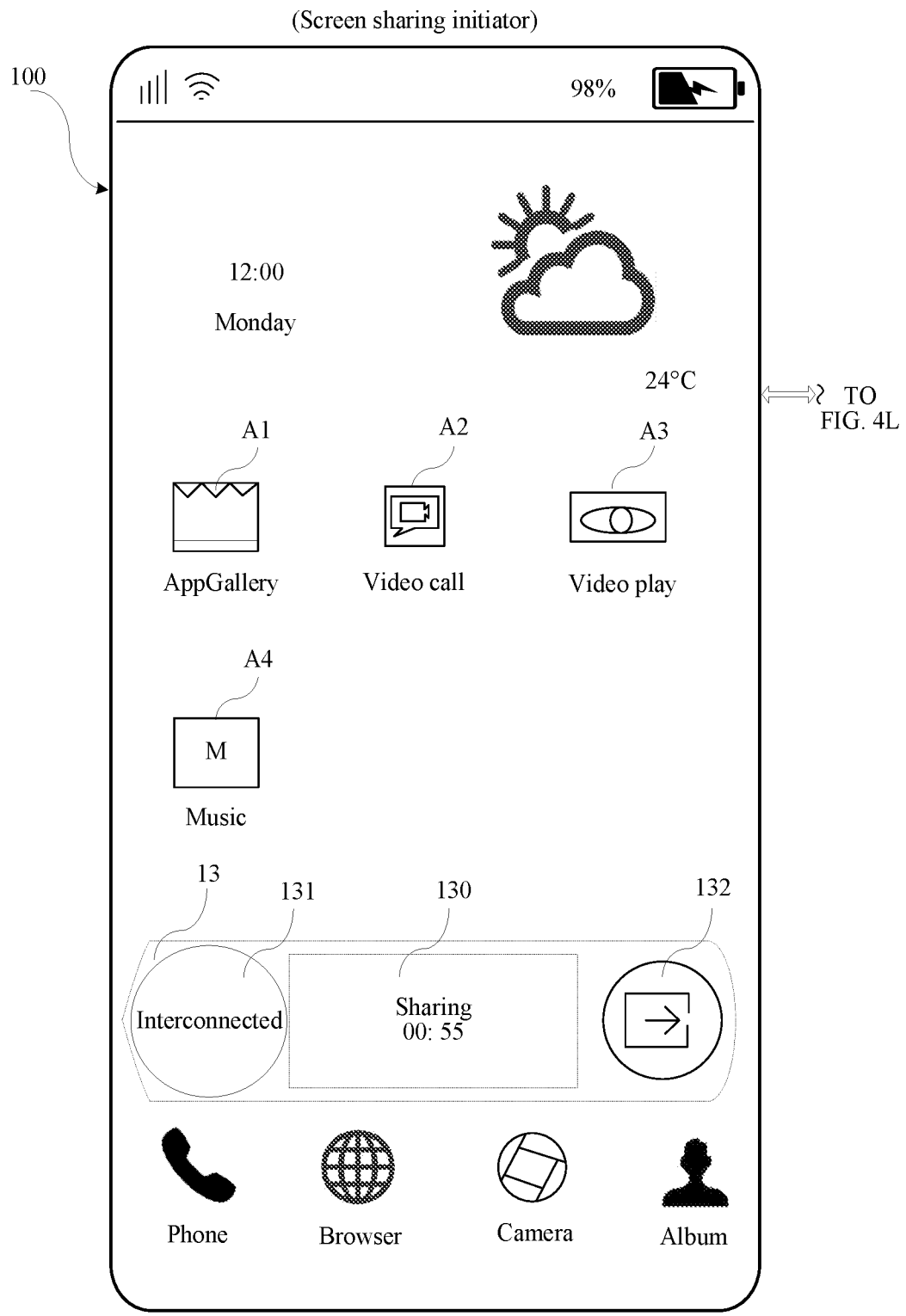
Figure 4L:
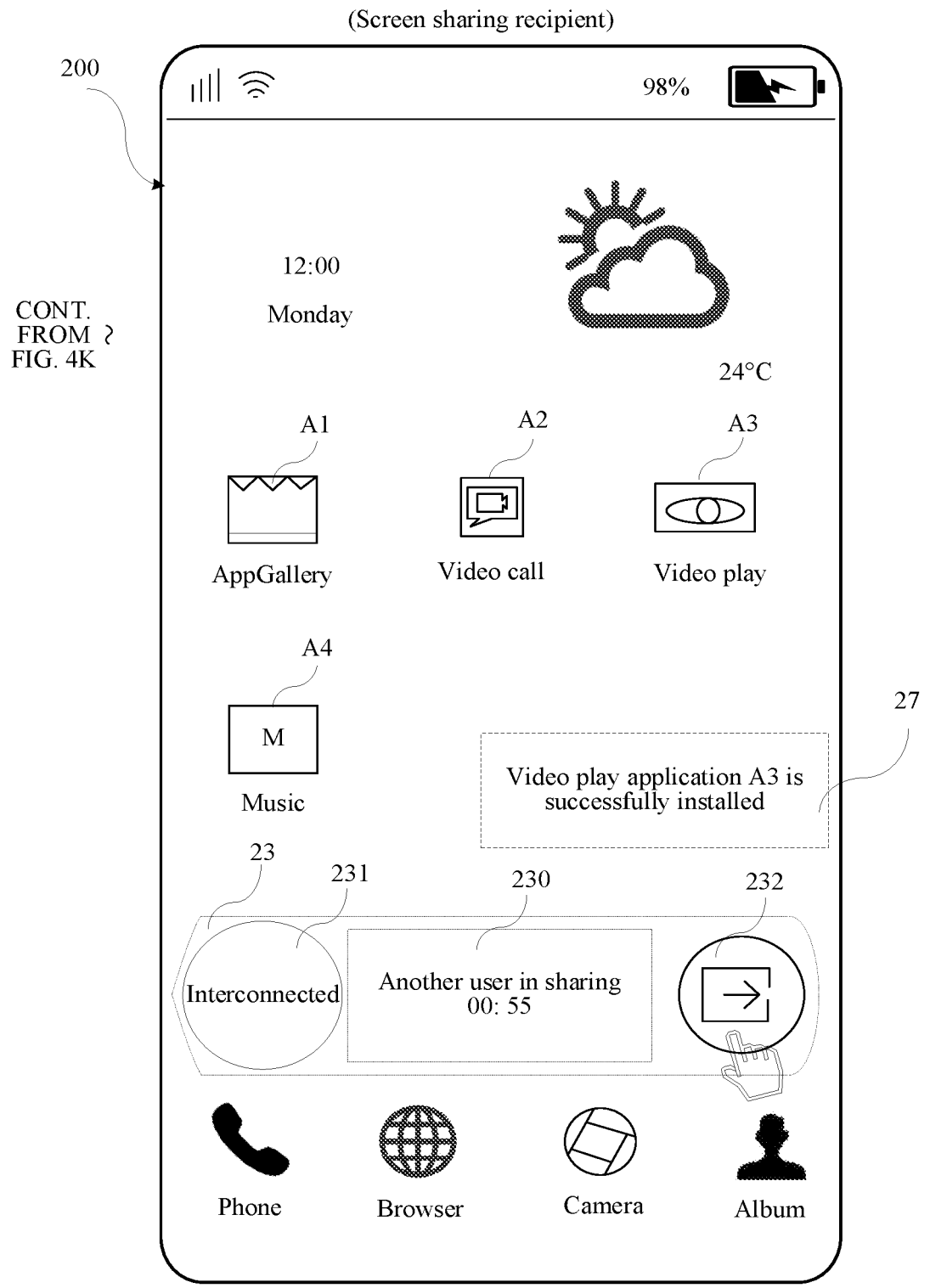

Refer to FIG. 4K and FIG. 4L. After completing the installation of the video play application A3, the mobile phone 200 may display prompt information 27 "video play application A3 is successfully installed", so as to remind the user U2. Certainly, in a process of downloading an application by the mobile phone 200, the prompt information 27 may display "application is being downloaded" or the like, so as to remind the user U2. This may be set as required.

Still refer to FIG. 4K and FIG. 4L. After the video play application A3 is installed in the mobile phone 200, if the mobile phone 200 detects a single-tap operation performed by the user U2 on the sharing exit control 232, the mobile phone 200 and the mobile phone 100 end the interconnection mode and the screen sharing mode, and exit the shared interface.

Figure 4M:
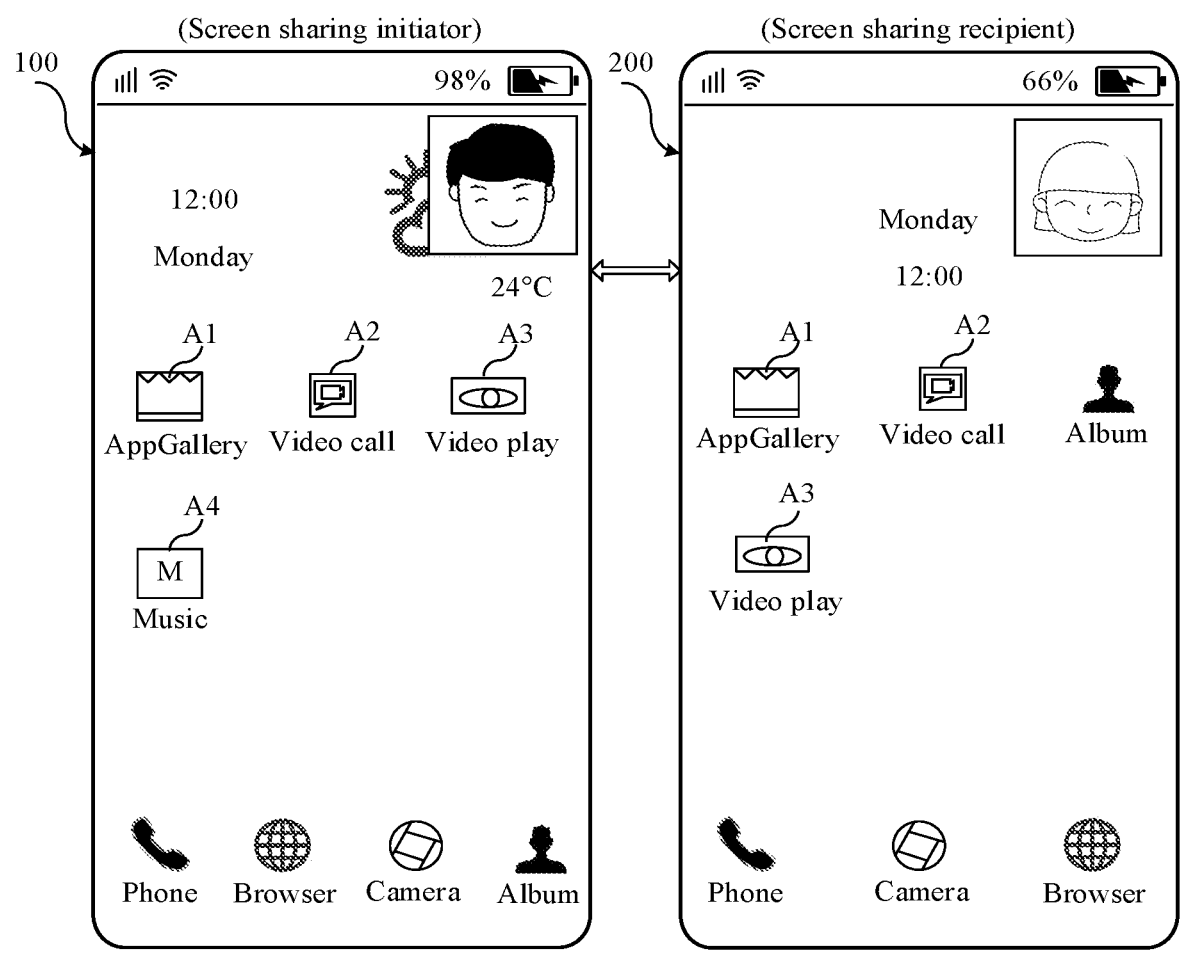

Refer to FIG. 4M. After ending the interconnection mode and the screen sharing mode with the mobile phone 100, the mobile phone 200 may directly display the home screen of the mobile phone 200. In this case, the home screen includes the application icon and the application name of the video play application A3 installed in the mobile phone 200. In addition, an upper right of the screen of the mobile phone 200 may further display the video call image of the user U1.

In addition, after ending the interconnection mode and the screen sharing mode, the mobile phone 100 displays the home screen of the mobile phone 100. In addition, the mobile phone 100 may further display the video call image of the user U2 on an upper right of the screen.

In this implementation, the interconnection mode is enabled between the mobile phone 200 and the mobile phone 100. The mobile phone 200 may perform interconnection with the mobile phone 100 by a received double-tap operation performed by the user U2 on an application on the shared interface, and obtain an application name of the application by the mobile phone 100. In addition, an application corresponding to a position at which the user performs the double-tap operation is conveniently installed. This enriches interaction types between the mobile phone 200 and the mobile phone 100, and improves user experience.

In another implementation of embodiments of this disclosure, the mobile phone 100 and the mobile phone 200 enable the interconnection mode. After the interface shown in FIG. 4E is displayed, if detecting the single-tap operation performed by the user U2 on the interconnection control 231, the mobile phone 200 may alternatively not need to send an interconnection request to the mobile phone 100. The interconnection mode may be automatically and directly enabled between the mobile phone 200 and the mobile phone 100, and the interface shown in FIG. 4H is displayed.

In another implementation of embodiments of this disclosure, in a process in which the mobile phone 200 searches for, downloads, and installs the video call application A3, the mobile phone 200 may not display the prompt information 27 shown in FIG. 4L. This may be set as required.

It should be noted that, the AppGallery applications respectively installed in the mobile phone 100 and the mobile phone 200 may be a same AppGallery application A1, or may be different applications that provide an application download function.

Figure 4N:
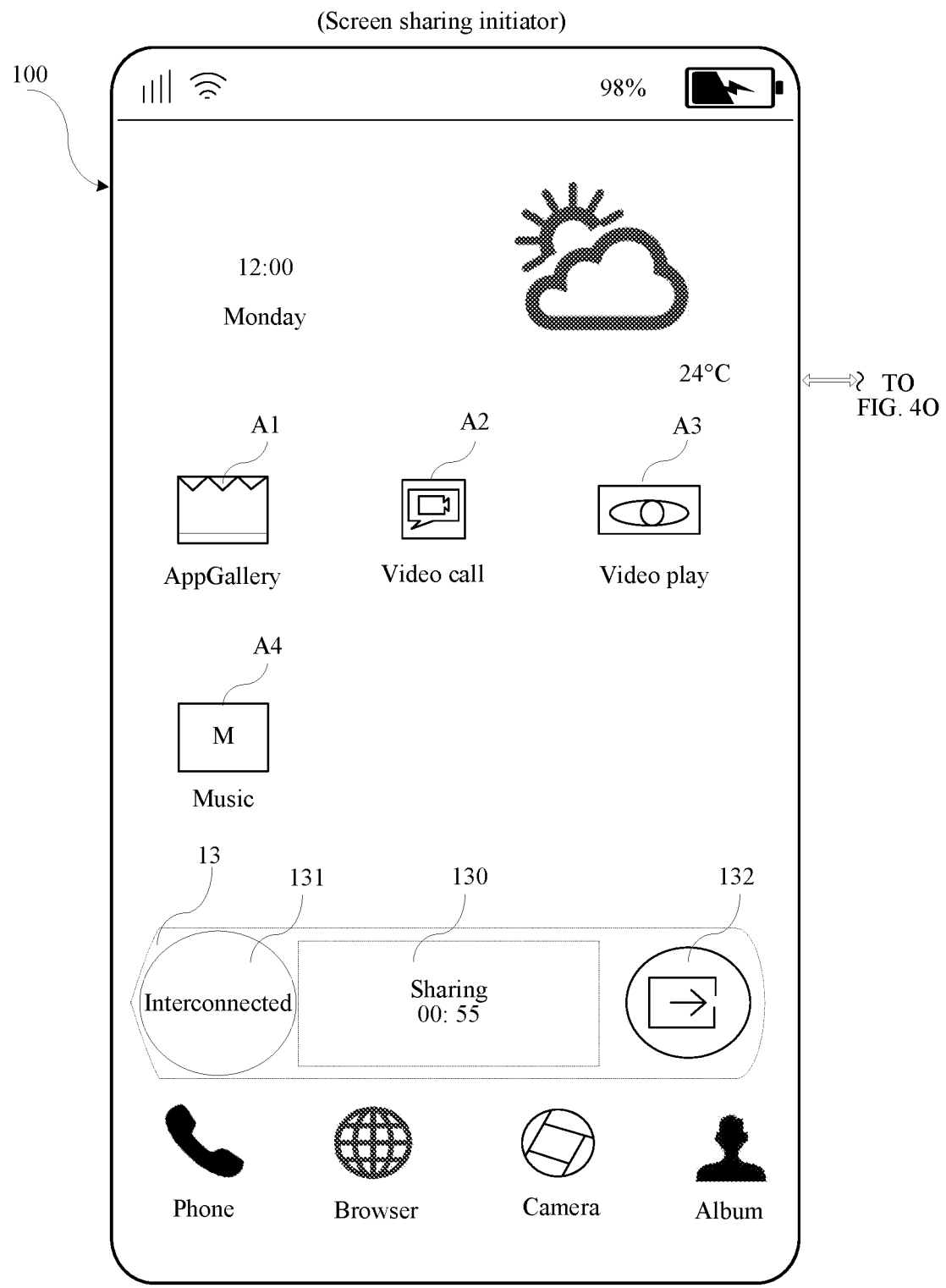
Figure 4O:
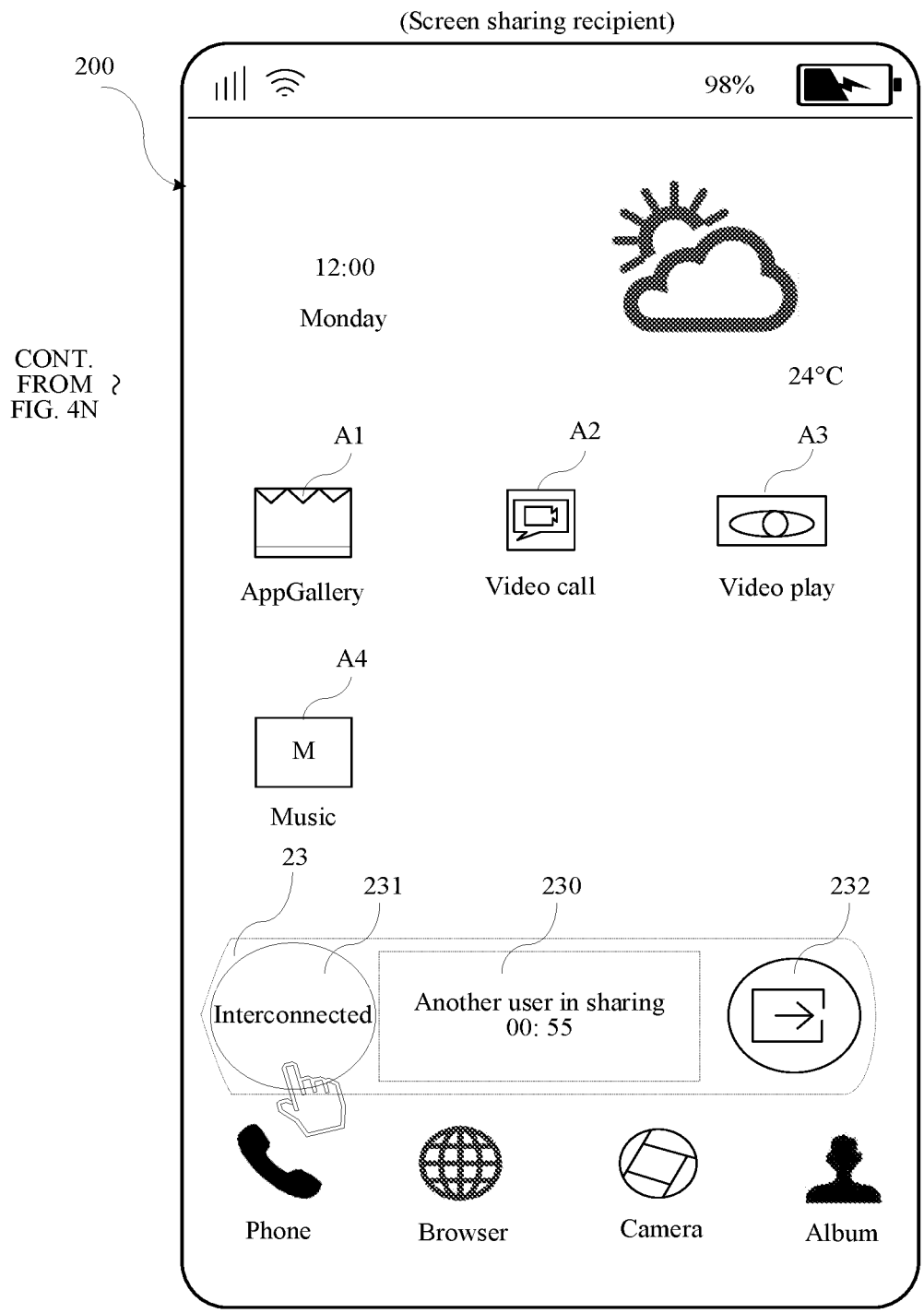

Refer to FIG. 4N and FIG. 4O. In another implementation of embodiments of this disclosure, if the mobile phone 200 enables the interconnection mode with the mobile phone 100 and if the mobile phone 200 detects again the single-tap operation performed by the user on the interconnection control 231, the mobile phone 200 and the mobile phone 100 exit the interconnection mode.

Figure 4P:
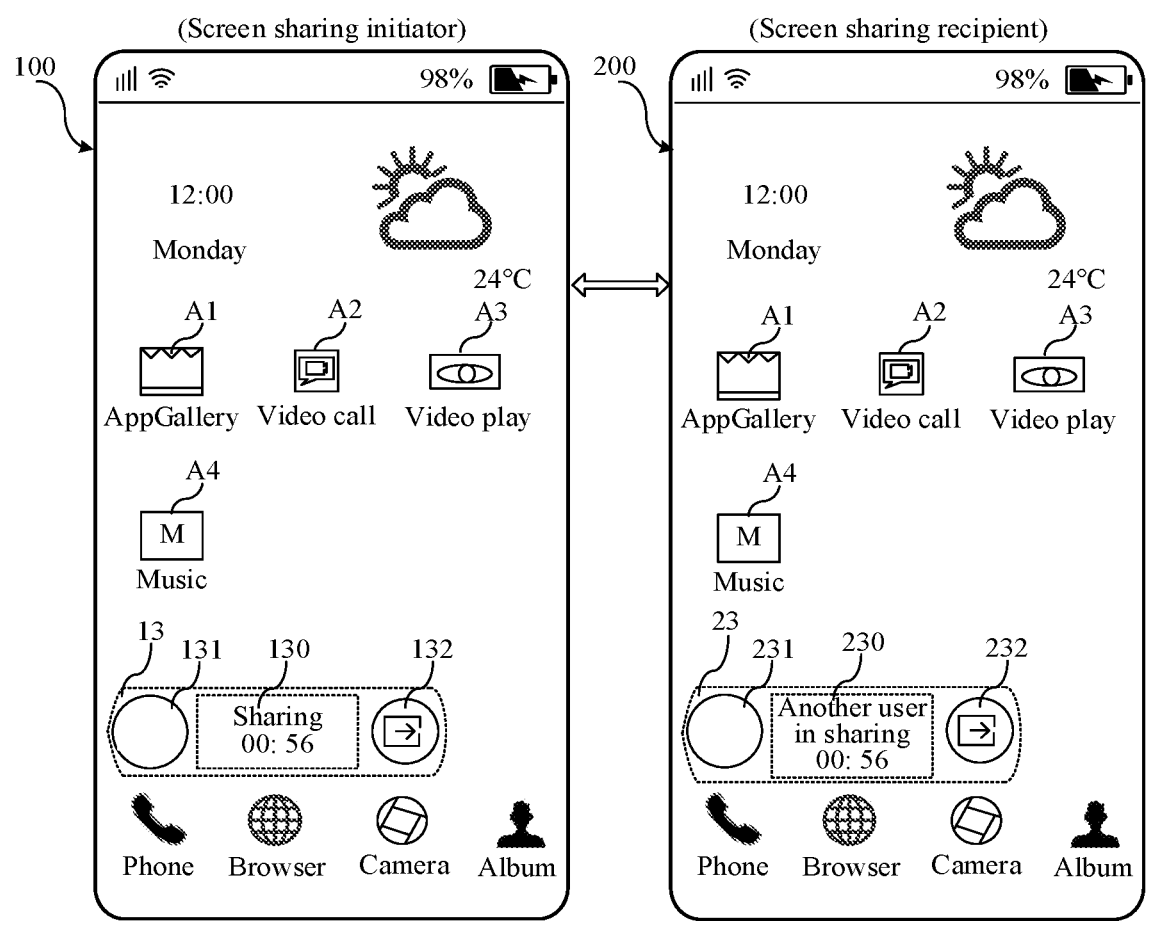

Refer to FIG. 4P. After the mobile phone 200 and the mobile phone 100 exit the interconnection mode, the mobile phone 100 may display the home screen, and the mobile phone 200 displays the shared interface. In addition, the text "interconnected" is not displayed on neither the interconnection control 131 nor the interconnection control 231, so as to remind the user that the mobile phone 100 and the mobile phone 200 are not in the interconnection mode currently.

Figure 4Q:
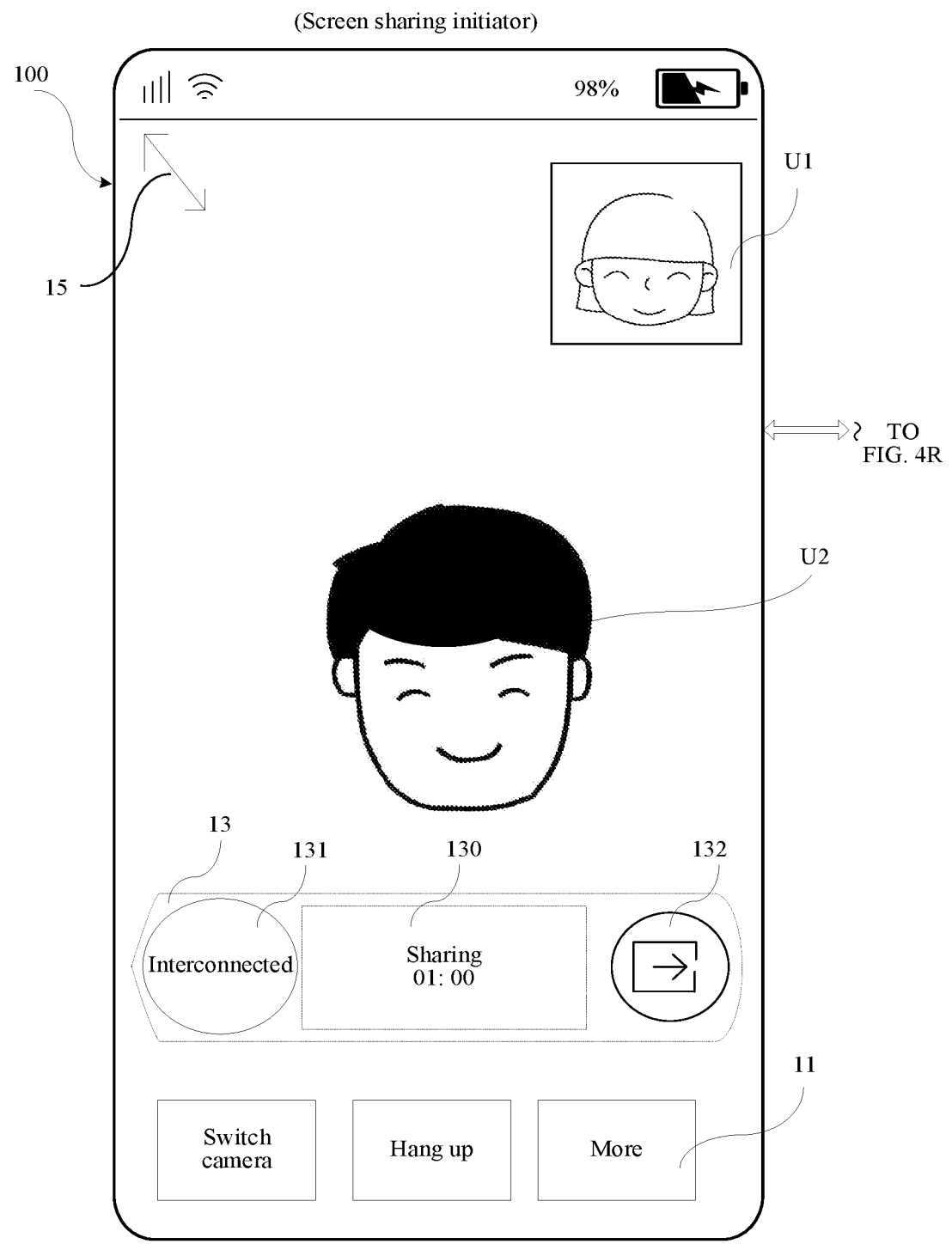
Figure 4R:
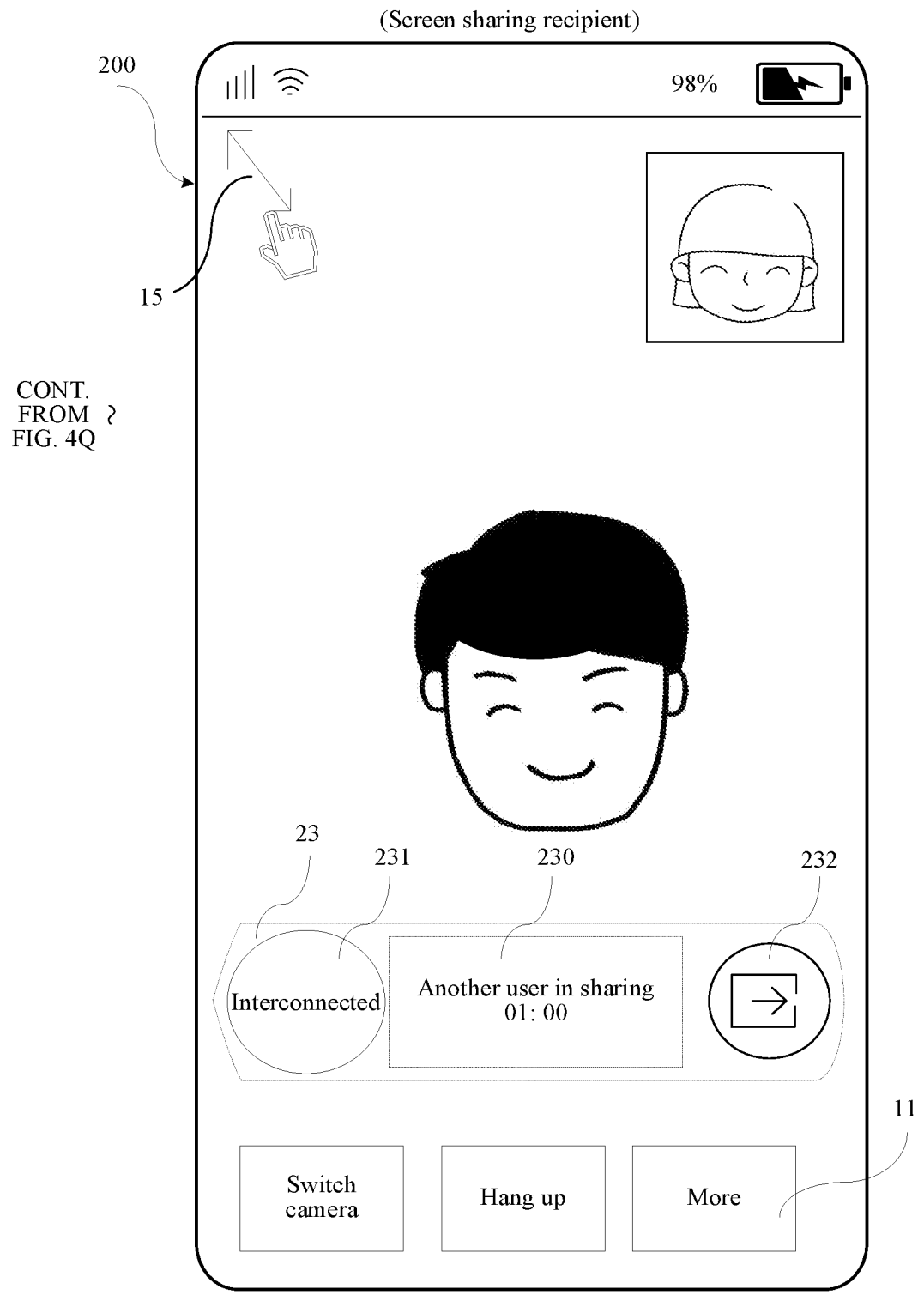

Refer to FIG. 4Q and FIG. 4R. In another implementation of embodiments of this disclosure, in a process of setting up a video call between the mobile phone 100 and the mobile phone 200, when sharing the screen with the mobile phone 200, the mobile phone 100 may continue to display a video call interface. The video call interface further includes a call interface zoom-out control 15. In addition, the mobile phone 100 sends the video call interface as a shared interface to the mobile phone 200. The mobile phone 200 displays the shared interface shared by the mobile phone 100.

If the interconnection mode is enabled between the mobile phone 100 and the mobile phone 200, and the mobile phone 200 detects a single-tap operation performed by the user U2 on the call interface zoom-out control 15 on the shared interface displayed by the mobile phone 200, the mobile phone 200 determines that an event type corresponding to the single-tap operation of the user U2 is a single-tap input event. The mobile phone 200 sends, as event information to the mobile phone 100, position coordinate information and the event type of a position at which the user U2 performs the single-tap operation.

Figure 4S:
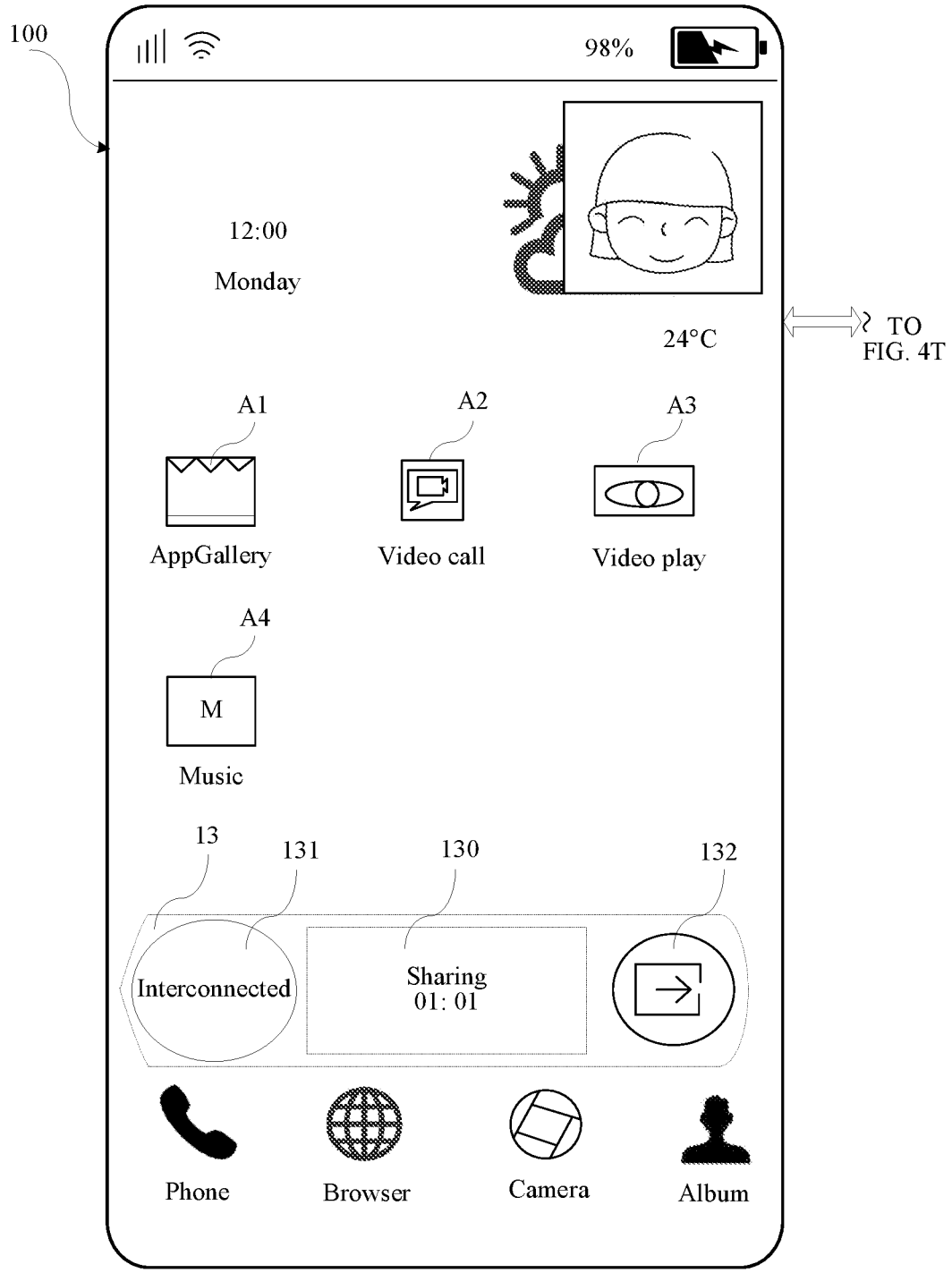
Figure 4T:
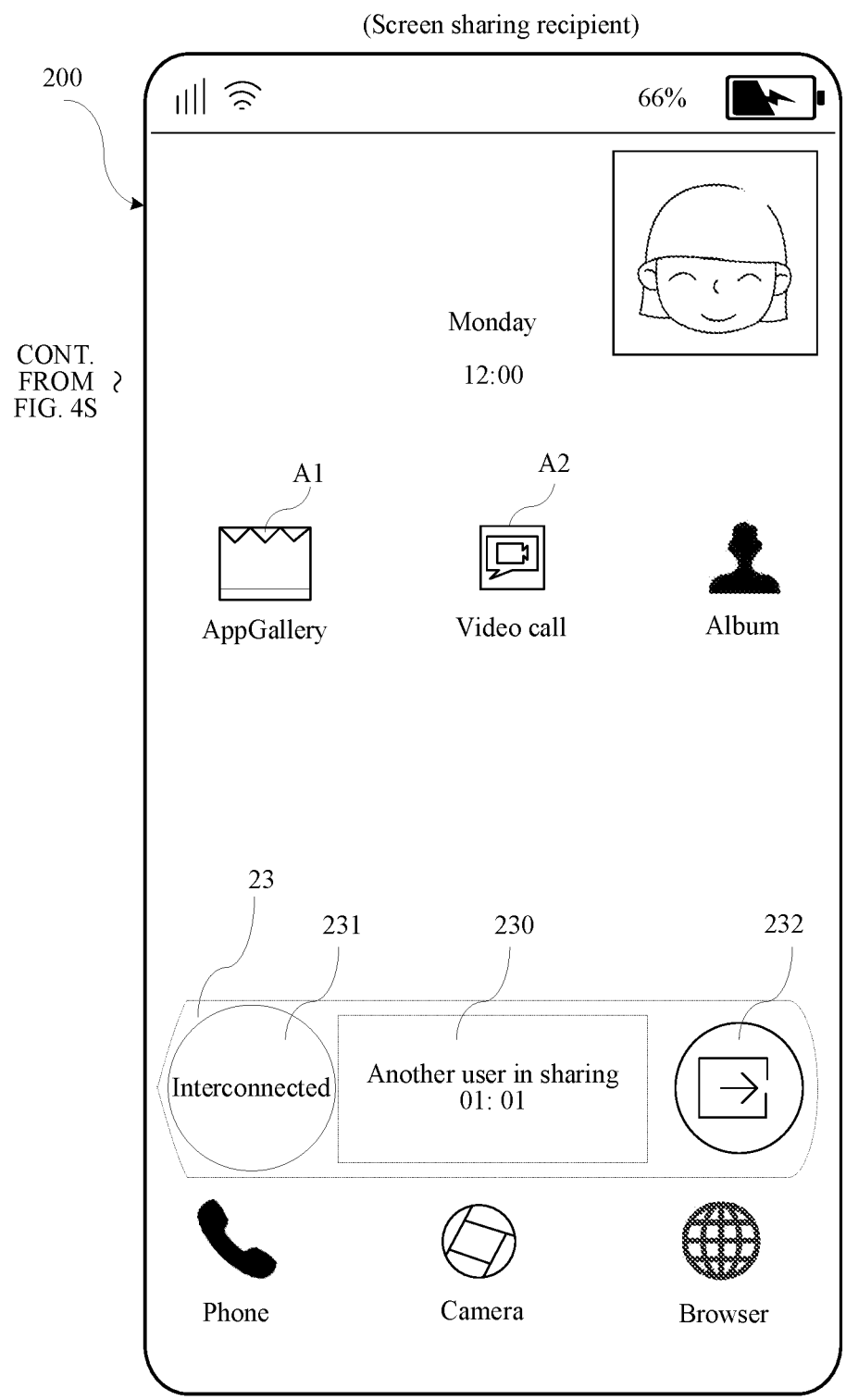

After receiving the event information, the mobile phone 100 determines, based on the event type, that an operation type is an operation object trigger operation. In this case, the mobile phone 100 determines, based on the position coordinate information, that an operation object, corresponding to the position of the single-tap operation performed by the user U2, on the shared interface is the call interface zoom-out control 15. In this case, the mobile phone 100 performs an operation of triggering the call interface zoom-out control 15, in other words, performs a call interface zoom-out operation, and displays an interface shown in FIG. 4S.

In another implementation of this disclosure, if the mobile phone 200 and the mobile phone 100 end the interconnection operation mode and the screen sharing mode, after exiting the shared interface, the mobile phone 200 and the mobile phone 100 may each display the video call interface shown in FIG. 4C.

A scenario and a process of video play interconnection between the mobile phone 100 and the mobile phone 200 are as follows.

Figure 5A:
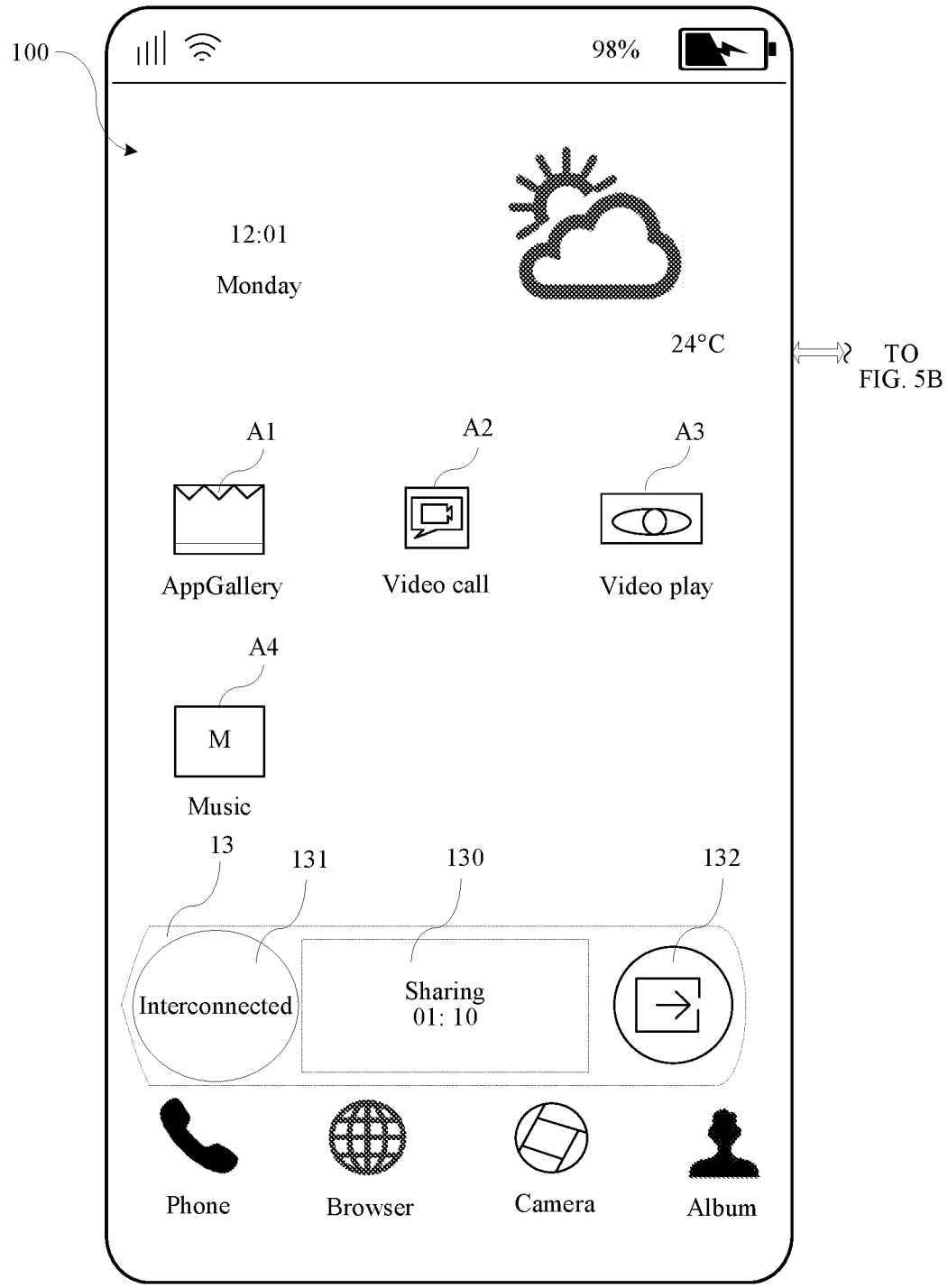
FIG. 5A, FIG. 5B, FIG. 5C, FIG. 5D, FIG. 5E, and FIG. 5F are schematic diagrams of some interfaces in a process of performing video play interconnection between a mobile phone and another mobile phone according to an embodiment of this disclosure.
Figure 5B:
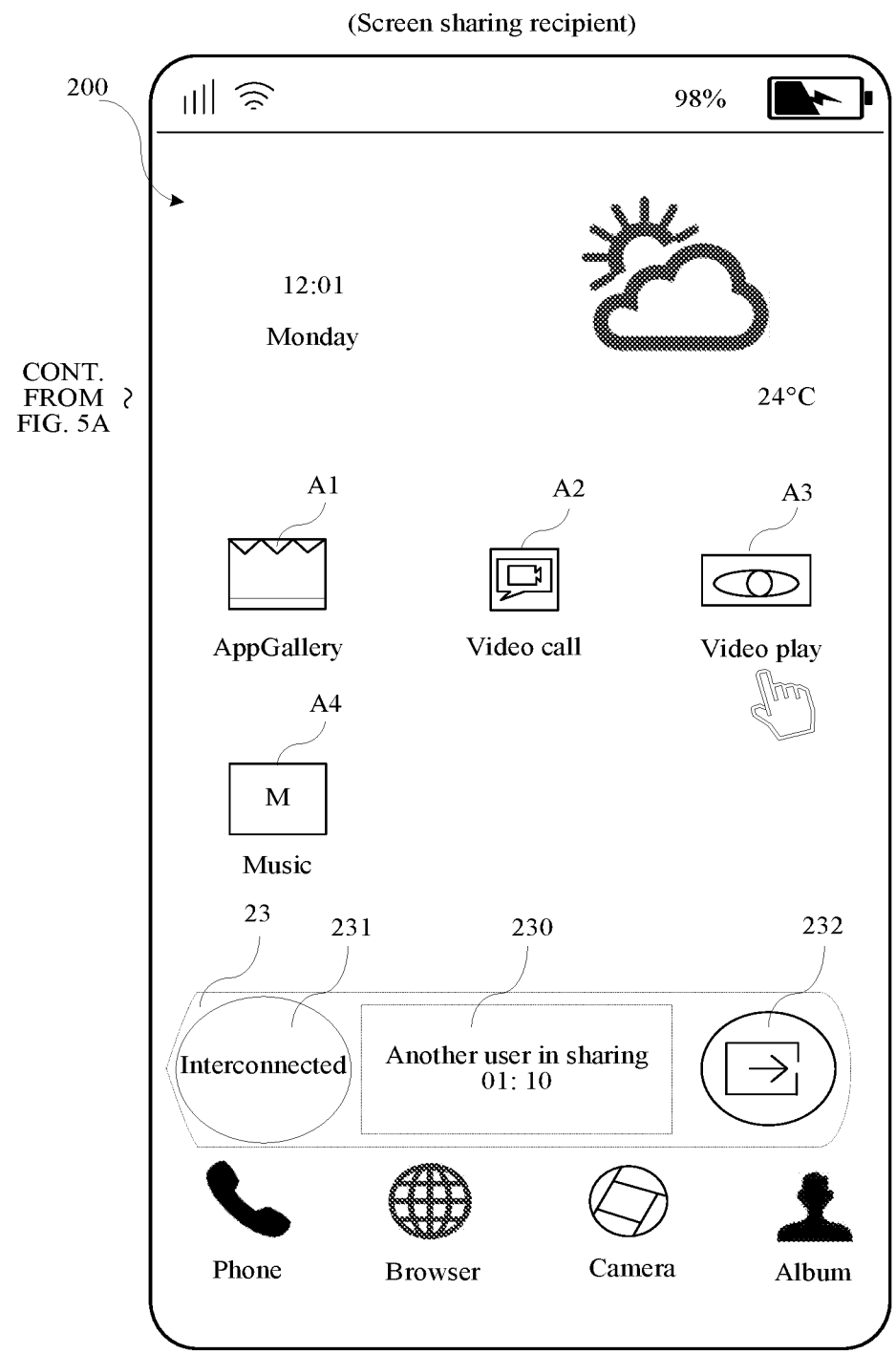

Refer to FIG. 5A and FIG. 5B. The mobile phone 100 and the mobile phone 200 enable a screen sharing mode and an interconnection mode. If detecting a single-tap operation performed by the user U2 on the video play application A3, the mobile phone 200 determines that an event type corresponding to the single-tap operation of the user U2 is a single-tap input event. The mobile phone 200 sends, as event information to the mobile phone 100, position coordinate information and the event type of a position at which the user U2 performs the single-tap operation.

Figure 5C:
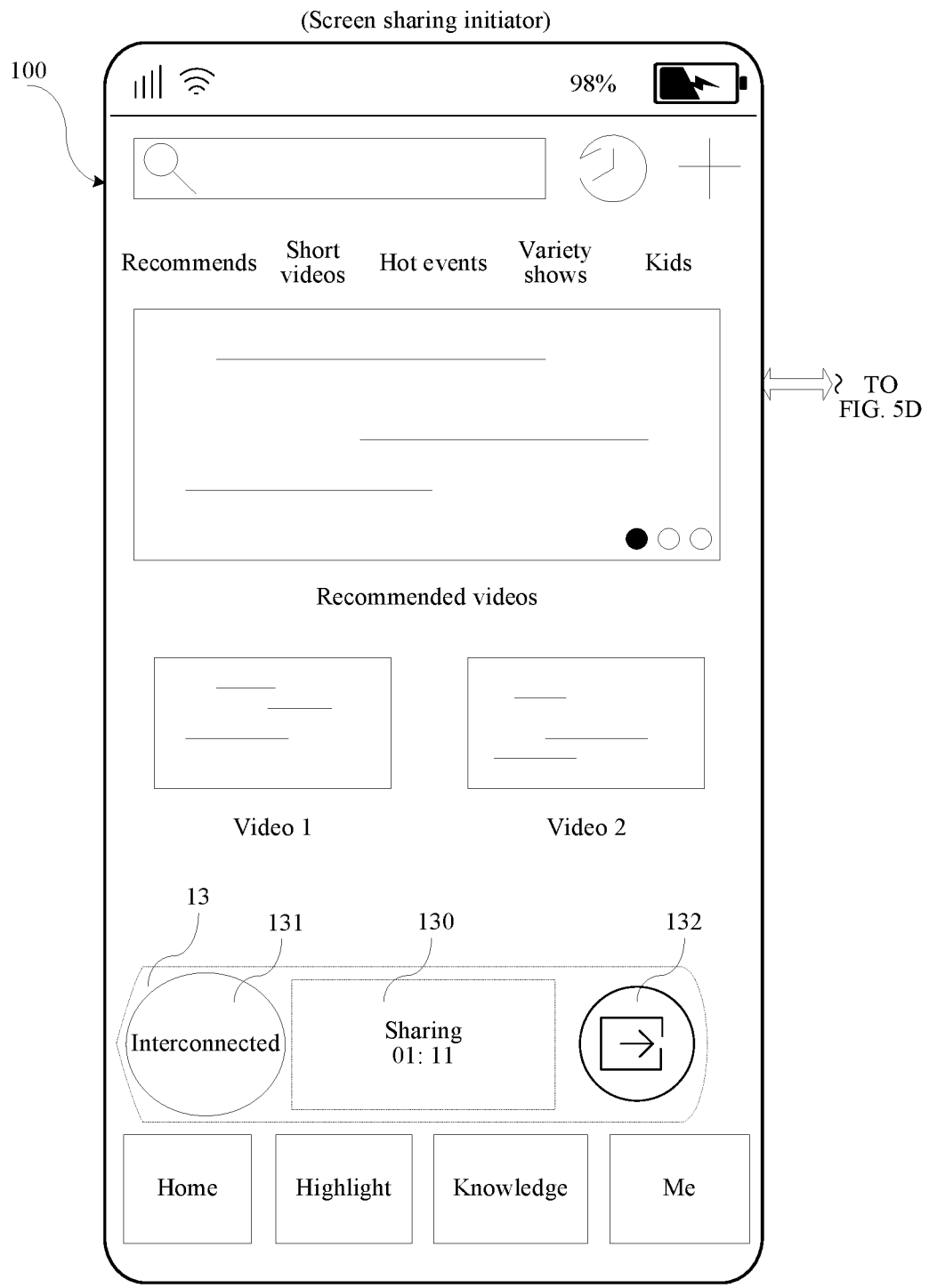
Figure 5D:
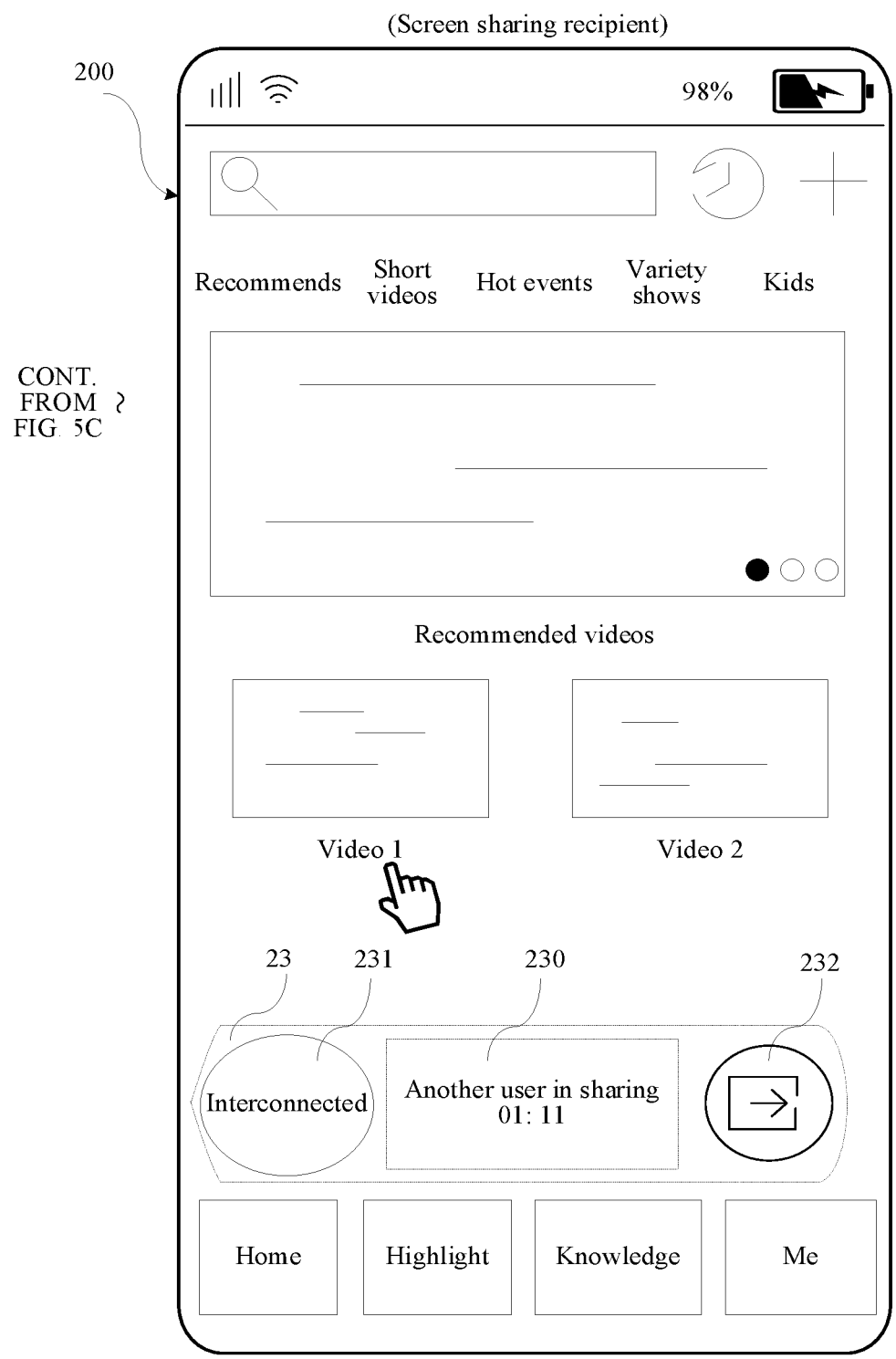

After receiving the event information, the mobile phone 100 determines, based on the event type, that an operation type is an operation object trigger operation. In addition, the mobile phone 100 determines, based on the position coordinate information, that an operation object, corresponding to the position at which the user U2 performs the single-tap operation, on the shared interface is the video play application A3. The mobile phone 100 performs an operation of opening the video play application A3, and displays a video application interface shown in FIG. 5C.

If detecting a single-tap operation performed by the user on a "video 1", the mobile phone 200 determines that an event type corresponding to the single-tap operation of the user U2 is a single-tap input event. The mobile phone 200 sends, as event information to the mobile phone 100, position coordinate information and the event type of a position at which the user U2 performs the single-tap operation.

Figure 5E:
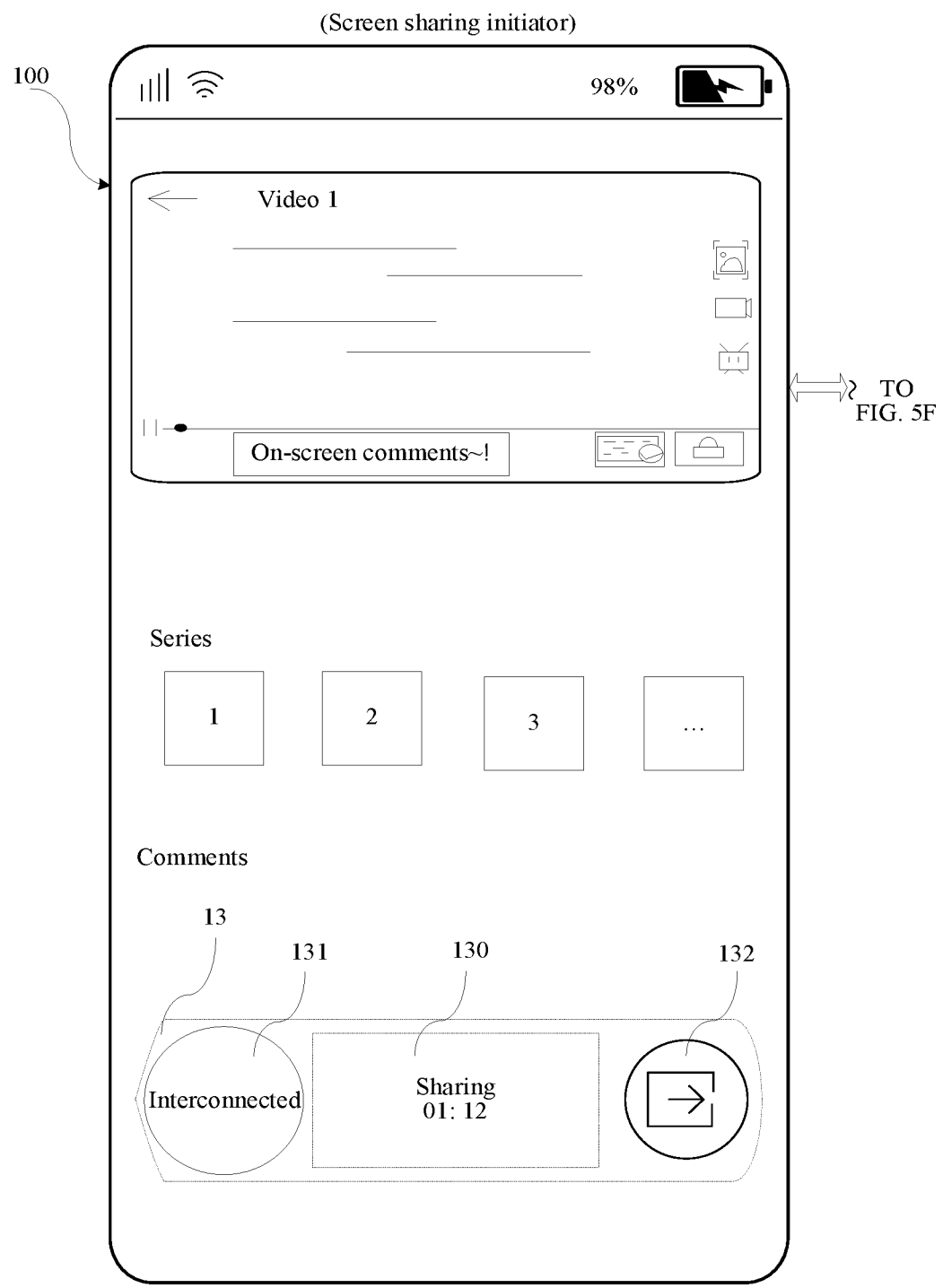
Figure 5F:
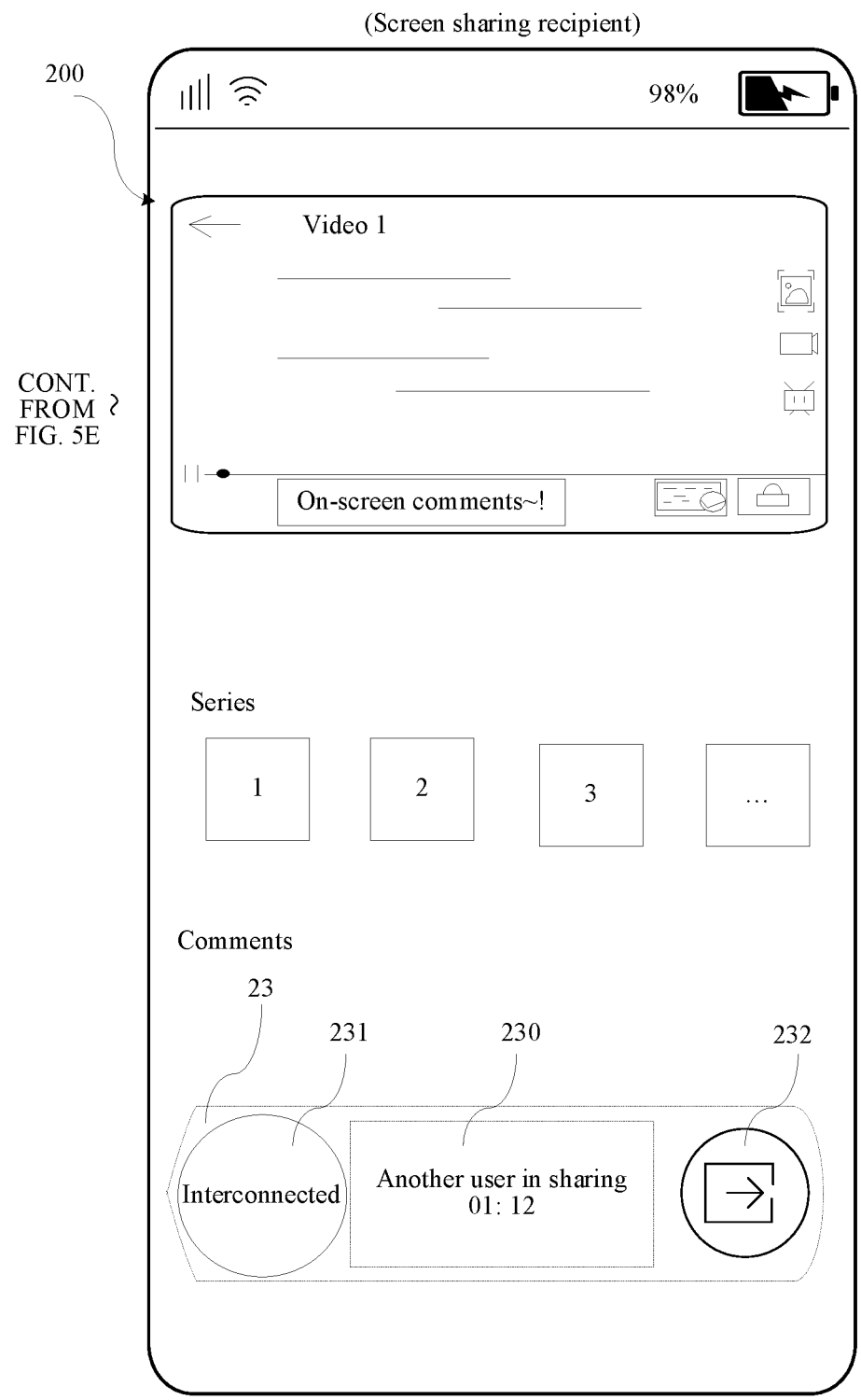

After receiving the event information, the mobile phone 100 determines, based on the event type, that an operation type is an operation object trigger operation. In addition, the mobile phone 100 determines, based on the position coordinate information, that an operation object, corresponding to the position at which the user U2 performs the single-tap operation, on the shared interface is the "video 1". The mobile phone 100 performs an operation of opening the "video 1", and displays a video play interface shown in FIG. 5E.

A scenario and a process of music play interconnection between the mobile phone 100 and the mobile phone 200 are as follows.

Figure 6A:
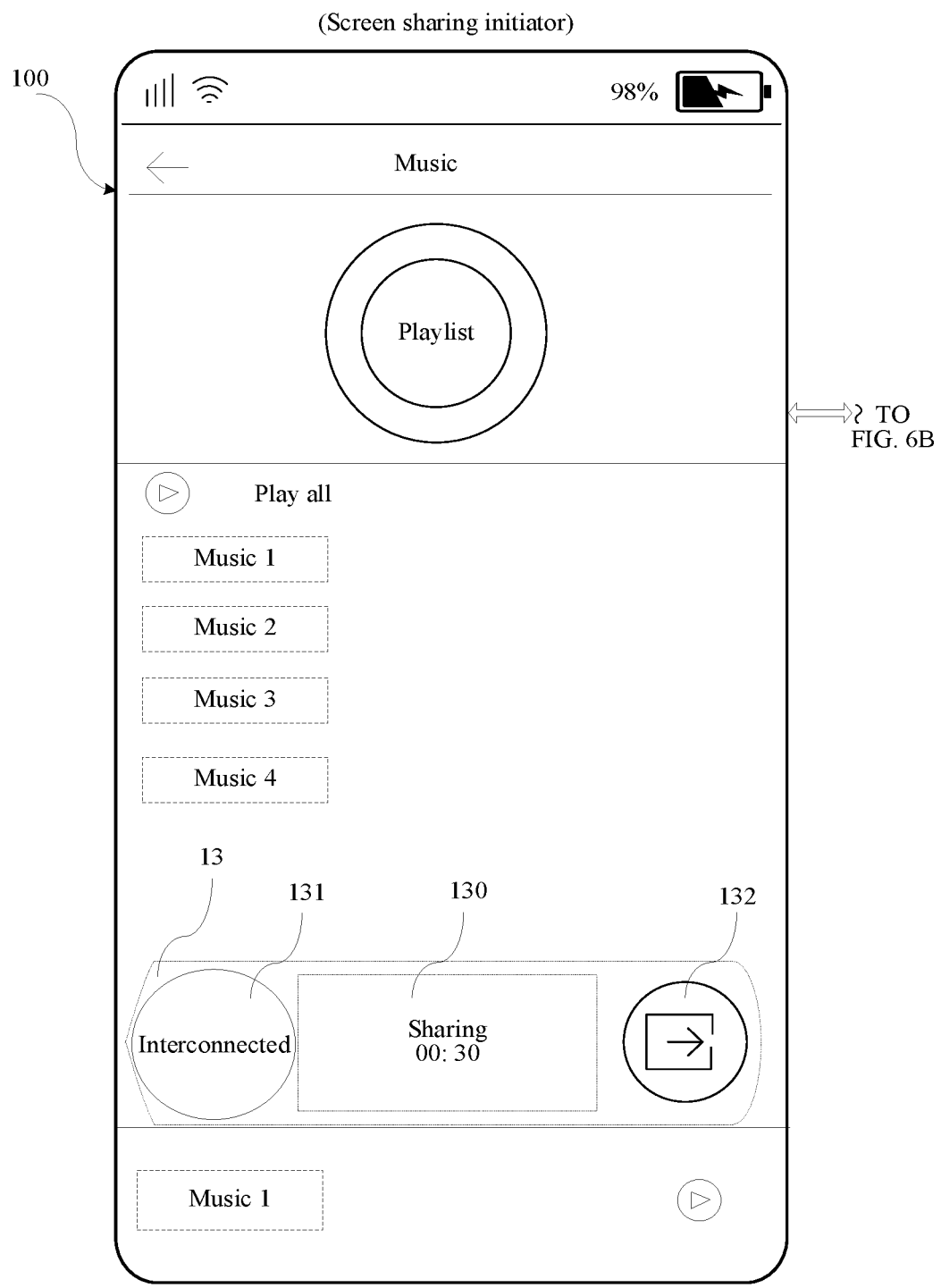
FIG. 6A, FIG. 6B, FIG. 6C, and FIG. 6D are schematic diagrams of some interfaces in a process of performing music play interconnection between a mobile phone and another mobile phone according to an embodiment of this disclosure.
Figure 6B:
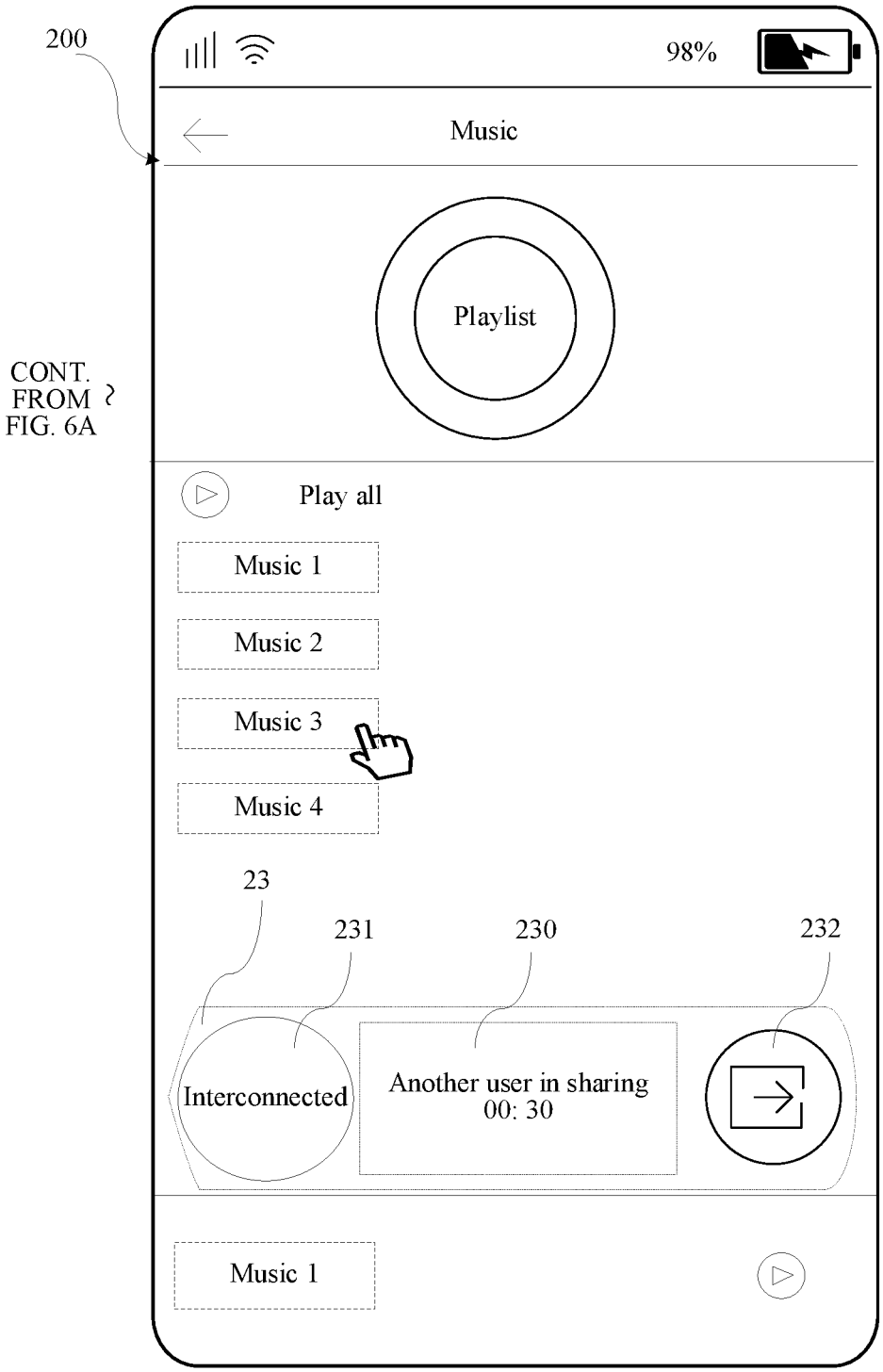

Refer to FIG. 6A and FIG. 6B. The mobile phone 100 and the mobile phone 200 enable a screen sharing mode and an interconnection mode. The mobile phone 100 displays an application interface of the music application A3. If detecting a single-tap operation performed by the user U2 on a "song 3", the mobile phone 200 determines that an event type corresponding to the single-tap operation of the user U2 is a single-tap input event. The mobile phone 200 sends, as event information to the mobile phone 100, position coordinate information and the event type of a position at which the user U2 performs the single-tap operation.

Figure 6C:
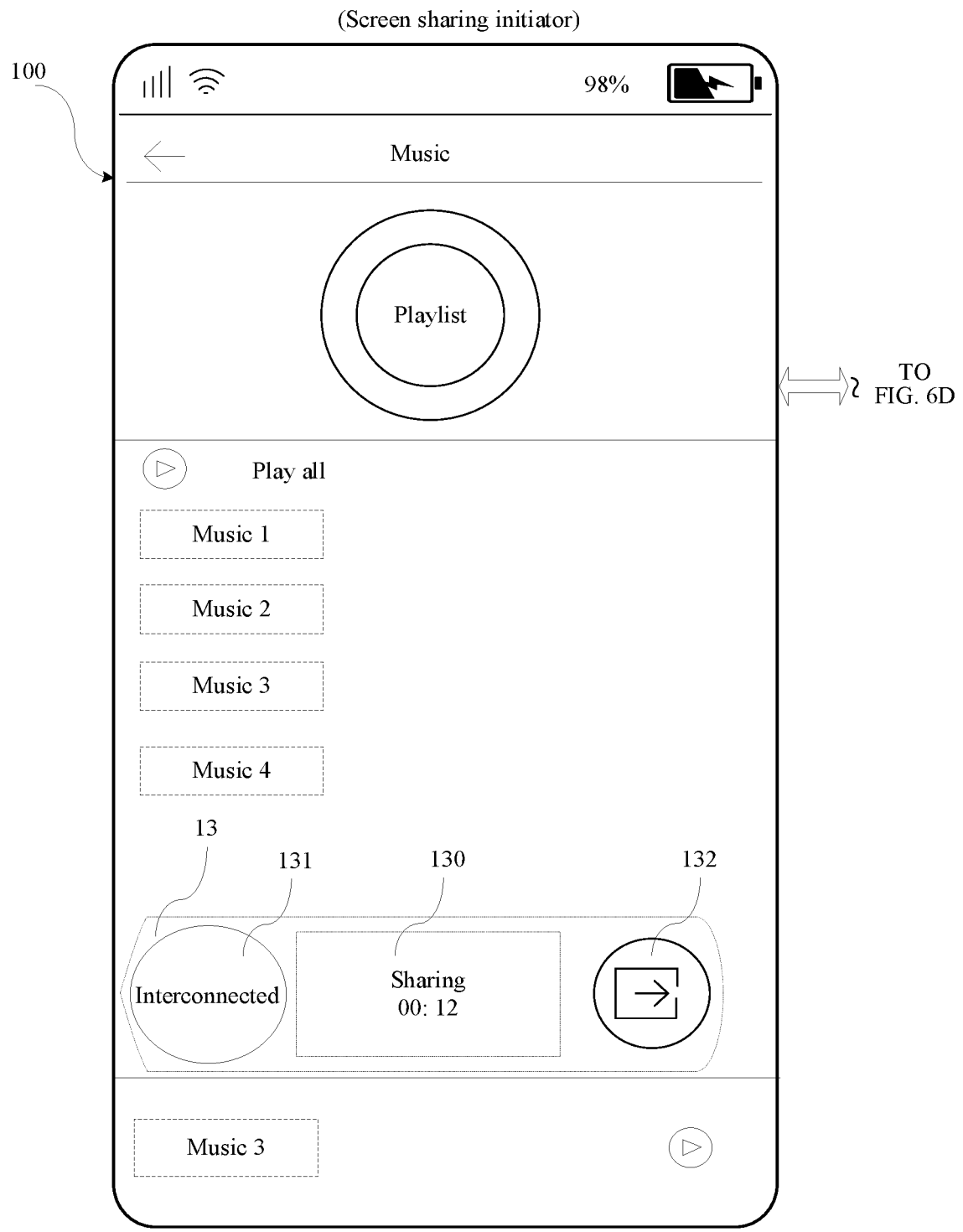
Figure 6D:
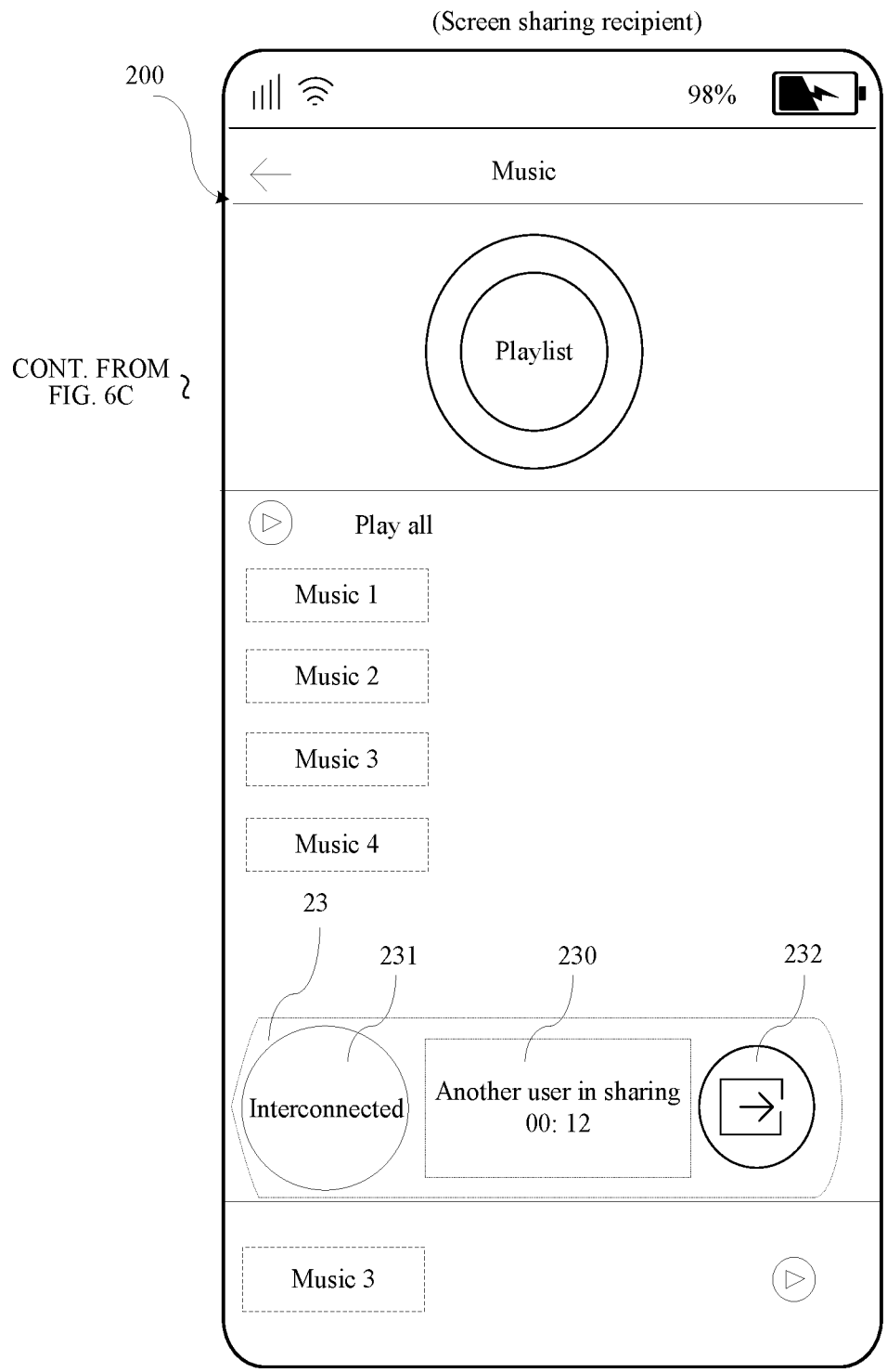

After receiving the event information, the mobile phone 100 determines, based on the event type, that an operation type is an operation object trigger operation. In addition, the mobile phone 100 determines, based on the position coordinate information, that an operation object, corresponding to the position at which the user U2 performs the single-tap operation, on the shared interface is the "song 3". The mobile phone 100 performs an operation of playing the "song 3", and displays a video play interface shown in FIG. 6C.

A scenario and a process of picture browsing interconnection between the mobile phone 100 and the mobile phone 200 are as follows.

Figure 7A:
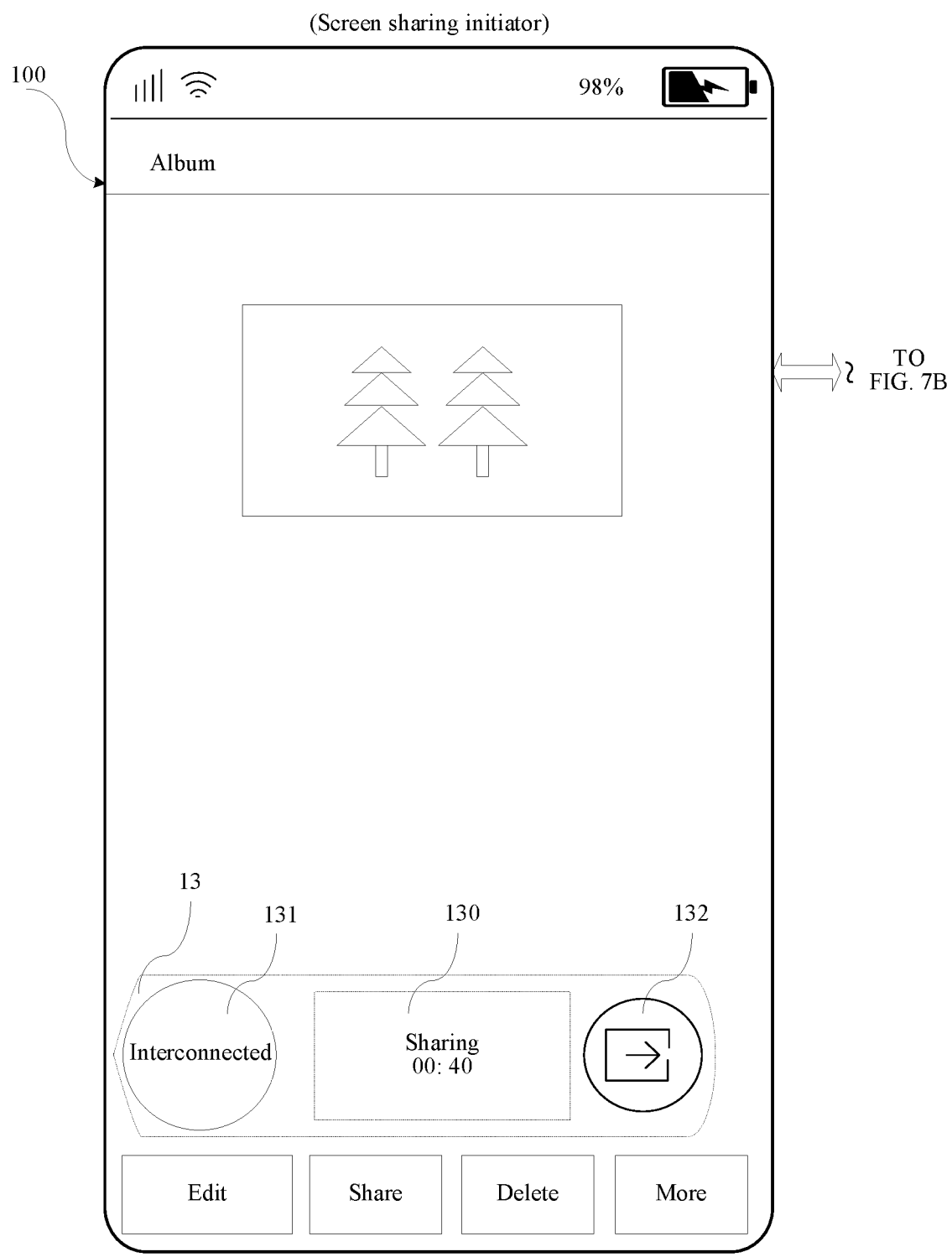
FIG. 7A, FIG. 7B, FIG. 7C, and FIG. 7D are schematic diagrams of some interfaces in a process of picture display interconnection between a mobile phone and another mobile phone according to an embodiment of this disclosure.
Figure 7B:
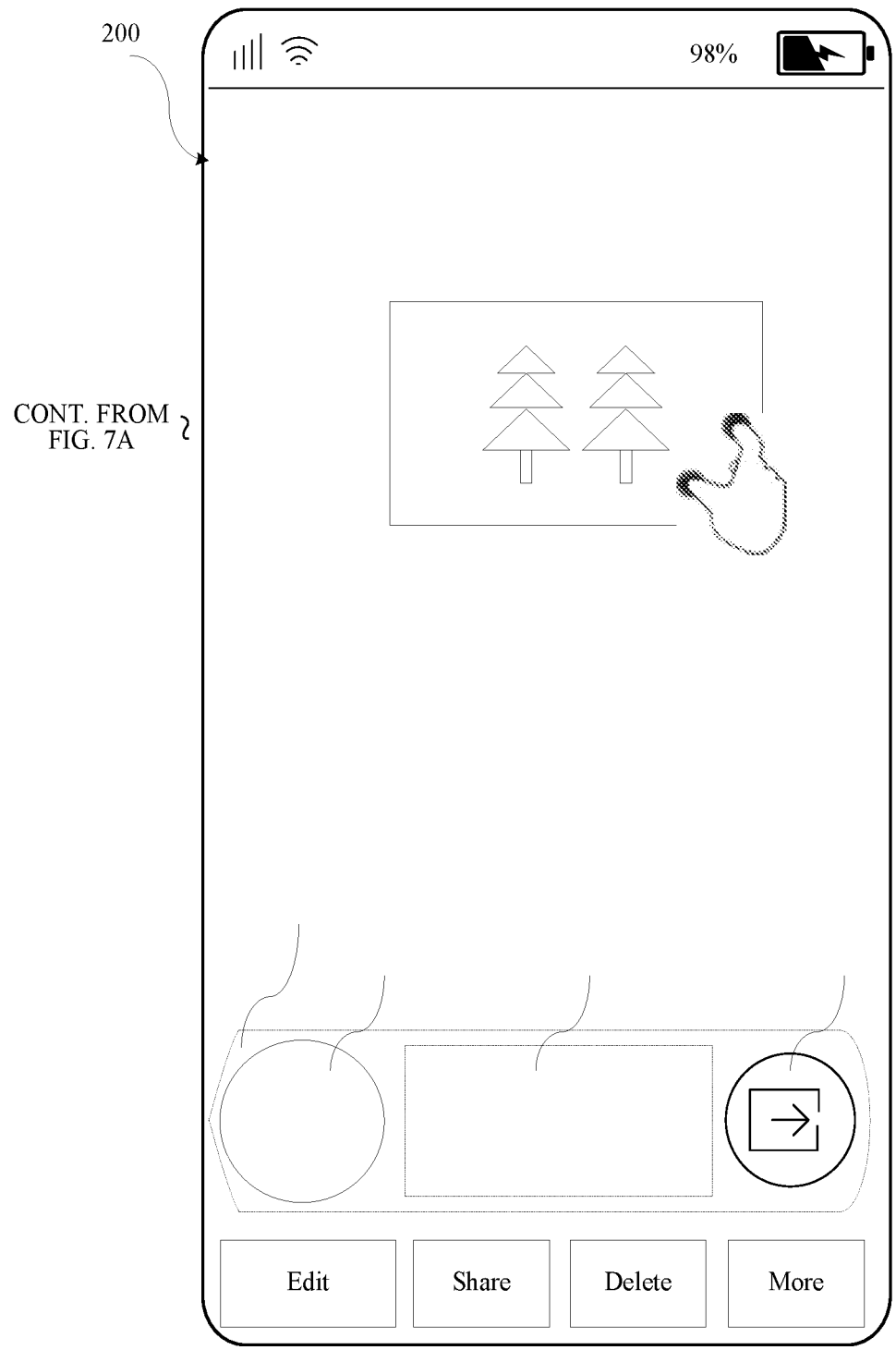

Refer to FIG. 7A and FIG. 7B. The mobile phone 100 and the mobile phone 200 enable a screen sharing mode and an interconnection mode. The mobile phone 100 displays a picture in an album application. If the mobile phone 200 detects a pinch-out operation performed by the user U2 on the picture (during which two fingers of the user being extended is the pinch-out operation, which may alternatively be referred to as an unpinch operation, and two fingers of the user being pinched is a pinch-in operation), the mobile phone 200 determines that an event type corresponding to the pinch-out operation of the user U2 is a pinch-out input event. The mobile phone 200 sends, as event information to the mobile phone 100, initial position coordinate information, end position coordinate information, and the event type of a position at which the user U2 performs the pinch-out operation. In an example in which two fingers of the user are extended, initial position coordinate and end position coordinate of each finger are different. In this case, the mobile phone 200 draws a flicking trace of the two fingers of the user, determines the initial position coordinate and end position coordinate of each finger as position coordinate information to be mapped to the mobile phone 100 by using event information.

Figure 7C:
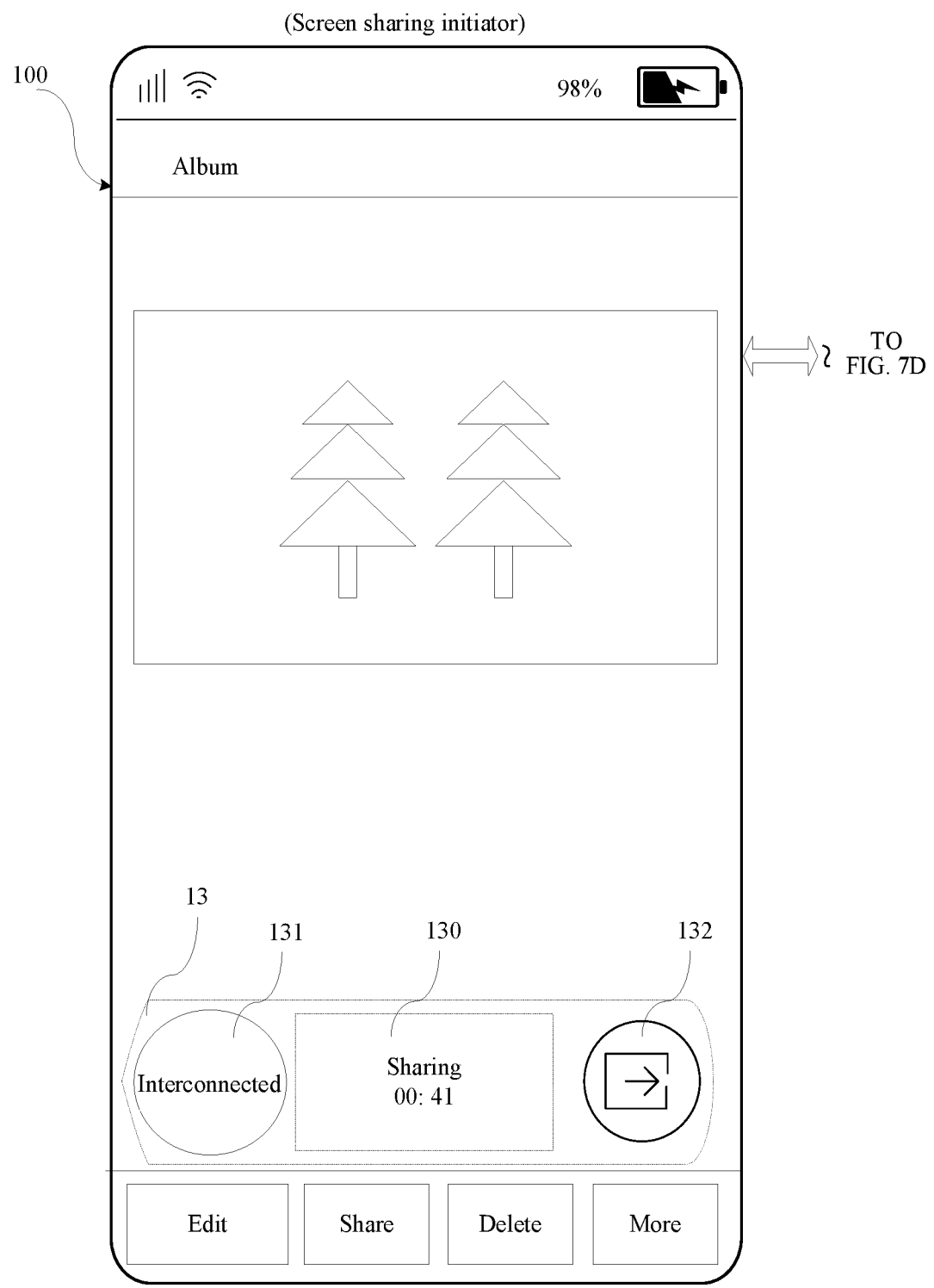
Figure 7D:
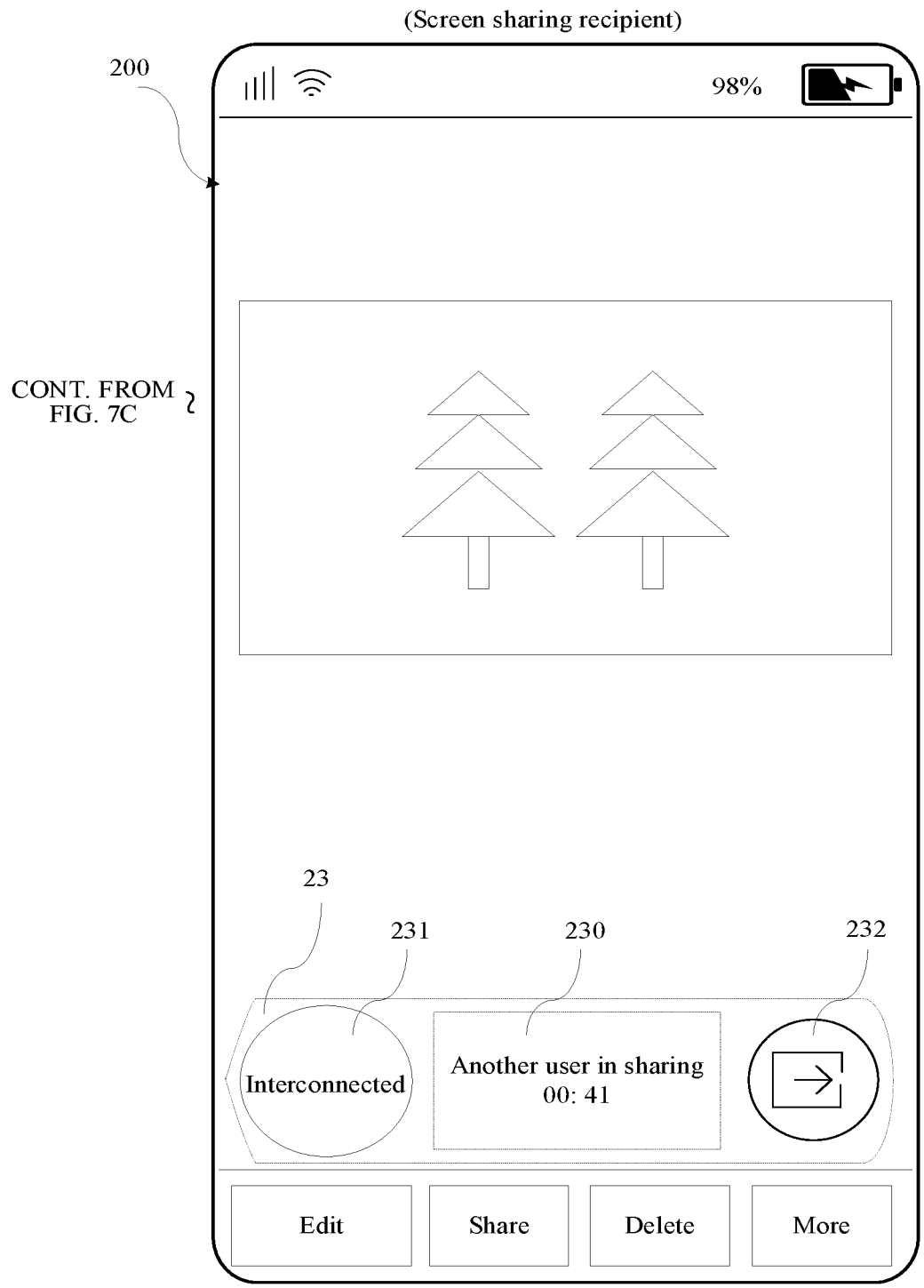

After receiving the event information, the mobile phone 100 determines, based on the event type, that an operation type is an operation object trigger operation. In this case, the mobile phone 100 determines a pinch-out scale of the picture based on the initial position coordinate information and the end position coordinate information, performs a picture pinch-out operation, and displays a picture display interface shown in FIG. 7C.

Figure 8A:
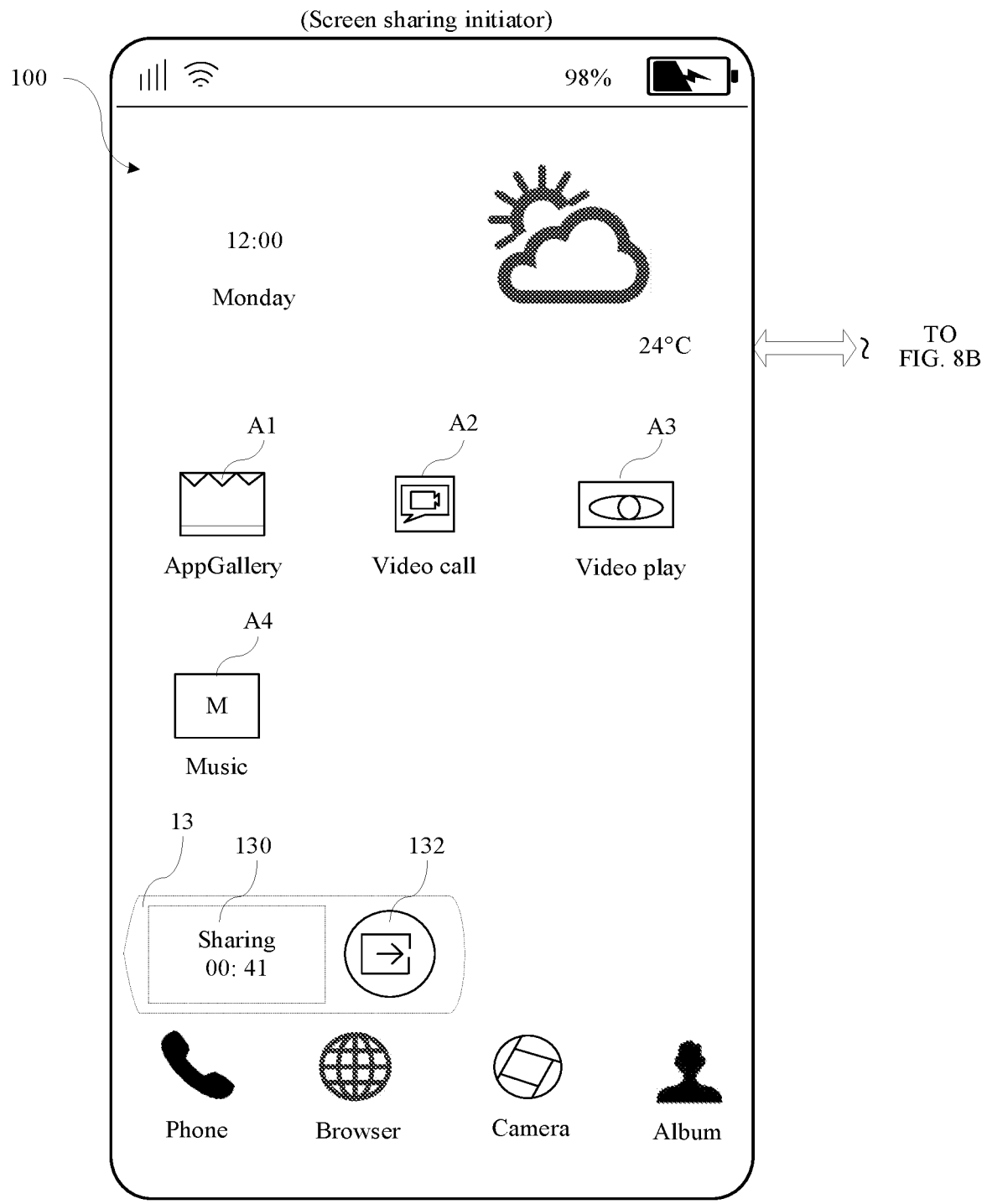
FIG. 8A, FIG. 8B, and FIG. 8C are schematic diagrams of other sharing controlling controls according to an embodiment of this disclosure.
Figure 8B:
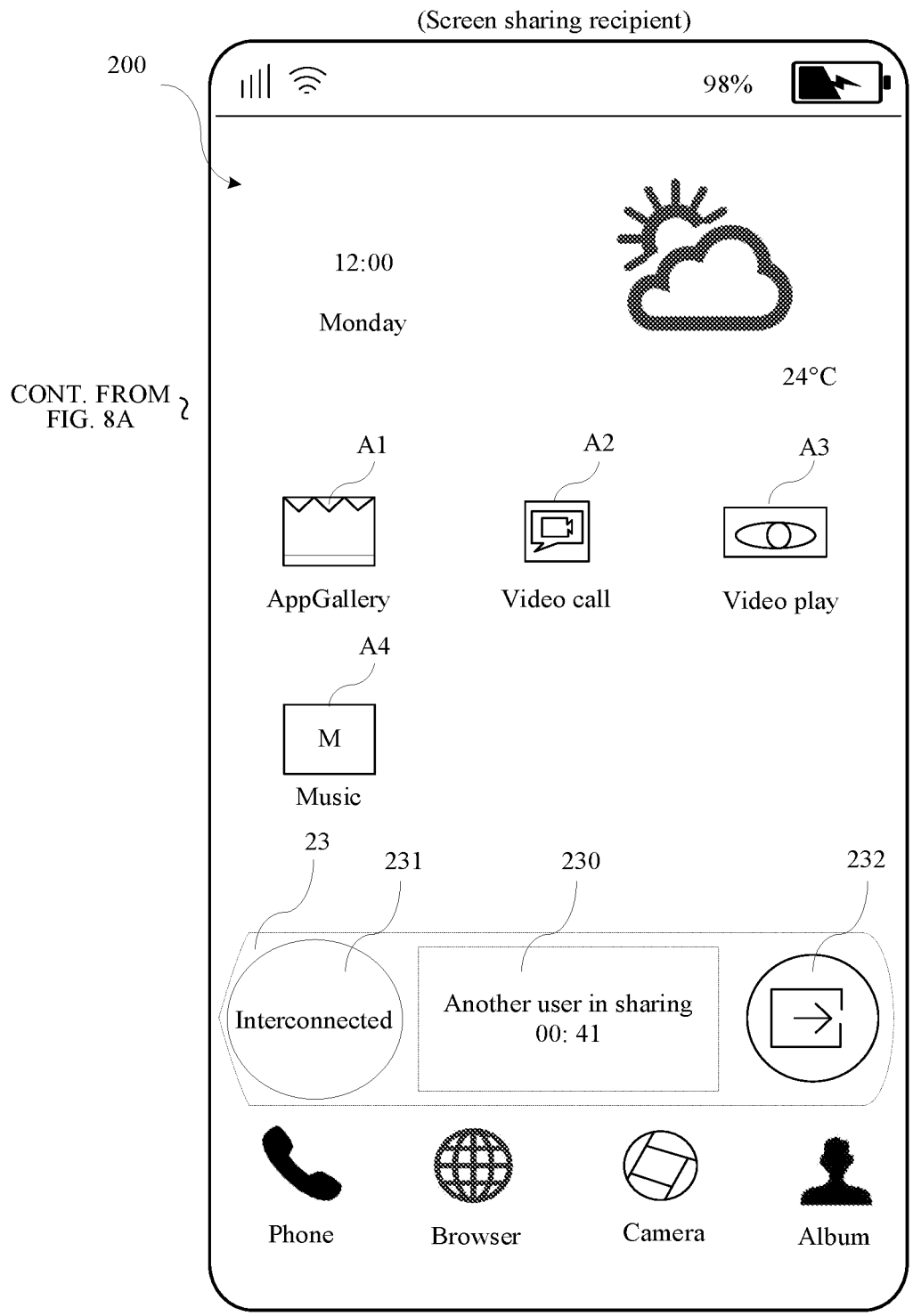

Refer to FIG. 8A and FIG. 8B. In another implementation of embodiments of this disclosure, after the interconnection mode is enabled between the mobile phone 100 and the mobile phone 200, the initiator side sharing controlling control 13 of the mobile phone 100 serving as an initiator device may also include only the sharing prompt information 130 and the sharing exit control 132, and does not include the foregoing interconnection control 131. The recipient side sharing controlling control 23 of the mobile phone 200 serving as the recipient device may include the interconnection control 231. In other words, in this implementation, enabling and disabling of the interconnection mode between the mobile phone 200 and the mobile phone 100 can be triggered only by the interconnection control 231.

Figure 8C:
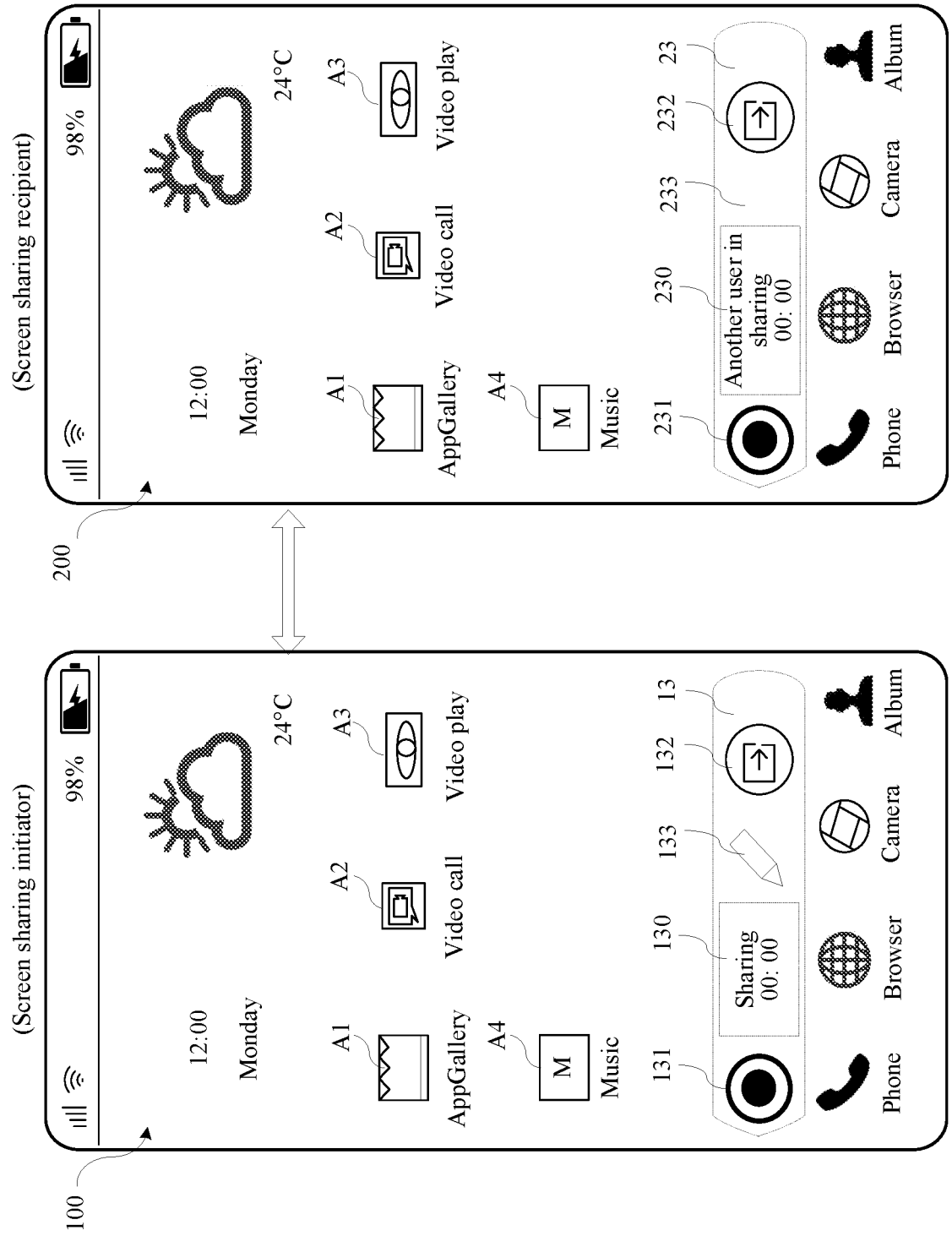

Refer to FIG. 8C. In another implementation of embodiments of this disclosure, an icon of the interconnection control 131 in the initiator side sharing controlling control 13 may also be shown in FIG. 8C. In addition, the interconnection control 131 may remind the user of enabling or disabling the interconnection mode by changing a shape and a format of the icon, changing a color, or the like.

In addition, in another implementation of embodiments of this disclosure, the initiator side sharing controlling control 13 may further include a graffiti control 133, to enable the user U1 to perform a graffiti operation on the shared screen by the graffiti control 133.

Correspondingly, the recipient side sharing controlling control 23 in the mobile phone 200 may also be shown in FIG. 8C. Details are not described herein again.

Figure 8D:
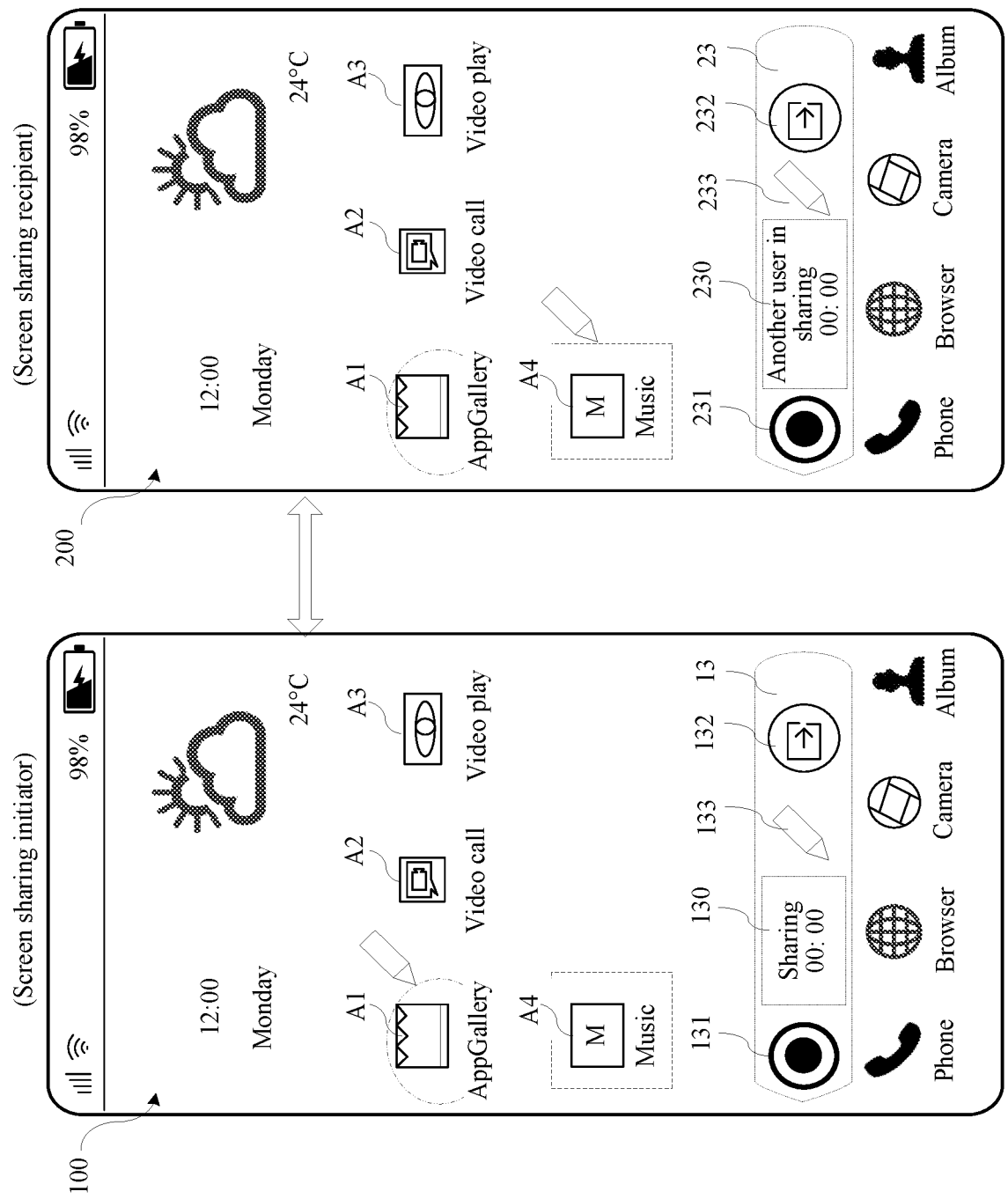
FIG. 8D is a schematic diagram of an interface of performing a graffiti operation between a mobile phone and another mobile phone according to an embodiment of this disclosure.

Refer to FIG. 8D. After receiving a graffiti operation performed by the user U1 on the "AppGallery application A1", the mobile phone 100 displays an oval graffiti mark shown in the figure. Correspondingly, the mobile phone 200 also displays a corresponding graffiti mark. In addition, after receiving the graffiti operation performed by the user U2 on the "music application A4", the mobile phone 200 displays a square graffiti mark shown in the figure. Correspondingly, the mobile phone 100 also displays a corresponding graffiti mark.

In some other implementations of embodiments of this disclosure, the initiator side sharing controlling control 13 and the recipient side sharing controlling control 23 may alternatively be controls of another type or format such as a side toolbar, and may be set as required.

In some other implementations of embodiments of this disclosure, the mobile phone 100 may alternatively enable the interconnection mode when performing screen sharing corresponding to a scenario such as a voice call, remote assistance, or device collaboration with the mobile phone 200.

It should be noted that, in embodiments of this disclosure, screen resolutions of the mobile phone 100 and the mobile phone 200 may be the same, or may be different. If screen resolutions of the mobile phone 100 and the mobile phone 200 are the same, the mobile phone 200 directly sends the obtained position coordinate information to the mobile phone 100. If the screen resolutions of the mobile phone 100 and the mobile phone 200 are different, the mobile phone 200 may perform coordinate conversion on the obtained position coordinate information based on a correspondence between the resolutions of the mobile phone 200 and the mobile phone 100, and send the converted position coordinate information to the mobile phone 100. Alternatively, the mobile phone 200 directly sends the obtained position coordinate information to the mobile phone 100. The mobile phone 100 performs coordinate conversion on the obtained position coordinate information based on a correspondence between the resolutions of the mobile phone 200 and the mobile phone 100, and then performs the foregoing operations such as determining an application and determining an operation object.

In some other implementations of embodiments of this disclosure, bidirectional screen sharing may be performed between the mobile phone 100 and the mobile phone 200. In other words, the mobile phone 100 sends the screen of the mobile phone 100 as the first shared screen to the mobile phone 200 for display. The mobile phone 200 also sends the screen of the mobile phone 200 as the second shared screen to the mobile phone 200 for display.

Figure 8E:
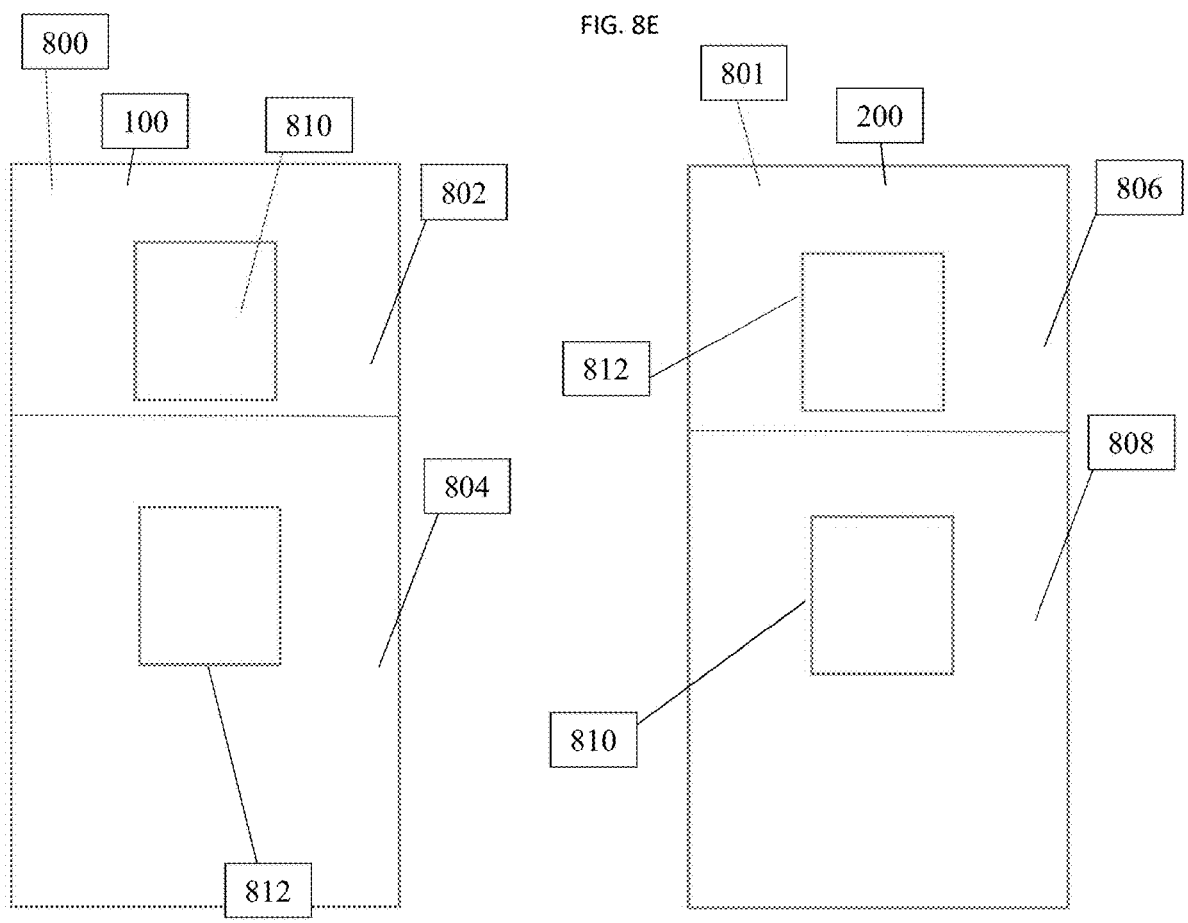
FIG. 8E is a schematic drawing of mobile phones with split screen displays according to an embodiment of this disclosure.

As shown in FIG. 8E, if the mobile phone 100 and the mobile phone 200 are devices each having only one physical screen, such as physical display 800 of mobile phone 100, which includes a first and second portions 802 and 804, and physical display 801 of mobile phone 200, which includes a first and second portions 806 and 808, when the bidirectional screen sharing is performed between the mobile phone 100 and the mobile phone 200, the mobile phone 100 and the mobile phone 200 separately perform screen splitting operations. In addition, a screen area after the screen splitting may be selected to display an interface of the user, such as interfaces 810 and 812 displayed in the first portions 802 and 806 of mobile phones 100 and 200, respectively, and a shared interface shared by another user may be displayed in another screen area, such as interfaces 812 and 810 displayed in the second portions 804 and 808 of mobile phones 100 and 200, respectively.

Figure 8F:
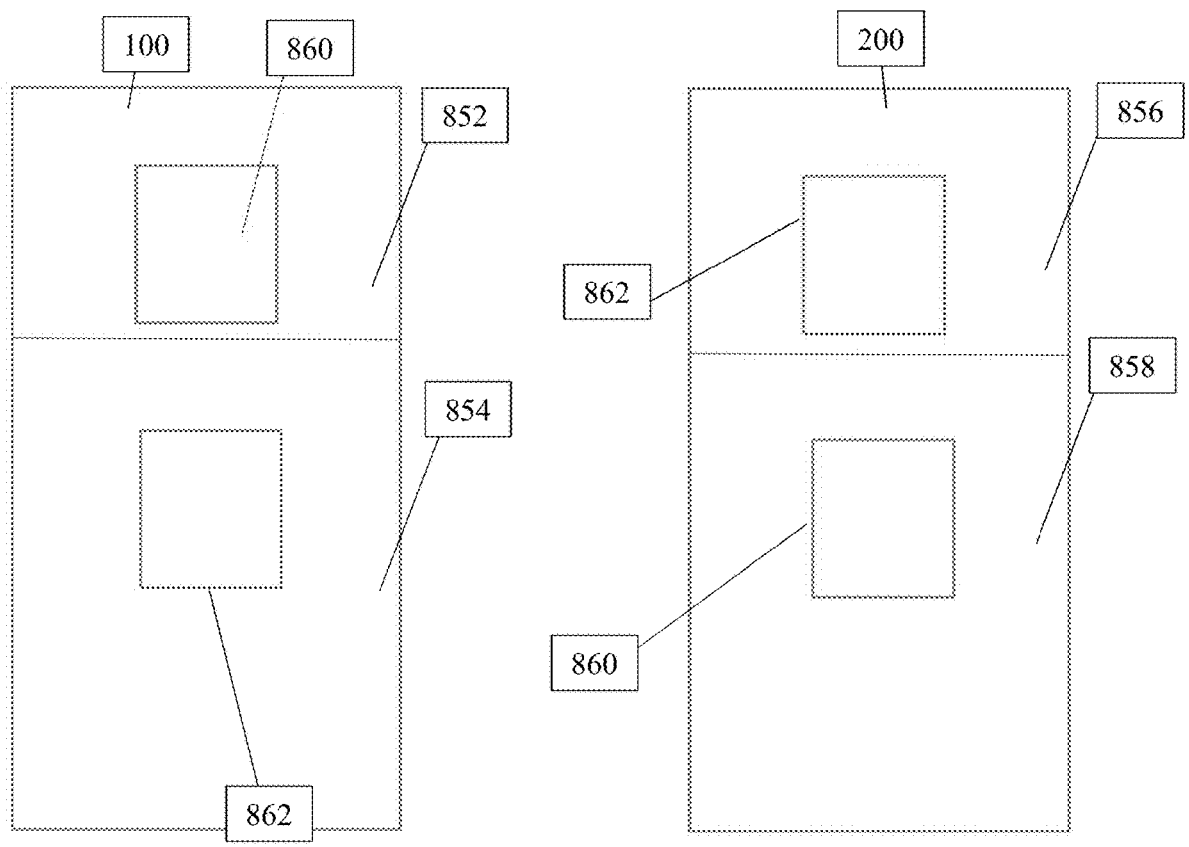
FIG. 8F is a schematic drawing of mobile phones with multiple displays according to an embodiment of this disclosure.

As shown in FIG. 8F, if the mobile phone 100 and the mobile phone 200 are devices each having two or more physical screens, such as physical displays 852 and 854 of mobile phone 100 and physical displays 856 and 858 of mobile phone 200, when the bidirectional screen sharing is performed between the mobile phone 100 and the mobile phone 200, the mobile phone 100 and the mobile phone 200 each select one physical screen to display their own interfaces, such as interfaces 860 and 862 of mobile phones 100 and 200, respectively. Another physical screen displays a shared interface shared by another, such as interfaces 862 displayed on mobile phone 100 and 860 displayed on mobile phone 200 respectively.

After the mobile phone 100 and the mobile phone 200 perform the bidirectional screen sharing, the mobile phone 100 may perform an interconnection operation on the screen of the mobile phone 200, and the mobile phone 200 may perform an interconnection operation on the screen of the mobile phone 100. In this way, a bidirectional interconnection between the mobile phone 100 and the mobile phone 200 is implemented.

Figure 9:
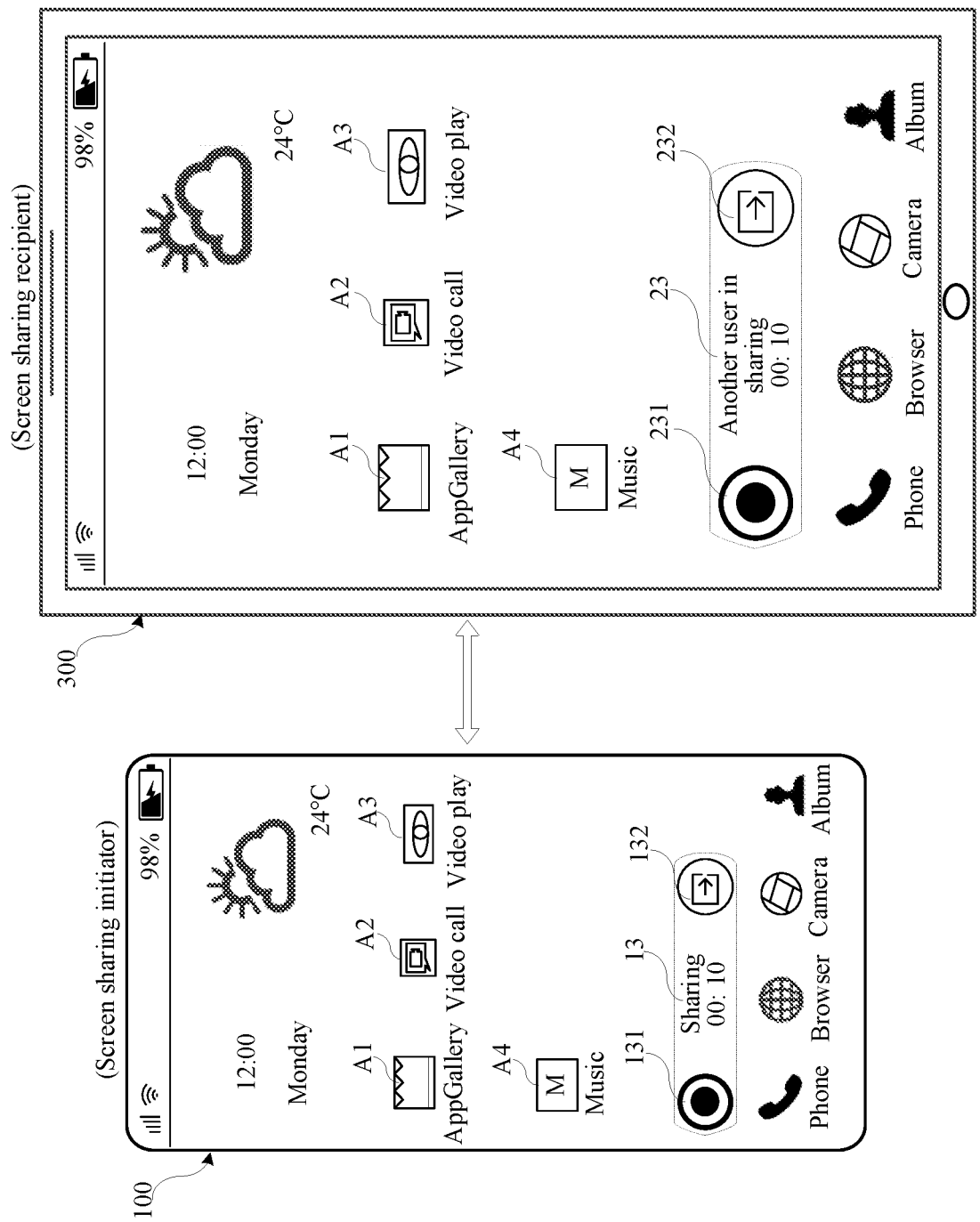
FIG. 9 is a schematic diagram of an interface in a process of performing interconnection between a mobile phone and a tablet computer according to an embodiment of this disclosure.

Refer to FIG. 9. In another implementation of embodiments of this disclosure, the mobile phone 100 may alternatively set up a video call with a tablet computer 300, and enable a screen sharing mode and an interconnection mode. A screen resolution of the tablet computer 300 is different from a screen resolution of the mobile phone 100. When determining event information, the tablet computer 300 may determine a coordinate adjustment parameter based on a ratio of the screen resolution F1 of the mobile phone 100 to the screen resolution F3 of the tablet computer 300, and adjust, based on the coordinate adjustment parameter, initial position coordinate information obtained by the tablet computer 300, to obtain position coordinate information. Then, the tablet computer 300 sends, to the mobile phone 100, the event information that includes the position coordinate information obtained through adjustment, to enable the mobile phone 100 to accurately determine an application or a control, corresponding to the position coordinate information, on the shared screen displayed by the mobile phone 100.

For example, $Z1=Sa \times Z0$. Z0 is an initial position coordinate, for example, $(x_0,y_0)$. Sa is a coordinate adjustment parameter, and Z1 is a position coordinate obtained after adjustment.

In this implementation, F1 is $(F11 \times F12)$. F11 is a quantity of pixels of a screen of the mobile phone 100 in a horizontal direction (which may alternatively be referred to as a screen width direction, or an x-axis direction). F12 is a quantity of pixels of the screen of the mobile phone 100 in a vertical direction (which may alternatively be referred to as a screen length direction, or a y-axis direction). F3 is $(F31 \times F32)$. F31 is a quantity of pixels of a screen of the tablet computer 300 in the horizontal direction (which may alternatively be referred to as the screen width direction, or the x-axis direction). F32 is a quantity of pixels of the screen of the tablet computer 300 in the vertical direction (which may alternatively be referred to as the screen length direction, or the y-axis direction).

In this case, the coordinate adjustment parameter Sa is $(S_{x1}, S_{y1})$, where $S_{x1}=F11/F31$, and $S_{y1}=F12/F32$.

The position coordinates Z1 obtained after the adjustment may be $(S_{x1}x_0, S_{y1}y_0)$.

Certainly, the mobile phone 100 may alternatively enable a sharing mode and an interconnection mode with another mobile phone (for example, a large-screen mobile phone and a small-screen mobile phone) having a screen resolution different from the screen resolution of the mobile phone 100. Alternatively, the mobile phone 100 may set up a video call with another device that has a screen display function, such as a television, and enable a screen sharing mode and an interconnection mode.

Embodiments of this disclosure relate to an enhanced screen sharing method applied to an electronic device. The electronic device may be a mobile phone, a tablet computer, a television, a notebook computer, an ultra-mobile personal computer (UMPC), a handheld computer, a netbook, a personal digital assistant (PDA), a wearable device, a virtual reality device, or the like.

It should be noted that, in embodiments of this disclosure, the electronic device is an electronic device that can perform wireless communication with another electronic device. The electronic device has a screen, and the electronic device has a video call function, a screen sharing function, and an interconnection function.

The following describes in detail the internal working process of the system, based on the foregoing software structure shown in FIG. 3, of the mobile phone 100 and the mobile phone 200.

In an enhanced screen sharing method provided in embodiments of this disclosure, a video call is made between the mobile phone 100 and the mobile phone 200, and screen sharing is performed. After the interconnection mode is enabled between the mobile phone 100 and the mobile phone 200, the mobile phone 200 may perform application download and installation.

Figure 10A:
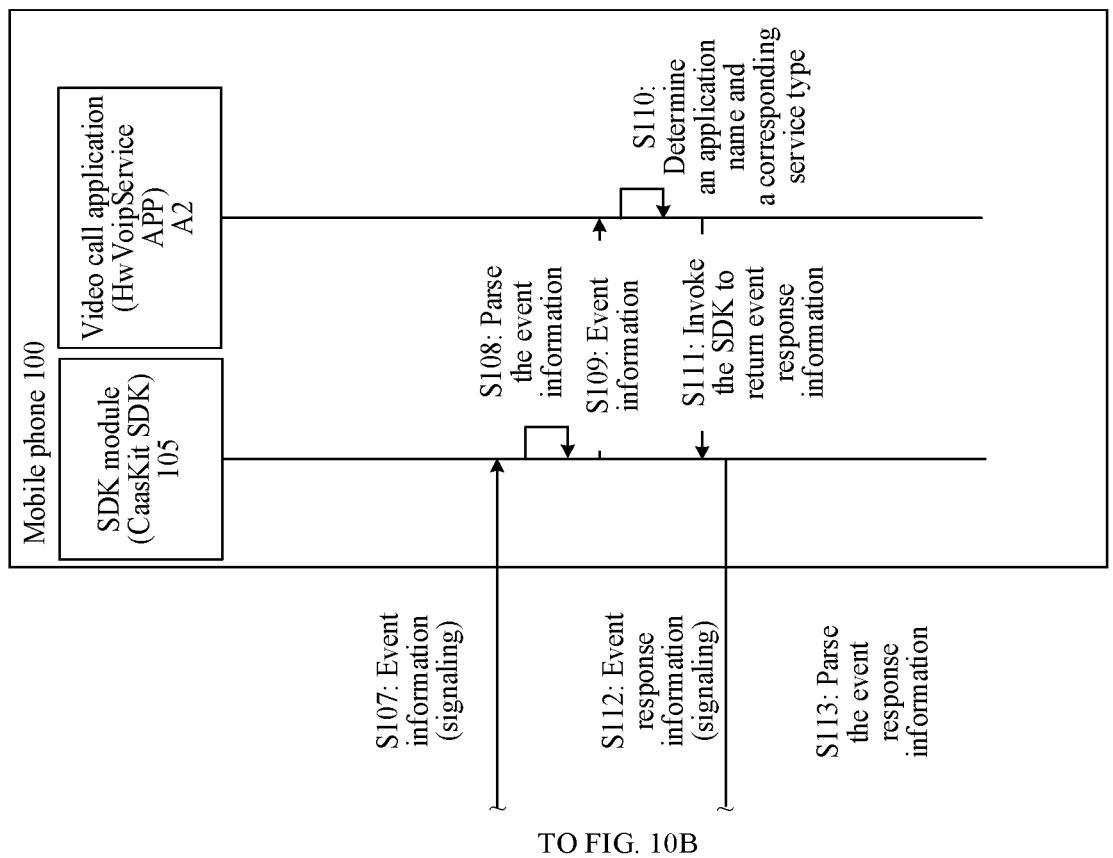
FIG. 10A and FIG. 10B are a schematic diagram of a process of performing application download and installation interconnection between a mobile phone and another mobile phone according to an embodiment of this disclosure.
Figure 10B:
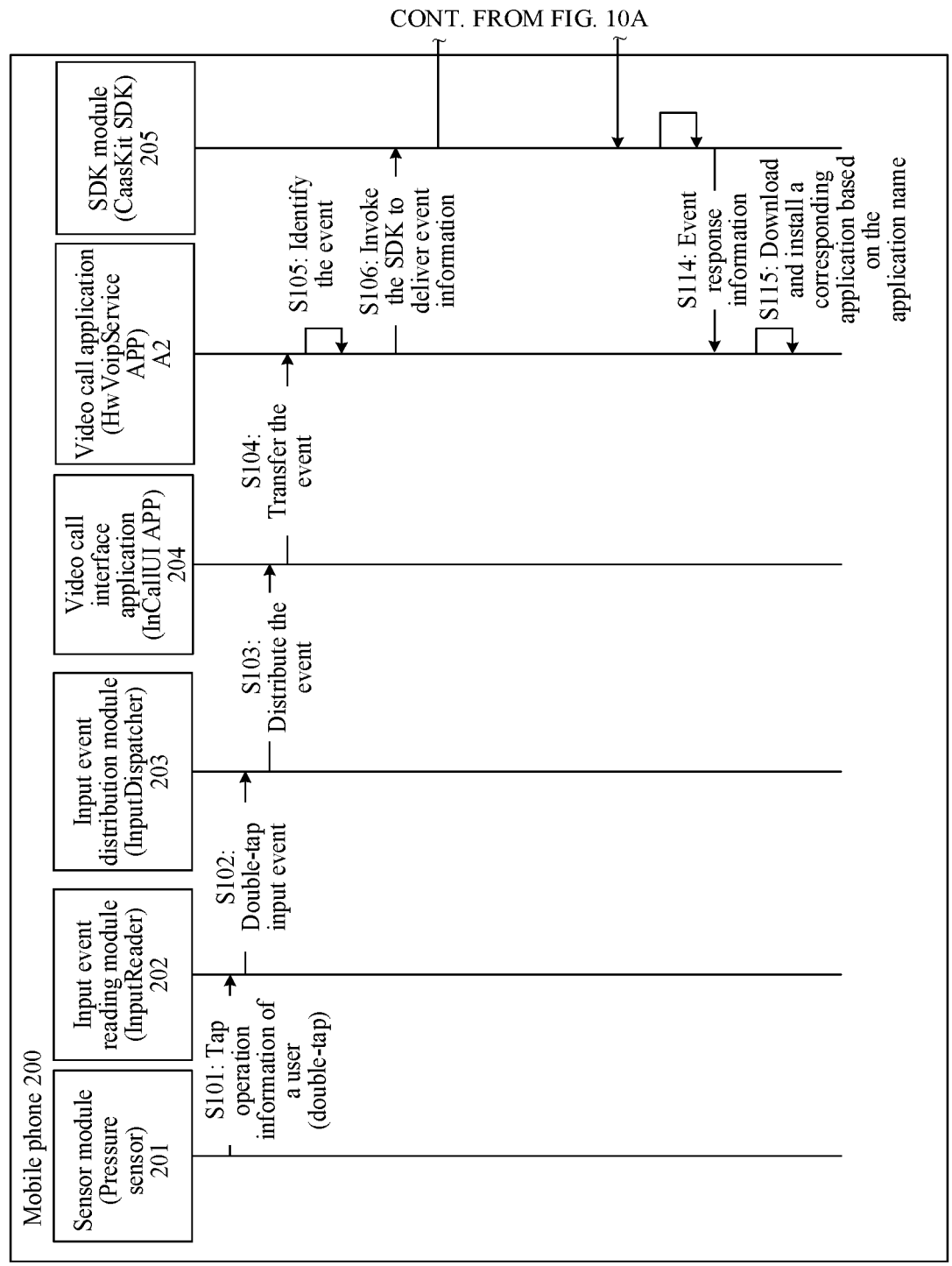

Refer to FIG. 10A and FIG. 10B. The mobile phone 100 includes a video call application A2 and an SDK module 105. The mobile phone 200 includes a sensor module 201, an input event reading module 202, an input event distribution module 203, a video call interface application 204, a video call application A2, and an SDK module 205.

A process of performing application download interconnection between the mobile phone 100 and the mobile phone 200 includes the following steps.

S101: The sensor module 201 in the mobile phone 200 sends detected double-tap operation information corresponding to a double-tap operation of the user U2 to the input event reading module 202 in the mobile phone 200.

It should be noted that, if a trigger operation of the user U2 is a double-tap operation, after detecting a first single-tap operation of the user U2, the sensor module 201 sends first single-tap operation information corresponding to the first single-tap operation to the input event reading module 202. After detecting a second single-tap operation of the user U2, the sensor module 201 sends second single-tap operation information corresponding to the second single-tap operation to the input event reading module 202.

The single-tap operation information may be a trigger operation electronic signal, and includes an input event type corresponding to the trigger operation of the user U2 and position coordinate information of a position at which the user U2 single taps. For example, an event type corresponding to the single-tap operation of the user U2 is a "single-tap input event".

S102: After receiving the first single-tap operation information and the second single-tap operation information, the input event reading module 202 determines that a time interval between receiving the first single-tap operation information and the second single-tap operation information is less than a preset double-tap operation determining time threshold. The input event reading module 202 extracts an event from an EventHub through a thread to perform event translation, and may determine that an input event corresponding to an operation of the user U2 is a double-tap input event. The input event reading module 202 sends, as event information to the input event distribution module 203, the double-tap input event and position coordinate information of a position at which the user U2 double taps.

A value range of the double-tap operation determining time threshold may be, for example, 0.1 seconds(s) to 0.6 s, for example, 0.1 s, 0.25 s, 0.5 s, or 0.6 s. Certainly, the double-tap operation determining time threshold may alternatively be another value.

S103: The input event distribution module 203 distributes the event based on the received event information, and sends the event information to the video call interface application 204.

S104: The video call interface application 204 transfers the event information of the double-tap input event to the video call application A2.

S105: The video call application A2 determines a time interval between the two single-taps in the event information of the double-tap input event, so as to achieve an objective of event identification and event effectiveness analysis. If the video call application A2 determines that the interval between the two single-taps in the event information of the double-tap input event is less than the preset double-tap operation determining time threshold, the video call application A2 determines that the input event is a double-tap input event.

S106: The video call application A2 invokes the SDK module 205 to deliver the event information.

S107: The SDK module 205 sends the event information to the SDK module 105 in the mobile phone 100. The event information includes an event type "double-tap input event"

and operation area information "position coordinate information of the position at which the user double taps".

The SDK module 205 may send the event information in a signaling manner through a signaling transmission channel established between the mobile phone 200 and the mobile phone 100.

It should be noted that, the SDK module 205 in the mobile phone 200 may first send event response information to a cloud server 300 corresponding to the video call application A2. Then, the cloud server 300 sends the event response information to the SDK module 105 in the mobile phone 100.

S108: The SDK module 105 parses the event information to obtain the event type "double-tap input event" and the operation area information "position coordinate information of the position at which the user double taps".

S109: The SDK module 105 sends the parsed event information to the video call application A2. To be specific, the event type "double-tap input event" and the operation area information "position coordinate information of the position at which the user double taps" are sent to the video call application A2.

S110: The video call application A2 may first determine, based on the event type "double-tap input event", that the mobile phone 100 needs to perform an application determining operation. Then, the video call application A2 determines, based on the operation area information "position coordinate information of the position at which the user double taps", whether the position coordinate information is valid, for example, whether a current interface of the mobile phone 100 includes an application icon and/or an application name of the application. If a current interface of the mobile phone 100 includes an application icon and/or an application name of the application, the video call application A2 determines whether the position at which the user double taps is at a position at which an on-screen application icon and/or the application name is located. If the position at which the user double taps is at a position at which an on-screen application icon and/or the application name is located, it is considered that the position coordinate information is valid. The video call application A2 determines, based on the operation area information "position coordinate information of the position at which the user double taps", a corresponding area on an interface of the mobile phone 100, and determines an application name of an application corresponding to the area, for example, a video play application A3. In addition, the video call application A2 determines that after receiving the name, a corresponding operation type that needs to be performed by the mobile phone 200 is "application download and installation".

S111: The video call application A2 invokes the SDK module 105 to return the event response information. The event response information includes the operation type "application download and installation" and an application name "video play application A3".

S112: The SDK module 105 sends the event response information to the SDK module 205 in the mobile phone 200.

The SDK module 105 may send the event information in a signaling manner through the signaling transmission channel established between the mobile phone 100 and the mobile phone 200.

It should be noted that, the SDK module 105 in the mobile phone 100 may first send the event response information to the cloud server 300 corresponding to the video call application A2. Then, the cloud server 300 sends the event response information to the SDK module 105 in the mobile phone 200.

S113: The SDK module 105 parses the event response information to obtain the operation type and the application name.

S114: The SDK module 105 sends the parsed event response information to the video call application A2. To be specific, the SDK module 105 sends the operation type and the application name to the video call application A2.

S115: The video call application A2 determines, based on the operation type "application download and installation", that an application download and installation operation needs to be performed. The video call application A2 determines, based on the application name "video play application A3", that an application that needs to be downloaded is the video play application A3. In this case, the video call application A2 first determines, based on the application name "video play application A3", whether the video play application A3 is installed in the mobile phone 200. If the video play application A3 is not installed, the video call application A2 directly downloads the video play application A3 from an AppGallery application A1 in the mobile phone 200 based on the application name, and completes application installation. If the video play application A3 is already installed in the mobile phone 200, the mobile phone 200 does not perform the application download and installation operation. Alternatively, the mobile phone 200 may display prompt information used to notify the user U2 that the video play application A3 is currently installed in the mobile phone 200.

In the enhanced screen sharing method provided in this embodiment, in a process of screen sharing between the mobile phone 200 and the mobile phone 100, after the interconnection mode of the mobile phone 200 to the mobile phone 100 is enabled, the mobile phone 200 may download a corresponding application in the mobile phone 100 based on the trigger operation performed by the user U2 on the mobile phone 200. An interaction type between the mobile phone 100 and the mobile phone 200 that perform screen sharing can be enriched, and user experience can be improved.

In another implementation of embodiments, for the foregoing S110, when generating the event response information, the mobile phone 100 may alternatively not need to determine an operation type of an operation that needs to be performed by the mobile phone 200, but send only the application name as the event response information to the mobile phone 200. Subsequently, after receiving the event response information, the mobile phone 200 may directly determine, based on the application name, whether to download and install the corresponding application.

Figure 11A:
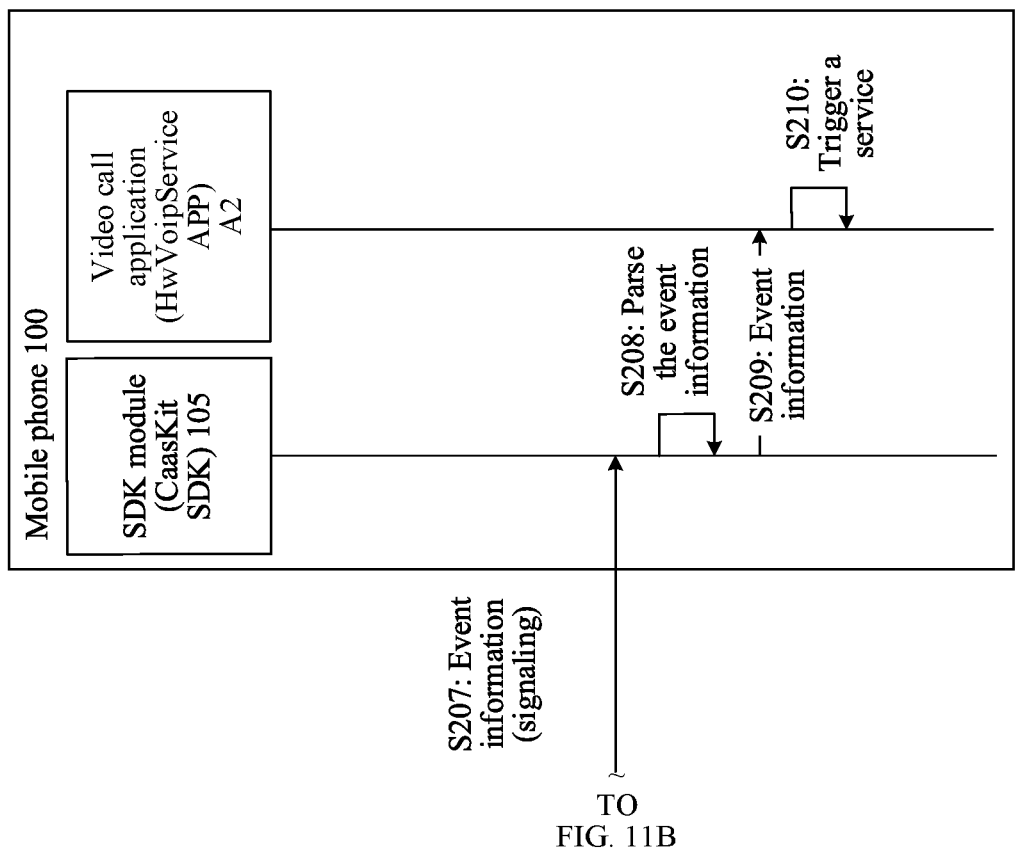
FIG. 11A and FIG. 11B are a schematic diagram of a process of performing application opening interconnection between a mobile phone and another mobile phone according to an embodiment of this disclosure.
Figure 11B:
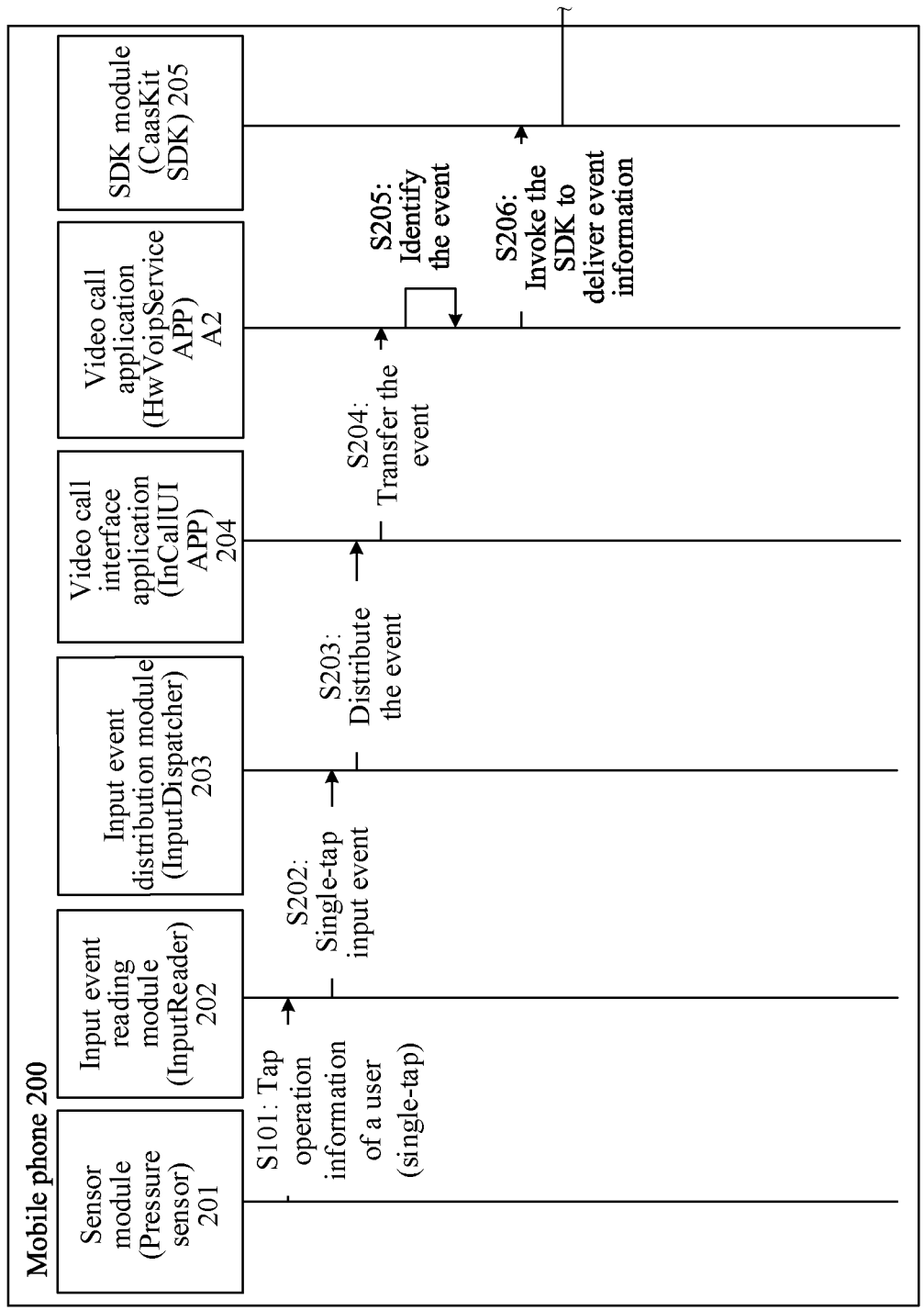

Refer to FIG. 11A and FIG. 11B. In another implementation of embodiments of this disclosure, a process of performing application opening interconnection between the mobile phone 100 and the mobile phone 200 includes the following steps.

S201: The sensor module 201 in the mobile phone 200 sends detected single-tap operation information corresponding to a single-tap operation of the user U2 to the input event reading module 202 in the mobile phone 200.

The single-tap operation information includes an input event type corresponding to a trigger operation of the user U2 and position coordinate information of a position at which the user U2 single taps. For example, an event type corresponding to the single-tap operation of the user U2 is a "single-tap input event".

S202: The input event reading module 202 receives the single-tap operation information, extracts an event from the EventHub through a thread to perform event translation, and may determine that an input event of the user U2 is a single-tap input event. The input event reading module 202 sends the single-tap input event to the input event distribution module 203.

A value range of the double-tap operation determining time threshold may be, for example, 0.1 s to 0.6 s, for example, 0.1 s, 0.35 s, 0.5 s, or 0.6 s. Certainly, the double-tap operation determining time threshold may alternatively be another value.

S203: The input event distribution module 203 distributes the event based on the received single-tap input event, and sends event information of the single-tap input event to the video call interface application 204.

S204: The video call interface application 204 transfers the event information of the single-tap input event to the video call application A2.

S205: The video call application A2 determines a single-tap time in the event information of the single-tap input event, so as to achieve an objective of event identification and event effectiveness analysis. If the video call application A2 does not receive a next input event within a preset interval time threshold after determining the single-tap input event, the video call application A2 determines that the input event is the single-tap input event.

A value range of the interval time threshold may be, for example, 0.1 s to 0.6 s, for example, 0.1 s, 0.35 s, 0.5 s, or 0.6 s. Certainly, the interval time threshold may alternatively be another value.

S206: The video call application A2 invokes the SDK module 205 to deliver the event information.

S207: The SDK module 205 sends the event information to the SDK module 105 in the mobile phone 100. The event information includes an event type "single-tap input event" and operation area information "position coordinate information of the position at which the user single taps".

S208: The SDK module 105 parses the event information to obtain the event type "single-tap input event" and the operation area information "position coordinate information of the position at which the user single taps".

S209: The SDK module 105 sends the parsed event information to the video call application A2. To be specific, the event type "double-tap input event" and the operation area information "position coordinate information of the position at which the user single taps" are sent to the video call application A2.

S210: The video call application A2 may first determine, based on the event type "single-tap input event", that the mobile phone 100 needs to perform an operation object trigger operation. Then, the video call application A2 determines, based on the operation area information "position coordinate information of the position at which the user single taps", whether the position coordinate information is valid, for example, whether a current interface of the mobile phone 100 includes an application icon and/or an application name of the application. If a current interface of the mobile phone 100 includes an application icon and/or an application name of the application, the video call application A2 determines whether the position at which the user single taps is at a position at which an on-screen application icon and/or the application name is located. If the position at which the user single taps is at a position at which an on-screen application icon and/or the application name is located, it is considered that the position coordinate information is valid. The video call application A2 determines, based on the position coordinate information "position coordinate information of the position at which the user single taps", a corresponding area on an interface of the mobile phone 100, and determines an operation object corresponding to the area. For example, the operation object is a video play application A3. In this case, the video call application A2 determines a video play application A3 opening operation that needs to be performed by the mobile phone 200. The mobile phone 100 performs the video play application A3 opening operation to open the video play application A3.

That the mobile phone 100 performs the video play application A3 opening operation to open the video play application A3 may be that the video call application A2 sends, by a window management module (not shown in the figure) in the mobile phone 100, an video play application A3 opening event to a video call interface application (not shown in the figure) corresponding to the video call application A2, to trigger the video call interface application to perform an operation of opening the video play application A3.

In the enhanced screen sharing method provided in this embodiment, in a process of screen sharing between the mobile phone 200 and the mobile phone 100, after the interconnection mode is enabled, the mobile phone 200 may trigger a corresponding operation object in the mobile phone 100 based on the trigger operation performed by the user U2 on the mobile phone 200. An interaction type between the mobile phone 100 and the mobile phone 200 that perform screen sharing can be enriched, and user experience can be improved.

In an implementation of embodiments of this disclosure, if screen resolutions of the mobile phone 100 and the mobile phone 200 are the same, in the foregoing step S204, the video call interface application 204 directly transfers the received event information of the single-tap input event sent by the input event distribution module 203 to the video call application A2. In other words, the mobile phone 100 directly sends the obtained position coordinate information to the mobile phone 200. For the foregoing S210, the video call application A2 in the mobile phone 100 may directly determine the corresponding operation object based on the position coordinate information.

In an implementation of embodiments of this disclosure, if screen resolutions of the mobile phone 100 and the mobile phone 200 are different, the mobile phone 100 and the mobile phone 200 need to convert the position coordinate information.

For example, for step S201, the sensor module 201 in the mobile phone 200 obtains initial position coordinate information based on the single-tap operation of the user U1. For step S204, the video call interface application 204 may perform, based on a coordinate adjustment parameter determined by a first screen resolution F1 of the mobile phone 100 and a second screen resolution F2 of the mobile phone 200, initial position coordinate information adjustment on initial position information in the received single-tap input event sent by the input event distribution module 203, to obtain the position coordinate information. Then, the video call interface application 204 sends, to the video call application A2, the event information that includes the position coordinate information obtained through adjustment.

In this implementation, F1 is (F11×F12). F11 is a quantity of pixels of a screen of the mobile phone 100 in a horizontal direction (which may alternatively be referred to as a screen width direction, or an x-axis direction). F12 is a quantity of pixels of the screen of the mobile phone 100 in a vertical direction (which may alternatively be referred to as a screen length direction, or a y-axis direction). F2 is (F21× F22). F21 is a quantity of pixels of a screen of the mobile phone 200 in the horizontal direction (which may alternatively be referred to as the screen width direction, or the x-axis direction). F22 is a quantity of pixels of the screen of the mobile phone 200 in the vertical direction (which may alternatively be referred to as the screen length direction, or the y-axis direction).

In this case, Z2=Sb×Z1. Z0 is the initial position coordinate information ($x_0, y_0$), and Z2 is the position coordinate information.

The coordinate adjustment parameter Sb is ($S_{x2}$, $S_{y2}$), where $S_{x2}$=F11/F21, and $S_{y2}$=F12/F22.

In this case, Z2 may be ($S_{x2}x_0, S_{y2}y_0$).

In an implementation of embodiments of this disclosure, the mobile phone 200 may alternatively send the event information to the mobile phone 100 as in the foregoing steps S201 to S207. For step S210, after obtaining the event information, the video call application A2 in the mobile phone 100 may send the event information to a video call interface application 104 in the mobile phone 100. The video call interface application 104 adjusts the position coordinate information based on the coordinate adjustment parameter determined by the first screen resolution F1 of the mobile phone 100 and the second screen resolution F2 of the mobile phone 200, to obtain the adjusted position coordinate information. A process of coordinate adjustment performed the mobile phone 100 is not described herein again. Then, the video call interface application 104 sends the adjusted position coordinate information to the video call application A2. The video call application A2 determines a corresponding operation object based on the adjusted position coordinate information.

In another implementation of embodiments of this disclosure, an application name of an application may alternatively be a name of an application package corresponding to the application, or may alternatively be another type of application identification information that may be used to identify the application.

In another implementation of embodiments of this disclosure, a user may operate a screen by the foregoing touch operations such as single-tap, double-tap, and flicking, or may operate the screen by a voice or a gesture.

In another implementation of embodiments of this disclosure, operation area information may alternatively be image information such as a trace corresponding to a user operation.

In another implementation of embodiments of this disclosure, the mobile phone 100 and the mobile phone 200 may alternatively perform screen sharing in a scenario such as a voice call or device collaboration, and enable an interconnection mode in a screen sharing process.

In an implementation of this disclosure, a first shared interface and a second shared interface may be partially the same. For example, the second electronic device may display only a part of the first display interface based on interface data of the first shared interface. Alternatively, the second electronic device may display, based on the interface data of the first shared interface, an interface in which content, such as text, is the same as that of the first display interface, but typesetting or the like is different from that of the first display interface. This may be set as required.

In an implementation of this disclosure, the foregoing application download and installation operation may be only an application download operation.

Figure 12:
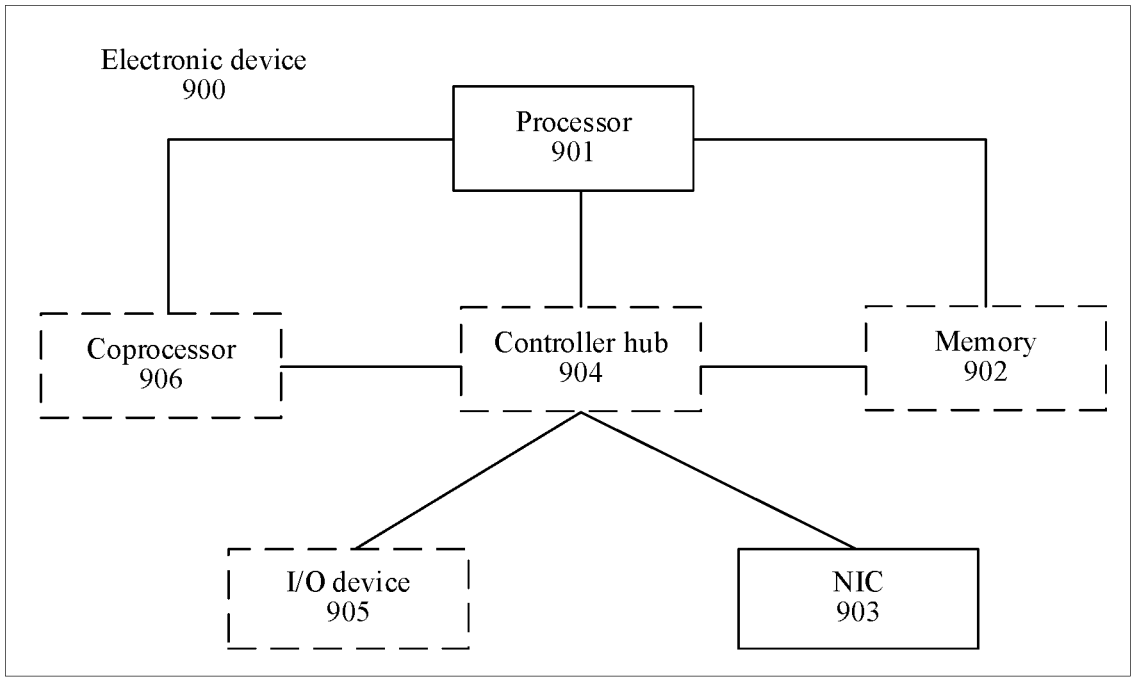
FIG. 12 is a schematic diagram showing a structure of an electronic device according to some embodiments of this disclosure.

Refer to FIG. 12. FIG. 12 shows a schematic diagram of a structure of an electronic device 900 according to an implementation of an embodiment of this disclosure. The electronic device 900 may include one or more processors 901 coupled to a controller hub 904. For at least one embodiment, the controller hub 904 communicates with the processor 901 via a multi-branch bus such as a front side bus (FSB), a point-to-point interface such as a QuickPath Interconnect (QPI), or a similar connection. The processor 901 executes instructions that control a general type of data processing operation. In an embodiment, the controller hub 904 includes but is not limited to a graphics memory controller hub (GMCH) (not shown in the figure) and an input/output hub (IOH) (which may be on separate chips) (not shown in the figure). The GMCH includes a memory and a graphics controller, and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in embodiments of this disclosure). The memory 902 and the coprocessor 906 are directly coupled to the processor 901 and the controller hub 904. The controller hub 904 is in a single chip with the IOH.

In one embodiment, the coprocessor 906 is a dedicated processor. An optional property of the coprocessor 906 is shown in FIG. 12 by dashed lines.

In one embodiment, the electronic device 900 may further include a network interface card (NIC) 903. The NIC 903 may include a transceiver configured to provide a radio interface for the electronic device 900, and further communicate with any other proper device (such as a front-end module or an antenna). In various embodiments, the NIC 903 may be integrated with other components of the electronic device 900. The NIC 903 may implement a function of the communication unit in the foregoing embodiments.

The electronic device 900 may further include an input/output (I/O) device 905.

It should be noted that FIG. 12 is merely an example. To be specific, although FIG. 12 shows that the electronic device 900 includes a plurality of components such as the processor 901, the controller hub 904, and the memory 902. However, in practical application, a device using the methods in embodiments of this disclosure may include only some of the components of the electronic device 900, for example, may include only the processor 901 and the NIC 903. A property of an optional device in FIG. 12 is shown in dashed lines.

The memory of the electronic device 900 may include one or more tangible and non-transitory computer readable storage media configured to store data and/or instructions. The computer readable storage medium stores instructions, and further, stores temporary and permanent copies of the instructions.

In embodiments of this disclosure, the electronic device 900 may be a mobile phone. The instructions stored in the memory of the electronic device may include instructions that when executed by at least one unit in the processor, cause the mobile phone to implement the foregoing enhanced screen sharing method.

Figure 13:
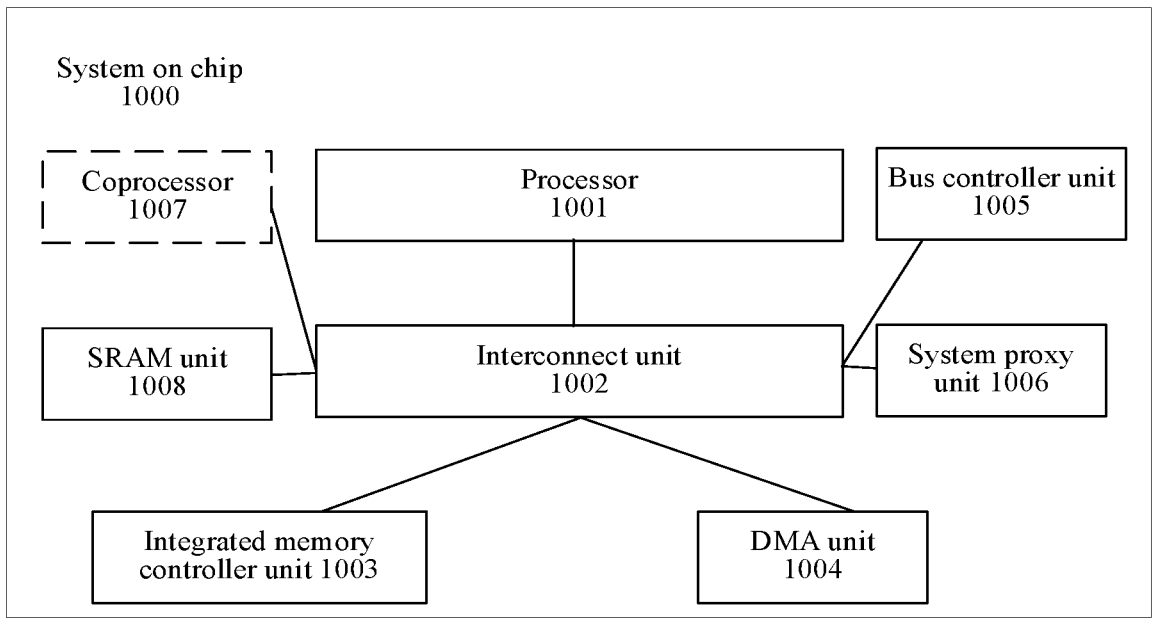
FIG. 13 is a schematic diagram showing a structure of a system on chip (SoC) according to some embodiments of this disclosure.

Refer to FIG. 13. FIG. 13 shows a schematic diagram of a structure of a system on chip (SoC) 1000 according to an implementation of this disclosure. In FIG. 13, similar components have the same reference numerals. In addition, a dashed-line frame represents an optional feature of a more advanced SoC 1000. The SoC 1000 may be used in any electronic device according to this disclosure, and may implement corresponding functions based on different devices in which the SoC is located and different instructions stored in the SoC.

In FIG. 13, the SoC 1000 includes an interconnect unit 1002, coupled to a processor 1001, a system proxy unit 1006, a bus controller unit 1005, an integrated memory controller unit 1003, one or more coprocessors 1007, which may include an integrated graphics logic, an image processor, an audio processor, and a video processor, an static random-access memory (RAM) (or SRAM) unit 1008, and a direct memory access (DMA) unit 1004. In one embodiment, the coprocessor 1007 includes a dedicated processor, such as, for example, a network or communication processor, a compression engine, a GPU, a high throughput Many-Integrated-Core (MIC) processor, or an embedded processor.

The SRAM unit 1008 may include one or more computer readable media configured to store data and/or instructions. The computer readable storage medium may store instructions, and further, store temporary and permanent copies of the instructions. The instructions may include instructions that when executed by at least one unit in the processor, cause the electronic device to implement the foregoing enhanced screen sharing method.

Each embodiment of the mechanism disclosed in this disclosure may be implemented in software, hardware, firmware, or a combination of these implementation methods. Embodiments of this disclosure may be implemented as a computer program or program code executed on a programmable system. The programmable program includes at least one processor and a memory (or a storage system, including a volatile and non-volatile memory and/or a storage unit).

It should be noted that, terms "first", "second" and the like are used only for distinguishing descriptions and are not to be understood as indicating or implying relative importance.

It should be noted that, in the drawings, some structural or method features may be shown in a particular arrangement and/or order. However, it should be understood that such a specific arrangement and/or order may not be required. In some implementations, these features may be arranged in a manner and/or order different from that shown in the descriptive accompanying drawings. In addition, inclusion of the structural or method features in a particular figure does not imply that such features are required in all implementations, and in some implementations, these features may not be included or may be combined with other features.

Although this disclosure has been illustrated and described with reference to some preferred implementations of this disclosure, a person of ordinary skill in the art should understand that the foregoing content is further detailed description of this disclosure with reference to specific implementations, and specific implementations of this disclosure are not limited to these descriptions. Those skilled in the art may make various changes in form and detail, including several simple deductions or substitutions, without departing from the spirit and scope of this disclosure.

What is claimed is:

1. An enhanced screen sharing method implemented by a first electronic device, wherein the enhanced screen sharing method comprises:
    displaying a first shared interface of the first electronic device, wherein the first shared interface is a home screen of the first electronic device, and the first shared interface comprises application icons of multiple applications;
    sending first interface data of the first shared interface to a second electronic device to enable the second electronic device to display, based on the first interface data, a second shared interface corresponding to the first shared interface, wherein the second shared interface comprises the application icons of the multiple applications;
    receiving event information from the second electronic device, wherein the event information is based on a trigger operation of a user for the second shared interface, and wherein the event information comprises operation area information that correspond to the trigger operation;
    determining, based on the operation area information, application identification information of a first application corresponding to the operation area information on the first shared interface;
    generating event response information comprising the application identification information; and
    sending the event response information to the second electronic device, wherein the event response information is for downloading the first application on the second electronic device when the application is not currently installed in the second electronic device.

2. The enhanced screen sharing method of claim 1, wherein the event information further comprises an event type, and the method further comprises:
    determining a first operation type based on the event type; and
    determining the application identification information of the first application based on the first operation type and the operation area information.

3. The enhanced screen sharing method of claim 2, wherein the first operation type is an application determining operation when the event type is a first input event.

4. The enhanced screen sharing method of claim 3, wherein the first input event is a double-tap input event or a touch-and-hold input event.

5. The enhanced screen sharing method of claim 3, further comprising:
    determining a second operation type based on the first operation type, wherein the second operation type is an application download operation or an application download and installation operation; and
    generating event response information comprising the application identification information and the second operation type.

6. The enhanced screen sharing method of claim 2, wherein the first operation type is an operation object trigger operation when the event type is a second input event, and wherein the enhanced screen sharing method further comprises:
    determining, based on the operation area information, an operation object corresponding to the operation area information on the first shared interface; and
    performing an operation of triggering the operation object.

7. The enhanced screen sharing method of claim 6, wherein the second input event is a single-tap input event or a flicking input event.

8. The enhanced screen sharing method of claim 2, wherein a first screen resolution of the first electronic device is different from a second screen resolution of the second electronic device, and wherein the enhanced screen sharing method further comprises:

adjusting the operation area information based on the first screen resolution and the second screen resolution to obtain adjusted operation area information; and performing a corresponding operation based on the adjusted operation area information and the first operation type.

9. The enhanced screen sharing method of claim 1, wherein the operation area information comprises position coordinate information.

10. The enhanced screen sharing method of claim 1, further comprising:
displaying an interconnection control; and
detecting an enabling trigger operation performed by the user on the interconnection control; and
enabling, in response to detecting the enabling trigger operation, an interconnection mode with the second electronic device.

11. The enhanced screen sharing method of claim 1, further comprising:
receiving an interconnection request from the second electronic device;
displaying, in response to the interconnection request, an interconnection determining control;
detecting a trigger operation performed by the user on the interconnection determining control; and
generating and sending, to the second electronic device in response to detecting the trigger operation, an interconnection response indicating that interconnection is agreed to, wherein the interconnection response is for enabling an interconnection mode.

12. The enhanced screen sharing method of claim 1, further comprising:
receiving, by the first electronic device, second interface data of a third shared interface of the second electronic device to enable the first electronic device to display, based on the second interface data, a fourth shared interface corresponding to the third shared interface, wherein the first shared interface is different than the third shared interface; and
simultaneously displaying both the first shared interface and the fourth shared interface on the first electronic device, wherein either the first shared interface is displayed on a first portion of a first physical display of the first electronic device and the fourth shared interface is displayed on a second portion of the first physical display of the first electronic device or the first shared interface is displayed on the first physical display of the first electronic device and the fourth shared interface is displayed on a second physical display of the first electronic device.

13. An enhanced screen sharing method implemented by a second electronic device, wherein the enhanced screen sharing method comprises:
receiving first interface data of a first shared interface from a first electronic device, wherein the first shared interface is displayed by the first electronic device, the first shared interface is a home screen of the first electronic device, and the first shared interface comprises application icons of multiple applications;
displaying, based on the first interface data, a second shared interface corresponding to the first shared interface, wherein the second shared interface comprises the application icons of the multiple applications;
detecting a trigger operation performed by a user on the second shared interface;

determining event information corresponding to the trigger operation, wherein the event information comprises operation area information that correspond to the trigger operation;
sending the event information to the first electronic device to enable the first electronic device to determine a first application corresponding to the operation area information;
receiving, from the first electronic device, event response information comprising application identification information of the first application; and
downloading the first application according to the application identification information when the first application is not currently installed in the second electronic device.

14. The enhanced screen sharing method of claim 13, wherein a first screen resolution of the first electronic device is different from a second screen resolution of the second electronic device, and wherein the enhanced screen sharing method further comprises:
obtaining initial operation area information based on the trigger operation; and
adjusting the initial operation area information based on the first screen resolution and the second screen resolution to obtain the operation area information.

15. The enhanced screen sharing method of claim 13, wherein enabling the interconnection mode for the first electronic device comprises:
displaying an interconnection control; and
detecting an enabling trigger operation performed by the user on the interconnection control; and
enabling, in response to detecting the enabling trigger operation, an interconnection mode for the first electronic device.

16. The enhanced screen sharing method of claim 15, wherein enabling the interconnection mode comprises:
detecting the enabling trigger operation performed by the user on the interconnection control;
sending, in response to detecting the enabling trigger operation, an interconnection request to the first electronic device;
receiving an interconnection response indicating that interconnection is agreed to; and
enabling, in response to receiving the interconnection response, an interconnection mode for the first electronic device.

17. The enhanced screen sharing method of claim 13, further comprising:
generating interconnection operation prompt information; and
displaying the interconnection operation prompt information.

18. A first electronic device comprising:
a non-transitory computer readable medium configured to store instructions; and
one or more processors coupled to the non-transitory computer readable medium and configured to execute the instructions to cause the first electronic device to:
display a first shared interface of the first electronic device, wherein the first shared interface is a home screen of the first electronic device, and the first shared interface comprises application icons of multiple applications;
send first interface data of the first shared interface to a second electronic device to enable the second electronic device to display, based on the first interface data, a second shared interface corresponding to the first shared interface, wherein the second shared interface comprises the application icons of the multiple applications;

receive event information from the second electronic device, wherein the event information is based on a trigger operation of a user for the second shared interface, and wherein the event information comprises type and operation area information that correspond to the trigger operation;

determine, based on the operation area information, application identification information of a first application corresponding to the operation area information on the first shared interface;

generate event response information comprising the application identification information; and send the event response information to the second electronic device, wherein the event response information is for downloading the first application on the second electronic device when the application is not currently installed in the second electronic device.

19. The first electronic device of claim 18, wherein the one or more processors are further configured to execute the instructions to cause the first electronic device to:

determine a first operation type based on the event type; and further perform the corresponding operation on the first electronic device based on the first operation type and the operation area information.

20. A second electronic device comprising:

a non-transitory computer readable medium configured to store instructions; and one or more processors coupled to the non-transitory computer readable medium and configured to execute the instructions to cause the second electronic device to:

receive first interface data of a first shared interface from a first electronic device, wherein the first shared interface is configured to be displayed by the first electronic device, and wherein the first shared interface is a home screen of the first electronic device, and the first shared interface comprises application icons of multiple applications;

display, based on the first interface data, a second shared interface corresponding to the first shared interface, wherein the second shared interface comprises the application icons of the multiple applications;

detect a trigger operation performed by a user on the second shared interface;

determine event information corresponding to the trigger operation, wherein the event information comprises operation area information that correspond to the trigger operation;

send the event information to the first electronic device to enable the first electronic device to determine a first application corresponding to the operation area information;

receive, from the first electronic device, event response information comprising application identification information of the first application; and download the first application according to the application identification information when the first application is not currently installed in the second electronic device.

* * * * *

UNITED STATES PATENT AND TRADEMARK OFFICE
CERTIFICATE OF CORRECTION

PATENT NO. : 12,405,760 B2  
APPLICATION NO. : 18/336885  
DATED : September 2, 2025  
INVENTOR(S) : Hang Su Page 1 of 1

It is certified that error appears in the above-identified patent and that said Letters Patent is hereby corrected as shown below:

In the Claims

Claim 18, Column 37, Lines 7-8: "information comprises type and operation area" should read "information comprises operation area"

Signed and Sealed this  
Twenty-first Day of October, 2025

John A. Squires  
*Director of the United States Patent and Trademark Office*